(12) United States Patent
Sugiura et al.

(10) Patent No.: US 12,020,676 B2
(45) Date of Patent: Jun. 25, 2024

(54) SOUND-BLOCKING SHEET MEMBER, SOUND-BLOCKING STRUCTURE USING SAME, AND METHOD FOR MANUFACTURING SOUND-BLOCKING SHEET MEMBER

(71) Applicant: Mitsubishi Chemical Corporation, Tokyo (JP)

(72) Inventors: Katsuhiko Sugiura, Tokyo (JP); Shogo Koga, Tokyo (JP); Naoyuki Uchida, Tokyo (JP); Kazuma Inoue, Tokyo (JP); Yukio Kato, Tokyo (JP); Kohji Uehara, Tokyo (JP); Masashi Miura, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 560 days.

(21) Appl. No.: 17/191,792

(22) Filed: Mar. 4, 2021

(65) Prior Publication Data
US 2021/0193101 A1 Jun. 24, 2021

Related U.S. Application Data

(63) Continuation of application No. PCT/JP2019/034966, filed on Sep. 5, 2019.

(30) Foreign Application Priority Data

Sep. 6, 2018 (JP) .................................. 2018-166867
Aug. 13, 2019 (JP) .................................. 2019-148471

(51) Int. Cl.
*G10K 11/172* (2006.01)
*B29C 39/10* (2006.01)
(Continued)

(52) U.S. Cl.
CPC ............ *G10K 11/172* (2013.01); *B29C 39/10* (2013.01); *B32B 3/266* (2013.01); *B32B 3/30* (2013.01);
(Continued)

(58) Field of Classification Search
CPC .... G10K 11/172; G10K 11/162; B29C 39/10; B29L 2031/30; B32B 3/266; B32B 3/30;
(Continued)

(56) References Cited

U.S. PATENT DOCUMENTS 4,373,608 A * 2/1983 Holmes ..................... F16F 7/10
181/208
5,241,512 A * 8/1993 Argy ..................... G10K 11/172
181/207
(Continued)

FOREIGN PATENT DOCUMENTS

CN 201598575 U 10/2010
CN 203796278 U 8/2014
(Continued)

OTHER PUBLICATIONS

International Search Report dated Oct. 8, 2019 in PCT/JP2019/034966 filed on Sep. 5, 2019, 1 page.
(Continued)

*Primary Examiner* — Forrest M Phillips
(74) *Attorney, Agent, or Firm* — Oblon, McClelland, Maier & Neustadt, L.L.P.

(57) ABSTRACT

An object of the present invention is to provide a sound-blocking sheet member that is relatively lightweight, has high sound-blocking performance overwhelming the law of mass action, and is excellent in terms of manufacturability and durability. The sound-blocking sheet member includes at least a sheet and a plurality of resonance portions. The resonance portion is provided in contact with a sheet surface
(Continued)

of the sheet, and the resonance portion includes a weight portion and a base portion. The weight portion is supported by the base portion and has a larger mass than the base portion, and the weight portion has a penetration portion. The base portion is in contact with a surface on a resonance portion front end side of the weight portion and covers the weight portion.

32 Claims, 24 Drawing Sheets

(51) Int. Cl.
B29L 31/30 (2006.01)
B32B 3/26 (2006.01)
B32B 3/30 (2006.01)
B32B 25/04 (2006.01)
B60R 13/08 (2006.01)
E04B 1/84 (2006.01)
G10K 11/162 (2006.01)

(52) U.S. Cl.
CPC ............ *B32B 25/04* (2013.01); *E04B 1/8409* (2013.01); *G10K 11/162* (2013.01); *B29L 2031/30* (2013.01); *B32B 2307/102* (2013.01); *B32B 2605/00* (2013.01); *B60R 13/0815* (2013.01)

(58) Field of Classification Search
CPC . B32B 25/04; B32B 2307/102; E04B 1/8409; B60R 13/0815
See application file for complete search history.

(56) References Cited

U.S. PATENT DOCUMENTS

| 8,381,872 | B2 | 2/2013 | Alexander et al. | |
| 11,168,474 | B2* | 11/2021 | Koga | E04B 1/8409 |
| 2011/0048850 | A1 | 3/2011 | Alexander et al. | |
| 2018/0340328 | A1* | 11/2018 | Koga | B32B 25/14 |
| 2020/0143782 | A1* | 5/2020 | Honji | G10K 11/172 |
| 2020/0143787 | A1* | 5/2020 | Tomimatsu | G10K 11/172 |

FOREIGN PATENT DOCUMENTS

| CN | 105957513 A | 9/2016 | |
| EP | 1571649 A2 * | 9/2005 | G10K 11/172 |
| EP | 3 413 301 A1 | 12/2018 | |
| JP | 10-331285 A | 12/1998 | |
| JP | 2000-265593 A | 9/2000 | |
| TW | 201736693 A | 10/2017 | |
| WO | WO-2014007481 A1 * | 1/2014 | B32B 5/18 |
| WO | WO-2014139323 A1 * | 9/2014 | G10K 11/172 |
| WO | WO 2017/135409 A1 | 8/2017 | |

OTHER PUBLICATIONS

Assouar et al., "Broadband plate-type acoustic metamaterial for a low-frequency sound attenuation", Applied Physics Letters, 101, 173505, 2012, 5 pages.
Oudich et al., "Negative effective mass density of acoustic metamaterial plate decorated with low frequency resonant pillars", Journal of Applied Physics, 116, 184504, 2014, 8 pages.
Oudich et al., "A sonic band gap based on the locally resonant phononic plates with stubs", New Journal of Physics, 12, 083049, 2010, 10 pages.
Extended European Search Report dated Oct. 1, 2021 in European Patent Application No. 19857974, 7 pages.
Office Action issued Feb. 28, 2024, in Chinese Patent Application No. 201980057622.9 (with English-language Translation).

* cited by examiner

SOUND-BLOCKING SHEET MEMBER, SOUND-BLOCKING STRUCTURE USING SAME, AND METHOD FOR MANUFACTURING SOUND-BLOCKING SHEET MEMBER

This application is a Continuation Application based on International Application No. PCT/JP2019/034966, filed Sep. 5, 2019, which claims priority on Japanese Patent Application No. 2018-166867 filed on Sep. 6, 2018, and Japanese Patent Application No. 2019-148471 filed on Aug. 13, 2019, the contents of both of which are incorporated herein by reference.

TECHNICAL FIELD

The present invention relates to a sound-blocking sheet member, a sound-blocking structure using the same, and a method for manufacturing a sound-blocking sheet member.

BACKGROUND ART

In buildings such as complex housing, office buildings, and hotels, there is a demand for quietness suitable for room applications which is attained by blocking outdoor noise from automobiles, railroads, aircraft, ships, and the like, equipment noise generated inside buildings, or human voice. In addition, in vehicles such as automobiles, railroads, aircrafts, and ships, there is a demand for the reduction of indoor noise in order to provide quiet and cozy spaces to occupants by blocking wind noise or engine noise. Therefore, research and development of means for blocking the propagation of noise or vibration from outdoor places to indoor places or from the outside to the inside of vehicles, that is, vibration-damping and sound-blocking means has been underway. In recent years, in response to the verticalization or the like of buildings, there has been a demand for a lightweight vibration-damping and sound-blocking member, and, for vehicles as well, there has been a demand for a lightweight vibration-damping and sound-blocking member for improving energy efficiency. Furthermore, in order to improve the degree of freedom in designing buildings, vehicles, and equipment thereof, there is a demand for a vibration-damping and sound-blocking member capable of dealing with complicated shapes.

Ordinarily, the characteristics of vibration-damping and sound-blocking materials follow the so-called a law of mass action. That is, the transmission loss, which is an index of the amount of noise reduction, is determined by the logarithm of the product of the mass of a vibration-damping and sound-blocking material and the frequency of an elastic wave or a sound wave. Therefore, in order to increase the amount of noise reduction at a certain frequency, it is necessary to increase the mass of the vibration-damping and sound-blocking material. However, methods for increasing the masses of vibration-damping and sound-blocking materials have limitations on the amount of noise reduction due to restrictions on the masses of buildings, vehicles, or the like.

In order to solve the problem with an increase in the masses of vibration-damping and sound-blocking members, the structures of the members have been thus far improved. For example, a method in which a plurality of stiff flat plate materials such as gypsum boards, concrete, steel plates, glass plates, or resin plates are combined and used, a method in which a hollow double-wall structure or a hollow triple-wall structure is produced using gypsum boards or the like, or the like is known.

In addition, recently, in order to realize sound-blocking performance overwhelming the law of mass action, a sound-blocking plate made of a plate-like acoustic metamaterial for which a high-stiffness flat plate material and a resonator are combined and used has been proposed. Specifically, sound-blocking plates having a plurality of independent stump-shaped protrusions (resonators) made of silicone rubber and tungsten or a plurality of independent stump-shaped protrusions (resonators) made of rubber provided on an aluminum substrate (refer to Non-Patent Documents 1 and 2), a sound-blocking plate having a plurality of independent stump-shaped protrusions (resonators) made of silicone rubber or silicone rubber and lead cap provided on an epoxy substrate (refer to Non-Patent Document 3) have been proposed.

In addition, a sound-blocking sheet member including a sheet having rubber elasticity and a resonance portion having a base portion and a weight portion has been proposed (Patent Document 1).

CITATION LIST

Patent Document

[Patent Document 1]
  PCT International Publication No. WO 2017/135409
[Patent Document 2]
  Japanese Unexamined Patent Application, First Publication No. 2000-265593

Non-Patent Document

[Non-Patent Document 1]
  M B Assouar, M. Senesi, M. Oudich, M. Ruzzene and Z. Hou, Broadband plate-type acoustic metamaterial for low-frequency sound attenuation, Applied Physics Letters, 2012, volume 101, pp 173505.
[Non-Patent Document 2]
  M. Oudich, B. Djafari-Rouhani, Y. Pennec, M. B. Assouar, and B. Bonello, Negative effective mass density of acoustic metamaterial plate decorated with low frequency resonant pillars, Journal of Applied Physics, 2014, volume 116, pp 184504.
[Non-Patent Document 3]
  M. Oudich, Y. Li, M. B Assouar, and Z. Hou, A sonic band gap based on the locally resonant phononic plates with stubs, New Journal of Physics, 2010, volume 12, pp 083049.

SUMMARY OF INVENTION

Technical Problem

In Non-Patent Documents 1 to 3, studies have been made on shielding performance when the material or size of the stump-shaped protrusion (resonator) is changed. However, there were limitations on the degree of freedom in design for improving sound-blocking performance only by a change in the material or size of the stump-shaped protrusion (resonator).

In addition, in the sound-blocking plates described in Non-Patent Documents 1 to 3, since each resonator is installed on the substrate using an adhesive, the manufacturing steps are complicated, and the productivity and the economic efficiency are poor. Moreover, the sound-blocking plates described in Non-Patent Documents 1 to 3 are not easily deformed due to the use of the relatively rigid aluminum substrate or epoxy substrate and cannot be installed along, for example, a non-flat surface such as a curved surface.

In order to solve this, it is conceivable to adopt an aluminum substrate or epoxy substrate that has been molded to be curved in advance and install a plurality of resonators on the curved surface of the substrate. However, in such a case, since it is necessary to install individual resonators on the curved surface, the difficulty of the manufacturing steps further increases, and the productivity and the economic efficiency further deteriorate. In addition, the preparation of a substrate suitable for the curved shape of an installation place in each case lacks versatility. Hence, there has been a longing for a sound-blocking sheet member based on a new design concept in expanding industrial uses, particularly, from the viewpoint of the degree of freedom in design, versatility, productivity, cost, and the like.

The sound-blocking sheet member described in Patent Document 1 has a high degree of freedom in design and excellent versatility. However, there have been no sufficient studies in terms of the easiness of manufacturing, productivity, and durability.

In the case of a manufacturing method in which a weight portion is installed in a hole of a mold and a resin is poured as in Patent Document 1, there is a problem in that the resin does not easily reach a portion below the weight portion and an air bubble does not easily escape. Since the resin does not reach the portion below the weight portion, and an air bubble remains, there is a case where the surface on the front end side of the weight portion is not sufficiently covered with the resin. Since the weight portion is not covered with the resin, the weight portion is exposed, which leads to the dropping of the weight in some cases.

Patent Documents 1 and 2 disclose sound-blocking sheets having weights provided on the front end sides of the protrusions. Due to the provision of the weights, sound in low frequency bands, which is considered to be difficult to block, is blocked.

However, a method for manufacturing a sound-blocking sheet having such weights has not yet been sufficiently established.

For example, in a case where weight portions are provided on the front end sides of protrusions as in Patent Document 2, there is a concern that the weight may easily peel from the protrusion.

In addition, in the case of a step of, in a mold for molding a sound-blocking sheet, inserting a weight portion into a recessed portion in a mold for molding a protrusion and pouring a resin into the recessed portion as in Patent Document 1, there is a concern that the position of the weight portion may become uneven due to the flow of the resin. In a case where the position of the weight portion is significantly uneven, there is a high possibility that the sound-blocking performance may be affected, the weight portion that is unevenly positioned and consequently exposed may be released from the protrusion or rusted.

The present invention has been made in view of such background techniques. An object of the present invention is to provide a sound-blocking sheet member and a sound-blocking structure using the same that are relatively lightweight, have high sound-blocking performance overwhelming the law of mass action, and are excellent in terms of manufacturability and durability.

In addition, another object of the present invention is to provide a sound-blocking sheet member and a method for manufacturing the sound-blocking sheet member that is capable of suppressing the position of a weight portion becoming significantly uneven with respect to a protrusion.

It should be noted that the object of the present invention is not limited to the above-described objects, and it is also possible to regard the exhibition of an action and effect that is derived by each configuration described in embodiments for carrying out the invention described below, but cannot be obtained by conventional techniques as another object.

Solution to Problem

As a result of intensive studies to solve the above-described problems, the present inventors found that the above-described problems are solved by adopting a sheet member in which a specific resonance portion is provided on a sheet having rubber elasticity and completed the present invention.

In addition, as a result of intensive studies to solve the above-described problems, the present inventors found that the above-described problems are solved by pouring a resin into a plurality of cavities in which protrusion portions are to be molded and completed the present invention. In the cavity, the position of a weight portion in the surface direction of a sheet portion with respect to the bottom portion of the cavity is regulated by providing a projection portion at one of the bottom portion and the front end side of the weight portion, providing a recessed portion at the other, and inserting the projection portion into the recessed portion.

That is, the present invention provides a variety of specific aspects described below.

[1] A sound-blocking sheet member, including at least a sheet and a plurality of resonance portions, in which the resonance portions are provided in contact with a sheet surface of the sheet, each resonance portion includes a weight portion and a base portion, the weight portion is supported by the base portion and has a larger mass than the base portion, the weight portion has a penetration portion, and the base portion is in contact with a surface on a resonance portion front end side of the weight portion and covers the weight portion.

[2] The sound-blocking sheet member according to [1], in which an outer peripheral portion of the weight portion and the inside of the penetration portion are filled with the base portion.

[3] The sound-blocking sheet member according to [1] or [2], in which the weight portion is disposed on the front end side of the center in the height direction of the resonance portion.

[4] The sound-blocking sheet member according to any one of [1] to [3], in which the maximum height from the opposite surface of the sheet surface provided with the resonance portion to the front end of the resonance portion is 30 mm or less.

[5] The sound-blocking sheet member according to [4], in which the maximum height from the opposite surface of the sheet surface provided with the resonance portion to the front end of the resonance portion is 20 mm or less.

[6] The sound-blocking sheet member according to any one of [1] to [5], in which the resonance portion has a void in which the surface on the front end side of the resonance portion is indented, and the void is formed in the penetration portion.

[7] The sound-blocking sheet member according to any one of [1] to [6], in which the penetration portion is a through-hole.

[8] A sound-blocking structure, in which the sound-blocking sheet member according to any one of [1] to [7] is used.

[9] A sound-blocking sheet member, including at least a sheet and a plurality of resonance portions, in which the resonance portions are provided in contact with a sheet surface of the sheet, each resonance portion includes a weight portion and a base portion, the weight portion is supported by the base portion and has a larger mass than the base portion, and the weight portion has a penetration portion.

[10] The sound-blocking sheet member according to [9], in which an outer peripheral portion of the weight portion and the inside of the penetration portion are filled with the base portion.

[11] The sound-blocking sheet member according to [10], in which the maximum height from the opposite surface of the sheet surface provided with the resonance portion to the front end of the resonance portion is 30 mm or less.

[12] The sound-blocking sheet member according to [11], in which the maximum height from the opposite surface of the sheet surface provided with the resonance portion to the front end of the resonance portion is 20 mm or less.

[13] A sound-blocking structure, in which the sound-blocking sheet member according to any one of [9] to [12] is used.

[14] A method for manufacturing a sound-blocking sheet member having a sheet portion, a plurality of protrusion portions provided in the surface direction of the sheet portion, and weight portions each provided on front end sides of the plurality of protrusion portions, the method including a weight portion insertion step of inserting the weight portions into bottom portions of a plurality of cavities, in which the protrusion portions are to be molded, in a mold including the plurality of cavities and a resin insertion step of pouring a resin into the plurality of cavities, in which a projection portion is provided at one of the bottom portion and the front end side of the weight portion, and a recessed portion or a penetration portion into which the projection portion is to be inserted is provided at the other, in the weight portion insertion step, the projection portion is inserted into the recessed portion or the penetration portion, and in the resin insertion step, in a state in which the projection portion is inserted into the recessed portion or the penetration portion and a position in the surface direction of the weight portion with respect to the bottom portion is regulated, the resin is poured into the cavities.

[15] The method for manufacturing a sound-blocking sheet member according to [14], in which the weight portion has the penetration portion.

[16] The method for manufacturing a sound-blocking sheet member according to [15], in which the bottom portion is provided with the projection portion and a step portion that protrudes to a height lower than the projection portion and is in contact with a part of the surface on the front end side of the weight portion.

[17] The method for manufacturing a sound-blocking sheet member according to [16], in which the step portion is provided in contact with the side surface of the projection portion.

[18] The method for manufacturing a sound-blocking sheet member according to [16], in which the step portion is provided apart from the side surface of the projection portion.

[19] The method for manufacturing a sound-blocking sheet member according to [17] or [18], in which the step portion inclines in a direction in which the height decreases as the protrusion portion runs from the central side in the radial direction toward the outer side in the radial direction, and a maximum diameter of the step portion at a highest position is smaller than the hole diameter of the penetration portion provided in the weight portion, and a maximum diameter of the step portion at the lowest position is larger than the hole diameter of the penetration portion.

[20] The method for manufacturing a sound-blocking sheet member according to any one of [14] to [19], in which the mold includes a lower mold having cavities provided in an open state on an upper surface, and an upper mold that is movable between a position at which the upper mold comes into contact with the upper surface of the lower mold and a position at which the upper mold is spaced apart from the lower mold on an upper side and has an indentation provided on the upper surface and a penetration flow path that is open in the indentation, and in the resin insertion step, in a state in which the upper mold and the lower mold are in contact with each other, a molten resin is poured into the cavities from the indentation through the penetration flow path.

[21] The method for manufacturing a sound-blocking sheet member according to [20], further including a step of extruding a solid material of the resin disposed in the indentation with a press mold inserted into the indentation before the resin insertion step.

[22] The method for manufacturing a sound-blocking sheet member according to any one of [14] to [16], in which the projection portion is provided at the bottom portion to incline in a direction in which the height decreases as the protrusion portion runs from the central side in the radial direction toward the outer side in the radial direction, and a maximum diameter of the projection portion at a highest position is smaller than the hole diameter of the penetration portion provided in the weight portion, and a maximum diameter of the projection portion at the lowest position is larger than the hole diameter of the penetration portion.

[23] The method for manufacturing a sound-blocking sheet member according to any one of [14] to [22], further including a step of moving the projection portion provided at the bottom portion to the bottom portion side before the resin poured into the cavities in the resin insertion step is solidified.

[24] The method for manufacturing a sound-blocking sheet member according to [23], further including
a step of, after solidification of the resin, moving the projection portion to the cavity side to release the sound-blocking sheet member from the mold.

[25] The method for manufacturing a sound-blocking sheet member according to any one of [14] to [24],
in which the maximum value of a gap between the projection portion and the recessed portion or between the projection portion and the penetration portion is smaller than the minimum value of a gap between the weight portion inserted into the cavity and the cavity.

[26] A sound-blocking sheet member including a sheet portion,
a plurality of protrusion portions provided in the surface direction of the sheet portion and having a resin material, and
weight portions each provided at insides on the front end side of the plurality of protrusion portions and each having a recessed portion or a penetration portion on the front end side,
in which a void is formed on the inner side of the end surface on the front end side of the weight portion.

[27] The sound-blocking sheet member according to [26], in which the weight portion has the penetration portion, and
the inner side of the void in the penetration portion is filled with the resin material.

[28] The sound-blocking sheet member according to [27], in which a portion between the surface of the penetration portion and the void is filled with the resin material.

[29] The sound-blocking sheet member according to [27], in which the protrusion portion has a coating portion that covers a part of the surface on the front end side of the weight portion with the resin material, and
a penetration portion that is provided along a circumferential direction on the outer side in the radial direction of the void around the center in the radial direction of the protrusion portion as an axial line and exposes a part of the surface on the front end side of the weight portion to penetrate the coating portion.

[30] The sound-blocking sheet member according to [29], in which the penetration portion has an inclination portion that inclines in a direction in which the inclination portion comes close to a surface of the coating portion as the protrusion portion runs from the central side in the radial direction toward the outer side in the radial direction,
a maximum diameter of the inclination portion at the innermost side is smaller than the hole diameter of the penetration portion, a maximum diameter of the inclination portion at an outermost surface side is larger than the hole diameter of the penetration portion, and
a part of the surface on the front end side of the weight portion is exposed in the middle of the inclination portion.

[31] The sound-blocking sheet member according to [27], in which the protrusion portion has a coating portion that covers a part of the surface on the front end side of the weight portion with the resin material, and
an indented portion that is provided by removing a part of the coating portion and exposes a part of the surface on the front end side of the weight portion on a bottom surface, and
the void is open on the bottom surface of the indented portion.

[32] The sound-blocking sheet member according to [27], in which the protrusion portion has a coating portion that covers a part of the surface on the front end side of the weight portion with the resin material,
the void has a penetration portion that is provided along a circumferential direction on the outer side in the radial direction of the void around the center in the radial direction of the protrusion portion as an axial line and exposes a part of the surface on the front end side of the weight portion to penetrate the coating portion,
in which the penetration portion has an inclination portion that inclines in a direction in which the inclination portion comes close to a surface of the coating portion as the protrusion portion runs from the central side in the radial direction toward the outer side in the radial direction,
a maximum diameter of the inclination portion at the innermost side is smaller than the hole diameter of the penetration portion, a maximum diameter of the inclination portion at an outermost surface side is larger than the hole diameter of the penetration portion, and
a part of the surface on the front end side of the weight portion is exposed in the middle of the inclination portion.

Advantageous Effects of Invention

According to the present invention, it is possible to provide a sound-blocking sheet member and a sound-blocking structure using the same which are relatively lightweight, have high sound-blocking performance overwhelming the law of mass action, and are excellent in terms of manufacturability and durability.

In addition, in the present invention, it is possible to provide a sound-blocking sheet member capable of suppressing the position of a weight portion becoming significantly uneven with respect to a protrusion and a method for manufacturing the sound-blocking sheet member.

DESCRIPTION OF EMBODIMENTS

Figure 1:
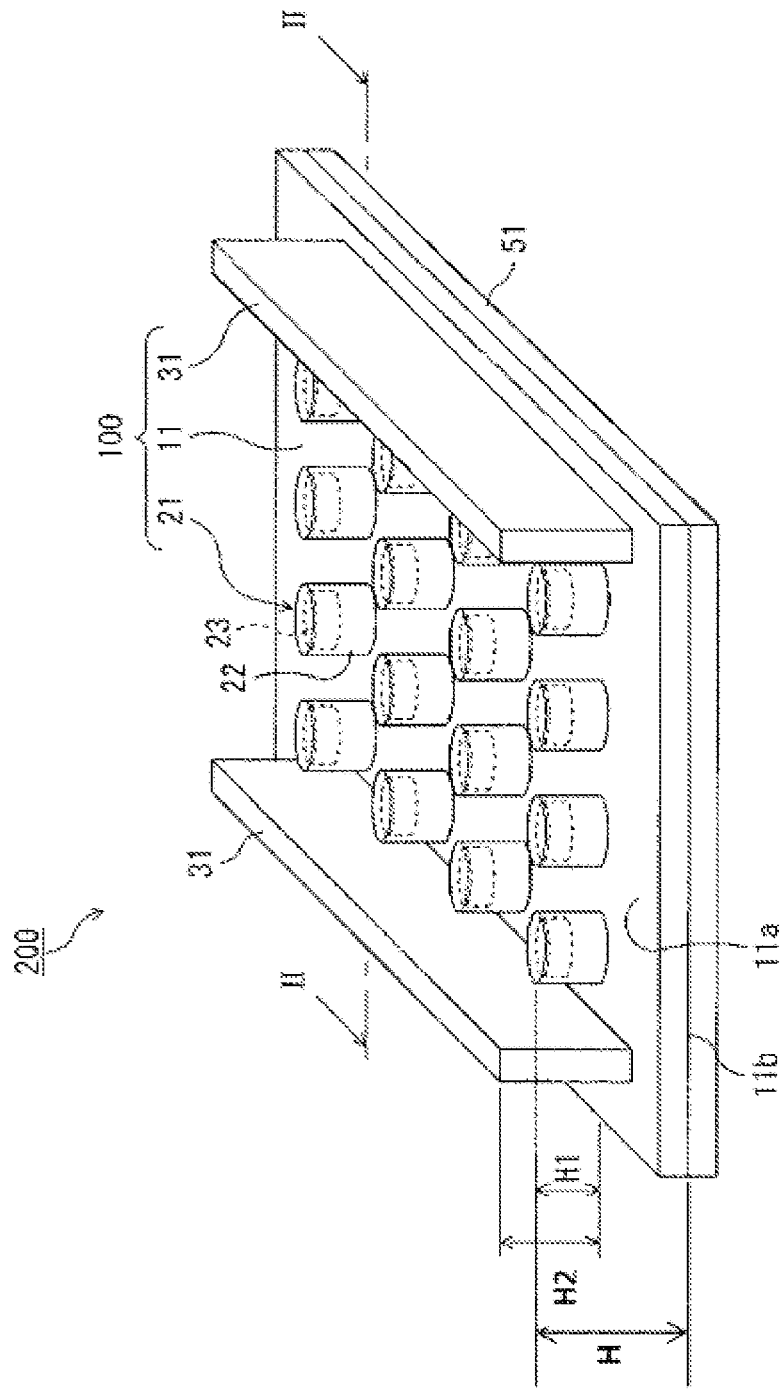
FIG. 1 is a schematic perspective view showing a sound-blocking sheet member and a sound-blocking structure according to a first embodiment.

A sound-blocking sheet member of the present invention includes at least a sheet having rubber elasticity and a plurality of resonance portions. The resonance portions are provided in contact with a sheet surface of the sheet, the weight portion is supported by the base portion and has a larger mass than the base portion, and the weight portion has a penetration portion.

In the case of obtaining the sound-blocking sheet member of the present invention by disposing weights in a plurality of cavities provided in a mold, pouring a resin material or the like into the cavities, and then curing (solidifying) the resin material or the like, the weights each have a penetration portion at the time of pouring the resin material or the like into the cavities, whereby the cavities are also filled with the resin material or the like through the penetration portions. Therefore, the filling speed of the resin material or the like becomes fast, and, compared with a case where the weight is a cylinder, it is possible to improve the manufacturability. Furthermore, it is possible to let an air remaining in the lower portions of the cavities during filling out through the penetration portions and to sufficiently fill the cavities. Therefore, it is possible to suppress the molding defect of the resonance portion, and the manufacturing stability is excellent compared with a case where the weight is a cylinder.

When the sound-blocking sheet molded in the cavities is released, a force in a shear direction is applied to the resonance portions, and there is a possibility that the weight having a cylindrical shape or the like may drop from the resonance portion or the resonance portion may break from the weight portion. In addition, even when the sound-blocking sheet is used as a sound-blocking sheet, there is a possibility that the weight may drop or the resonance portion may break from the weight portion due to vibrations. On the other hand, in the weight having the penetration portion of the present invention, the penetration portion is also filled with the resin material or the like, this portion also acts as a fixation end to the resonance portion and tends to suppress drop or breakage.

Hereinafter, each embodiment of the present invention will be described with reference to the drawings. It should be noted that each embodiment described below is an example for describing the present invention, and the present invention is not limited only to the embodiment. In addition, in the following description, unless particularly otherwise specified, positional relationships such as up, down, right, and left shall be based on the positional relationships shown in the drawings. Moreover, the dimensional ratios in the drawings are not limited to the ratios shown in the drawings. It should be noted that, in the present specification, for example, the expression of a numerical range, for example, "1 to 100" is regarded as including both the lower limit value "1" and the upper limit value "100". In addition, the above description is also true for other numerical ranges.

First Embodiment

Figure 3:
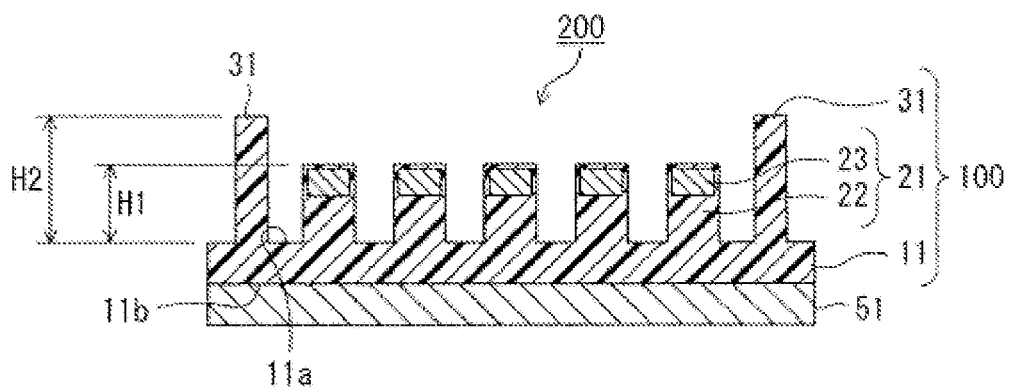
FIG. 3 is a cross-sectional view taken along a line II-II in FIG. 1.
Figure 4:
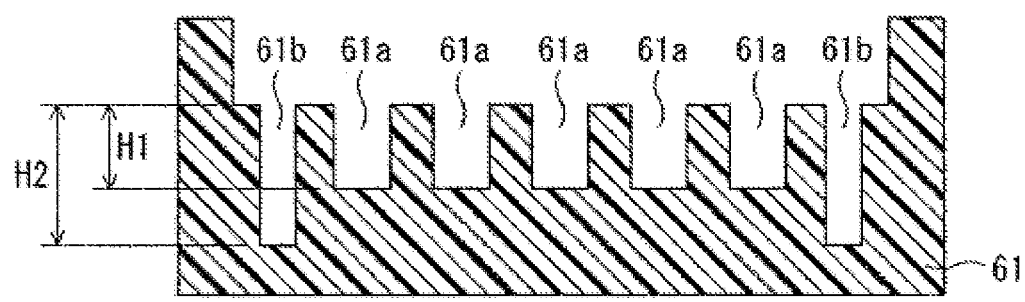
FIG. 4 is a view showing an example of a manufacturing step of the sound-blocking sheet member.
Figure 5:
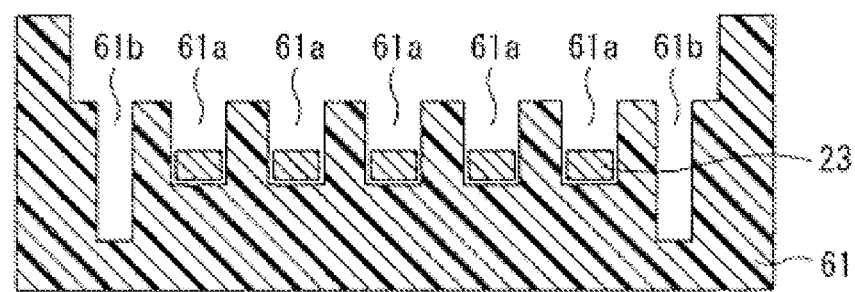
FIG. 5 is a view showing an example of a manufacturing step of the sound-blocking sheet member.
Figure 6:
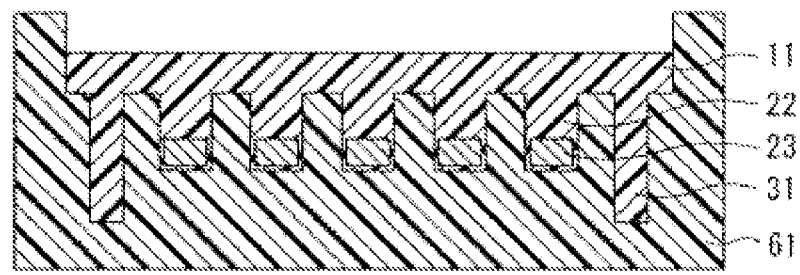
FIG. 6 is a view showing an example of a manufacturing step of the sound-blocking sheet member.
Figure 7:
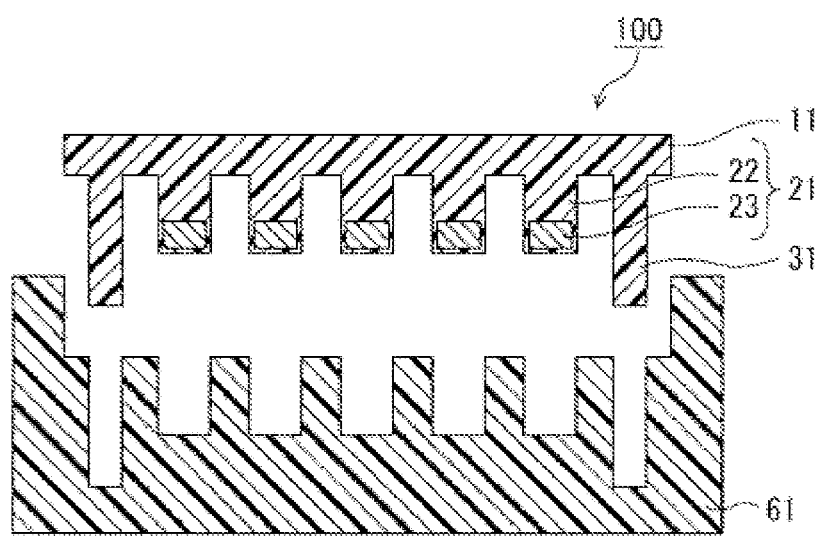
FIG. 7 is a view showing an example of a manufacturing step of the sound-blocking sheet member.

FIG. 1 and FIG. 3 are a schematic perspective view and a cross-sectional view taken along the line II-II which show a sound-blocking sheet member 100 and a sound-blocking structure 200 of the present embodiment. The sound-blocking sheet member 100 includes a sheet 11 having rubber elasticity, a plurality of resonance portions 21 provided in contact with a sheet surface 11a of the sheet 11, and at least one rib-shaped protrusion portions 31 provided on the same sheet surface 11a. The sound-blocking sheet member 100 is supported by a support 51 provided on the sheet surface 11b side of the sheet 11, whereby the sound-blocking structure 200 is configured.

In the sound-blocking sheet member 100 and the sound-blocking structure 200, for example, when a sound wave is incident from a noise source on the support 51 side, resonance occurs in the sheet 11 and/or the resonance portions 21. At this time, the presence of a frequency range in which the direction of a force acting on the support 51 and the direction of acceleration that is generated in the sheet 11 and/or the resonance portions 21 become opposite to each other becomes possible, a part or all of vibrations at specific frequencies are cancelled, and thus a complete acoustic bandgap in which the vibrations at the specific frequencies almost completely disappear is generated. Therefore, in the vicinity of the resonance frequency of the sheet 11 and/or the resonance portions 21, a part or all of vibrations come to rest, and as a result, high sound-blocking performance overwhelming the law of mass action can be obtained. A sound-blocking member that utilizes such a principle is referred to as an acoustic metamaterial. Hereinafter, each component of the sound-blocking sheet member 100 and the sound-blocking structure 200 of the present embodiment will be described in detail.

In the present invention, the maximum height from the opposite surface of the sheet surface provided with the resonance portions to the front end of the resonance portion is not particularly limited and may be appropriately adjusted depending on the application, but is preferably 30 mm or less. Furthermore, the maximum height from the opposite surface of the sheet surface provided with the resonance portions to the front end of the resonance portion is preferably 20 mm or less. The maximum height is more preferably 15 mm or less, still more preferably 10 mm or less, still more preferably 8 mm or less, far still more preferably 5 mm or less, and particularly preferably 3 mm or less. In addition, in a case where the sound-blocking sheet member 100 and the sound-blocking structure 200 are used in an application for blocking sound at high frequencies, the maximum height is preferably 1.0 mm or less. Within the above-described range, the sound-blocking sheet member 100 and the sound-blocking structure 200 have a sound-blocking function, it is possible to reduce the installation space necessary in the sound-blocking sheet member and to maintain the overall size of a small electronic device or the like as small as possible.

In addition, the lower limit is not particularly limited, but is, for example, 0.01 mm or more from the viewpoint of the easiness of manufacturing. It should be noted that the maximum height of the sound-blocking sheet member (hereinafter, referred to as the maximum height H in some cases) is the height indicated by H in FIG. 1, which shows the first embodiment, and represents the height from the sheet surface 11b of the sheet 11 to the maximum height of the resonance portion 21 in the normal direction to the sheet 11.

[Sheet]

The sheet 11 is a sheet having rubber elasticity. The sheet 11 is not particularly limited and may a sheet having rubber elasticity attributed to the molecular motion or the like of a resin (organic polymer). The sheet 11 is also capable of functioning as a vibrator (resonator) that vibrates at a certain frequency when a sound wave is incident from a noise source.

The material that configures the sheet 11 preferably contains at least one selected from the group consisting of a thermoset or photocurable elastomer and a thermoplastic elastomer.

In the case of casting using a mold or the like, it is necessary to fill a cavity on the surface of the mold with an elastomer, and thus a photocurable elastomer is preferable since the photocurable elastomer is capable of filling the cavity in a liquid state with a relatively low viscosity before curing and is capable of increasing the filling rate.

Specific examples of the material that configures the sheet 11 include thermosetting resin-based elastomers such as a vulcanized thermosetting resin-based elastomer such as chemically crosslinked natural rubber or synthetic rubber, a urethane-based thermosetting resin-based elastomer, a silicone-based thermosetting resin-based elastomer, a fluorine-based thermosetting resin-based elastomer, and an acrylic thermosetting resin-based elastomer;

photocurable elastomers such as an acrylic photocurable elastomer, a silicone-based photocurable elastomer, and an epoxy-based photocurable elastomer;

thermoplastic elastomers such as an olefin-based thermoplastic elastomer, a styrene-based thermoplastic elastomer, a vinyl chloride-based thermoplastic elastomer, a urethane-based thermoplastic elastomer, an ester-based thermoplastic elastomer, an amide-based thermoplastic elastomer, a silicone-based thermoplastic elastomer, and an acrylic thermoplastic elastomer; and the like.

Additional specific examples of the thermoset or photocurable elastomer and the thermoplastic elastomer include rubber. Specific examples thereof include natural rubber, isoprene rubber, butadiene rubber, styrene-butadiene rubber, chloroprene rubber, nitrile rubber, polyisobutylene rubber, ethylene-propylene rubber, chlorosulfonated polyethylene rubber, acrylic rubber, fluororubber, epichlorohydrin rubber, polyester rubber, urethane rubber, silicone rubber, modified bodies thereof, and the like, but are not particularly limited thereto. Among these elastomers, it is possible to use one kind of elastomer singly or two or more kinds of elastomers in combination.

Furthermore, among these, natural rubber, isoprene rubber, butadiene rubber, styrene-butadiene rubber, chloroprene rubber, nitrile rubber, polyisobutylene rubber, ethylene-propylene rubber, chlorosulfonated polyethylene rubber, acrylic rubber, fluororubber, epichlorohydrin rubber, polyester rubber, urethane rubber, silicone rubber, and modified bodies thereof are preferable, and silicone rubber, acrylic rubber, and modified bodies thereof are more preferable. When these materials are used, there is a tendency that the sheet is excellent in terms of the heat resistance or the cold resistance.

The sheet 11 may contain a variety of additives such as a flame retardant, an antioxidant, a plasticizer, and a coloring agent as long as the sheet 11 is a sheet having so-called rubber elasticity.

The flame retardant is an additive that is blended to make flammable materials not easily burn or ignite. Specific examples thereof include bromine compounds such as pentabromodiphenyl ether, octabromodiphenyl ether, decabromodiphenyl ether, tetrabromobisphenol A, hexabromocyclododecane and hexabromobenzene, phosphorus compounds such as triphenyl phosphate, chlorine compounds such as chlorinated paraffin, antimony compounds such as antimony trioxide, metal hydroxides such as aluminum hydroxide, nitrogen compounds such as melamine cyanurate, boron compounds such as sodium borate, and the like, but are not particularly limited thereto.

In addition, the antioxidant is an additive that is blended to prevent oxidation degradation. Specific examples thereof include phenol-based antioxidants, sulfur-based antioxidants, phosphorus-based antioxidants, and the like, but are not limited thereto.

Furthermore, the plasticizer is an additive that is blended to improve flexibility and weather resistance. Specific examples thereof include phthalic acid esters, adipic acid esters, trimellitic acid esters, polyesters, phosphoric acid esters, citric acid esters, sebacic acid esters, azelaic acid esters, maleic acid esters, silicone oil, mineral oil, vegetable oil, modified bodies thereof, and the like, but are not particularly limited thereto.

Moreover, examples of the coloring agent include colorants, pigments, and the like.

Among these coloring agents, it is possible to use one kind of coloring agent singly or two or more kinds of coloring agents in combination.

In the present embodiment, the sheet 11 is formed in a square shape in a plan view, but the shape is not particularly limited thereto. It is possible to adopt any shape in a plan view such as a triangular shape, an oblong shape, a rectangular shape, a trapezoidal shape, a rhombus shape, a polygonal shape such as a pentagonal shape or a hexagonal shape, a circular shape, an elliptical shape, and indefinite shapes that are not classified into the above-described shapes. It should be noted that, from the viewpoint of the improvement of expansion and contraction performance, weight reduction, or the like, the sheet 11 may have a notched portion, a punched hole, or the like at any place as long as the sheet 11 does not lose the characteristics as an acoustic metamaterial.

The thickness of the sheet 11 is not particularly limited as long as the maximum height of the sound-blocking sheet member falls within the range of the present invention. Since it is possible to control a frequency band in which high sound-blocking performance is developed depending on the thickness of the sheet 11 (acoustic bandgap width or frequency position), it is possible to appropriately set the thickness of the sheet 11 such that the acoustic bandgap matches a desired sound-blocking frequency range. When thickness of the sheet 11 is thick, there is a tendency that the acoustic bandgap width becomes narrow and shifts toward the low frequency side. In addition, when the thickness of the sheet 11 is thin, there is a tendency that the acoustic bandgap width becomes wide and shifts toward the high frequency side.

From the viewpoint of sound-blocking performance, mechanical strength, flexibility, handleability, or the like, the thickness of the sheet 11 is preferably 10 μm or more, more preferably 50 μm or more, and still more preferably 100 μm or more. In addition, the thickness of the sheet 11 is preferably 2 mm or less, more preferably 1 mm or less, and still more preferably 500 μm or less.

From the viewpoint of sound-blocking performance, mechanical strength, flexibility, handleability, productivity, or the like, the sheet 11 has a Young's modulus of preferably 0.01 MPa or more and more preferably 0.1 MPa or more and has a Young's modulus of preferably 100 MPa or less and more preferably 10 MPa or less.

Here, the Young's modulus in the present specification means the ratio between a force (stress) acting per unit cross-sectional area and the deformation rate (strain) of a sample at the time of applying an external force in a uniaxial direction and means the value of the stored longitudinal elastic modulus at 25° C. and 10 Hz measured by the forced vibration non-resonant method of JIS K 6394: 2007 "Rubber, vulcanized or thermoplastic—Determination of dynamic properties".

In addition, the sheet 11 preferably has a glass transition temperature of 0° C. or lower from the viewpoint of reducing the temperature dependence of the sound-blocking property at low temperatures. As the glass transition temperature of the sheet 11 lowers, the cold resistance is further enhanced, the temperature dependence of the elastic modulus near 0° C. becomes smaller, and there is a tendency that it becomes more difficult for the sound-blocking performance to depend on the ambient temperature. The glass transition temperature of the sheet 11 is more preferably −10° C. or lower, still more preferably −20° C. or lower, and particularly preferably −30° C. or lower. It should be noted that, in the present specification, the glass transition temperature of the sheet 11 means the peak temperature of the loss tangent in the above-described dynamic viscoelasticity measurement at a frequency of 10 Hz, particularly, the temperature dependence measurement.

[Resonance Portion]

The resonance portion 21 functions as a vibrator (resonator) that vibrates at a certain frequency when a sound wave is incident from a noise source. The resonance portion 21 of the present embodiment is formed of a composite structure including a base portion 22 and a weight portion 23 that is supported by the base portion 22 and has a larger mass than the base portion 22. The resonance portion 21 effectively functions as a resonator having a resonance frequency that is determined by the mass of the weight portion 23 acting as a weight and the spring constant of the base portion 22 acting as a spring.

The array, number, size, and the like of the resonance portions 21 can be appropriately set depending on desired performance and are not particularly limited. The resonance portions 21 are provided in contact with at least one sheet surface of the sheet. For example, in the present embodiment, a plurality of the resonance portions 21 are disposed in a grid shape at equal intervals, but the array of the resonance portions 21 is not particularly limited thereto. For example, the plurality of resonance portions 21 may be disposed in, for example, a zigzag shape or may be randomly disposed. Since the sound-blocking mechanism by the present sheet does not utilize Bragg scattering, which is utilized in so-called phononic crystals, the intervals between the resonance portions 21 may not be regularly and periodically disposed at all times.

In addition, the number of the resonance portions 21 installed per unit area is not particularly limited as long as the resonance portions 21 can be disposed so as not to interfere with each other by coming into contact with each other or the like.

The maximum number of the resonance portions 21 per unit area varies depending on the shape or the like of the resonance portion 21. For example, in a case where the resonance portion 21 has a cylindrical shape, the height direction of the cylinder is installed parallel to the sheet normal direction, and the cross-sectional diameter of the cylinder is 1 cm, the maximum number is preferably 100 or less per 10 $cm^2$.

For example, in a case where the resonance portion 21 has a cylindrical shape, the height direction of the cylinder is installed parallel to the sheet normal direction, and the cross-sectional diameter is 1 cm, the minimum number of the resonance portions 21 per unit area is preferably 2 or more, more preferably 10 or more, and still more preferably 50 or more per 10 $cm^2$. When the number of the resonance portions 21 installed is equal to or more than the above-described preferable lower limit, there is a tendency that higher sound-blocking performance can be obtained. In addition, when the number of the resonance portions 21 installed is equal to or less than the above-described preferable upper limit, it becomes easy to reduce the weight of the entire sheet.

The maximum height H1 of the resonance portion 21 in the normal direction to the sheet 11 can be appropriately set depending on desired performance and is not particularly limited. From the viewpoint of the easiness of molding and the improvement of productivity, the maximum height H1 is preferably 10 lam or more, more preferably 100 µm or more, and still more preferably 1 mm or more. In addition, the maximum height H1 is preferably 20 mm or less, more preferably 15 mm or less, still more preferably 10 mm or less, still more preferably 8 mm or less, far still more preferably 5 mm or less, and particularly preferably 3 mm or less. When the maximum height H1 is set within the above-described preferable numerical range, the sheet 11 provided with the resonance portions 21 (that is, the sound-blocking sheet member 100) is easily wound or laminated and can be manufactured by a so-called roll-to-roll method or stored in a roll shape, and there is a tendency that the productivity and the economic efficiency are enhanced.

In addition, the heights of all of the resonance portions 21 in the normal direction of the sheet 11 may not be the same and may be different. When the heights of the resonance portions are different, there is a case where an effect of expanding a frequency range in which sound-blocking performance appears can be obtained.

[Base Portion]

In the present embodiment, a plurality of base portions 22 having a substantially cylindrical outer shape are provided in contact with the sheet surface 11a of the sheet 11, and the weight portions 23 are each buried inside the base portions 22. The outer shape of the base portion 22 is not particularly limited, and it is possible to adopt an any shape such as a triangular columnar shape, a rectangular columnar shape, a trapezoidal columnar shape, a polygonal columnar shape such as a pentagonal column or a hexagonal column, a cylindrical columnar shape, an elliptical columnar shape, a truncated pyramid shape, a truncated cone shape, a prismatic shape, a conical shape, a hollow tubular shape, a branched shape, or an indefinite shape that is not classified into the above-described shapes. In addition, it is also possible to form the base portion 22 in a columnar shape having a cross-sectional area and/or cross-sectional shape that varies depending on the height position of the base portion 22.

In addition, the shapes or heights of a plurality of the base portions provided in contact with the sheet surface 11a may be identical or different.

The material of the base portion 22 is not particularly limited as long as the above-described required characteristics are satisfied. Examples thereof include resin materials and include at least one selected from the group consisting of a thermoset or photocurable elastomer, a thermoplastic elastomer, a thermosetting or photocurable resin, and a thermoplastic resin.

Examples of the thermoset or photocurable elastomer and the thermoplastic elastomer include those exemplified in the section of the sheet.

Examples of the thermosetting or photocurable resin include acrylic thermosetting resins, urethane-based thermosetting resins, silicone-based thermosetting resins, epoxy-based thermosetting resins, and the like. Examples of the thermoplastic resin include polyolefin-based thermoplastic resins, polyester-based thermoplastic resins, acrylic thermoplastic resins, urethane-based thermoplastic resins, polycarbonate-based thermoplastic resins, and the like.

Specific examples thereof include rubbers such as vulcanized rubber such as chemically crosslinked natural rubber or synthetic rubber, isoprene rubber, butadiene rubber, styrene-butadiene rubber, chloroprene rubber, nitrile rubber, polyisobutylene rubber, ethylene-propylene rubber, chlorosulfonated polyethylene rubber, acrylic rubber, fluororubber, epichlorohydrin rubber, polyester rubber, urethane rubber, silicone rubber, and modified bodies thereof; polymers such as polyacrylonitrile, polyethylene terephthalate, polybutylene terephthalate, polyvinyl chloride, polychlorotrifluoroethylene, polyethylene, polypropylene, polynorbornene, polyether ether ketone, polyphenylene sulfide, polyarylate, polycarbonate, polystyrene, epoxy resins, and oxazine resins; and the like, but are not particularly limited thereto. Among these resin materials, it is possible to use one kind of resin material singly or two or more kinds of resin materials in combination.

In addition, the base portion 22 may be a porous body including pores (gas such as air) in the resin material. Furthermore, the base portion 22 may include a liquid material such as mineral oil, vegetable oil, or silicone oil. It should be noted that, in a case where the base portion 22 includes a liquid material, the liquid material is desirably contained in the resin material from the viewpoint of suppressing the outflow of the liquid material to the outside.

Among these, the material of the base portion 22 is preferably the same material as the sheet 11 and particularly preferably an elastomer. When the sheet 11 and the base portions 22 contain the same elastomer, the integral molding of the sheet 11 and the base portions 22 becomes easy, and the productivity is significantly enhanced. That is, one of particularly preferable aspects is an integrally molded product in which the sheet 11 and the resonance portions 21 (base portions 22) both contain at least one selected from the group consisting of a thermoset or photocurable elastomer and a thermoplastic elastomer.

Specific examples of the elastomer include vulcanized rubber such as chemically crosslinked natural rubber or synthetic rubber, isoprene rubber, butadiene rubber, styrene-butadiene rubber, chloroprene rubber, nitrite rubber, polyisobutylene rubber, ethylene-propylene rubber, chlorosulfonated polyethylene rubber, acrylic rubber, fluororubber, epichlorohydrin rubber, polyester rubber, urethane rubber, silicone rubber, and modified bodies thereof, polyacrylonitrile, polyethylene terephthalate, polybutylene terephthalate, polyvinyl chloride, polychlorotrifluoroethylene, polyethylene, polypropylene, polynorbornene, polyether ether ketone, polyphenylene sulfide, polyarylate, polycarbonate, polystyrene, epoxy resins, and oxazine resins, and the like, but are not particularly limited thereto.

Among these, natural rubber, isoprene rubber, butadiene rubber, styrene-butadiene rubber, chloroprene rubber, nitrile rubber, polyisobutylene rubber, ethylene-propylene rubber, chlorosulfonated polyethylene rubber, acrylic rubber, fluororubber, epichlorohydrin rubber, polyester rubber, urethane rubber, silicone rubber, and modified bodies thereof are preferable, and silicone rubber, acrylic rubber, and modified bodies thereof are more preferable from the viewpoint of excellent heat resistance or cold resistance or the like.

It should be noted that it is also possible to produce the base portion 22 as a two-color molded product or a multicolor molded product made of two or more kinds of resin materials. In this case, when the same elastomer as the above-described sheet 11 is adopted for the base portions 22 on the side in contact with the sheet 11, the integral molding of the sheet 11 and the base portions 22 becomes easy.

It should be noted that, in a case where the resonance portions 21 (base portions 22) having a circular cross-sectional shape are provided as in the present embodiment, in a cross section parallel to the sheet surface 11a of the sheet 11 at a height position of the resonance portion 21 (base portion 22) at which the total of the cross-sectional areas of the plurality of resonance portions 21 (base portions 22) is maximized, the diameter of the circle having the largest diameter among the circles (circular cross sections) that are included in the cross section is preferably 100 mm or less, more preferably 50 mm or less, and still more preferably 20 mm or less. In addition, the diameter of the circle having the smallest diameter is preferably 10 μm or more, more preferably 100 μm or more, and still more preferably 1 mm or more. When the diameters are set within the above preferable numerical ranges, it is possible to secure a predetermined number or more of the resonance portions 21 (base portions 22) that are installed on the sheet surface 11a of the sheet 11 and to obtain more favorable sound-blocking performance, and there is also a tendency that the easiness of molding and the productivity are further enhanced.

[Weight Portion]

The weight portion 23 is covered with the base portion 22, which is a resin material, in a state of sticking or adhering to the base portion 22 (being in contact with the base portion 22). As described below, the sound-blocking sheet member 100 is formed by installing the weight portions 23 in the cavities of a mold, pouring a resin material into the mold, and curing the resin material. Therefore, the weight portion 23 is configured such that the surface on the sheet side, the surface on the outer peripheral portion side, the surface inside a penetration portion, and the surface on the resonance portion front end side of the weight portion 23 are covered with the base portion in a state of adhering to the base portion. In other words, the base portion 22 is a molded product that is molded in contact with the surface on the resonance portion front end side of the weight portion 23 and covers the weight portion 23. The base portion covers the surface on the resonance portion front end side of the weight portion, whereby it is possible to make the weight portion not easily drop due to an anchoring effect. The coating ratio of the surface on the resonance portion front end side of the weight portion with the base portion (the ratio of the area covered with the base portion in a state of adhering to the weight portion to the area of the surface on the resonance portion front end side) is preferably 80% or more and particularly preferably 100%.

The weight portion 23 is not particularly limited as long as the weight portion 23 has a penetration portion and has a larger mass than the above-described base portion 22. The weight having the penetration portion will be described with drawings.

Figure 2A:
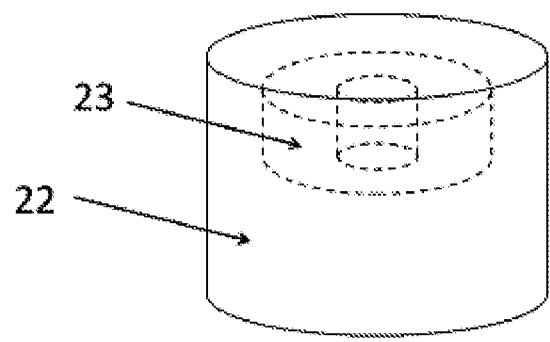
FIG. 2A is a schematic perspective view showing a resonance portion including a base portion 22 and a weight portion 23.
Figure 2B:
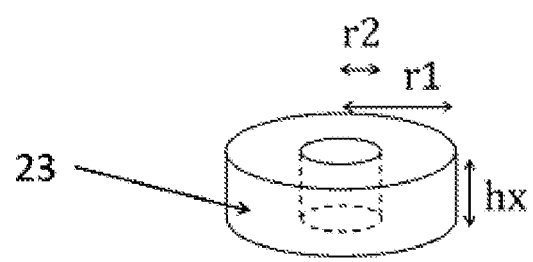
FIG. 2B is a schematic perspective view showing the weight portion 23.

FIG. 2A shows the resonance portion including the base portion 22 and the weight portion 23, and FIG. 2B shows the weight portion 23. As shown in FIG. 2A, the outer peripheral portion and the inside of the penetration portion of the weight portion 23 are filled with the resin. The weight portion 23 has the penetration portion, whereby the resin does not only reach the outer peripheral portion side of the weight portion but also passes through the inside of the penetration portion to reach the surface on the resonance portion front end side of the weight portion. Therefore, it is easy to fill the outer peripheral portion and the inside of the penetration portion with the resin, and, even in a case where an air bubble is generated, it is possible to let the air bubble out and to improve the coating ratio.

In the present invention, the weight having the penetration portion refers to a weight having a penetration portion as shown in FIG. 2B, and examples thereof include a donut, a washer, a nut, and the like. Since a washer and a nut are general-purpose products that are widely used even in other applications, when a washer or a nut is used as the weight portion 23, it is possible to realize significant cost reduction. In addition, since a nut has a groove, which is to engage with a screw, formed on the inner wall of a through-hole, this groove is filled with the resin, whereby it is possible to obtain an additional effect of making the weight portion not easily drop.

The shape of the weight is not particularly limited, but is preferably a plate shape from the viewpoint of the adjustment of sound-blocking performance and thickness reduction. When the weight portion has a plate shape, it becomes possible to place the center of gravity of the weight at a position away from the substrate compared with a case where the weight is a sphere or the like, and there is a tendency that it is possible to increase the vibration moment of the resonance portion. For example, in a case where the acoustic bandgap width is set to be constant, it becomes possible to thin the weight having a plate shape of the present invention compared with a case where the weight is a sphere or the like. On the other hand, in a case where the height of the weight is set to be constant, it becomes possible for the weight having a plate shape of the present invention to obtain a wide bandgap width compared with a case where the weight is a sphere or the like. The penetration portion may be a through-hole as shown in FIG. 2B or may not be a hole. In a case where the penetration portion is not a hole, examples of the penetration portion include a penetration portion having a "C shape" in which a part of an annular portion in the circumferential direction is separated as in a spring washer.

It should be noted that FIG. 1, FIG. 3 to FIG. 8 do not show the penetration portion of the weight portion 23, but the weight portion 23 has the penetration portion as shown in FIGS. 2 and 3.

In the present embodiment, the weight portion is formed in a substantially circular shape in which the outer diameter of the weight is smaller than that of the base portion 22 and is buried in the base portion 22 on the front end side of the resonance portion 21. As described above, since a configuration in which the weight portion 23 acting as a weight of a resonator is supported by the base portion 22 that determines the spring constant is adopted, it is possible to easily control the resonance frequency of the resonance portion 21 by, for example, adjusting the spring constant through a change in the shape or material (elastic modulus or mass) of the base portion 22 or changing the mass of the weight portion 23. Ordinarily, as the elastic modulus of the base portion 22 decreases, there is a tendency that the acoustic bandgap shifts toward the low frequency side. In addition, as the mass of the weight portion 23 increases, there is a tendency that the acoustic bandgap shifts toward the low frequency side.

In FIG. 2B, hx represents the height of the weight, r1 represents the outer diameter of the weight, and r2 represents the diameter (inner diameter) of the penetration portion.

The height (hx) of the weight is not particularly limited, but is preferably 0.95 or less and more preferably 0.9 or less in a case where the height of the resonance portion is set to 1. In addition, the height (hx) is preferably 0.2 or more and more preferably 0.3 or more. When the height (hx) is within these ranges, there is a tendency that it is possible to obtain a wide bandgap width while suppressing the height of the sound-blocking sheet member.

The outer diameter (r1) of the weight is not particularly limited. In a case where the resonance portion has a circular cross-sectional shape, there is a tendency that the sound-blocking performance is excellent when the outer diameter (r1) is approximately the diameter of the circular cross-sectional shape. While not particularly limited, the maximum value of r1 is preferably 100 mm or less, more preferably 50 mm or less, and still more preferably 20 mm or less. In addition, the minimum value of r1 is preferably 10 μm or more, more preferably 100 μm or more, and still more preferably 1 mm or more. When the maximum value and the minimum value are within the above-described preferable numerical ranges, it is possible to obtain favorable sound-blocking performance, and there is a tendency that the easiness of molding and the productivity are further enhanced.

The weight may be buried in the resonance portion or may be exposed. In the weight having the penetration portion of the present invention, even the penetration portion of the weight is filled with the resin material or the like, and even this portion acts as a fixation end to the resonance portion. Therefore, even when the weight is exposed, it is possible to suppress the dropping or breakage of the weight.

The inner diameter (r2) of the weight is not particularly limited. The maximum value of r2 is not particularly limited as long as the maximum value of r2 is smaller than the outer diameter (r1), but the maximum value of r2 is preferably 90 mm or less, more preferably 40 mm or less, still more preferably 20 mm or less, and particularly preferably 10 mm or less. In addition, the minimum value of r2 is preferably 2 μm or more, more preferably 50 μm or more, and still more preferably 80 pin or more. When the maximum value and the minimum value are within the above-described preferable numerical ranges, there is a tendency that it becomes easy to fill the penetration portion with the resin material or the like.

In addition, the ratio between the outer diameter and the inner diameter of the weight is not particularly limited.

The material that configures the weight portion 23 may be appropriately selected in consideration of mass, cost, or the like, and the kind thereof is not particularly limited. From the viewpoint of the size reduction and the improvement of sound-blocking performance of the sound-blocking sheet member 100 and the sound-blocking structure 200, the material that configures the weight portion 23 is preferably a material having a high specific gravity.

Specific examples thereof include metals or alloys such as aluminum, stainless steel, iron, tungsten, gold, silver, copper, lead, zinc, and brass; inorganic glass such as soda glass, quartz glass, and lead glass; composites containing the powder of these metals or alloys, these inorganic glasses, or the like in the resin material of the above-described base portion 22; and the like, but the material is not particularly limited thereto. The material, mass, and specific gravity of the weight portion 23 may be determined such that the sound-blocking sheet member 100 and the sound-blocking structure 200 acoustic bandgap matches a desired sound-blocking frequency range.

Among these, at least one selected from the group consisting of metal, alloy, and inorganic glass is preferable from the viewpoint of a low cost, a high specific gravity, or the like. It should be noted that the specific gravity means the ratio between the mass of a material and the mass of an equal volume of pure water at a pressure of 1013.25 hPa and 4° C., and, in the present specification, a value measured by JIS K 0061 "Test methods for density and relative density of chemical products" is used.

On the surface (also including the penetration portion) of the weight portion 23, a surface treatment may be performed in order to enhance process suitability or member strength.

For example, it is conceivable to perform a chemical treatment with a solvent or the like for enhancing the sticking property to the base portion 22 or to perform a physical treatment that increases the member strength by providing a protrusion and a recess on the surface, but the method for the surface treatment is not particularly limited.

In the present embodiment, the weight portion 23 is buried in the base portion 22 at the front end side of the resonance portion 21, but the installation position thereof is not particularly limited thereto. While depending on the shapes, masses, elastic moduli, and the like of the base portion 22 and the weight portion 23, the base portion 22 and the weight portion 23 are preferably disposed such that the center of gravity (mass center) of the resonance portion 21 is positioned at least on the front end side of the center of the resonance portion 21 in the height direction from the viewpoint of the thickness reduction, weight reduction, or sound-blocking performance improvement of the sound-blocking sheet member. Typically, the weight portion 23 may be offset-disposed on the front end side of the center of the resonance portion 21 in the height direction.

It should be noted that the weight portion 23 may be buried completely or only partially in the base portion 22 or may be provided on the base portion 22 without being buried in the base portion 22. In addition, in a case where the base portion 22 has a branched structure, from the viewpoint of the weight reduction or sound-blocking performance improvement of the sound-blocking sheet member, the weight portion 23 is preferably disposed so as to be positioned on the front end side of the center of a branch portion provided from a branch point in a case where the weight portion is provided at the branch portion.

Furthermore, the shapes and heights of the plurality of weight portions 23 included in the sound-blocking sheet member may be identical or different.

It should be noted that, while the plurality of resonance portions 21 are provided on the sheet surface 11a of the sheet 11, the material that configures the resonance portion 21, the array, shape, and size of the resonance portion 21, the installation direction of the resonance portion 21, and the like may not be identical at all times in all of the plurality of resonance portions 21. When a plurality of kinds of the resonance portions 21 that are different in at least one of the above-described properties are installed, it is possible to expand the frequency range in which high sound-blocking performance appears.

[Protrusion Portion]

The sound-blocking sheet member of the present invention may have other protrusion portions in addition to the resonance portions. For example, the sound-blocking sheet member may have a rib-shaped protrusion portion or the like.

In the present embodiment, rib-shaped protrusion portions 31 are each molded in a substantially plate-like outer shape so as to extend in the length direction (sheet flow direction or MD direction) of the sheet 11. The rib-shaped protrusion portions 31 are each provided on the sheet surface 11a of the sheet 11, more specifically, at two places in the edge portions of the sheet 11 in the width direction (direction perpendicular to sheet flow direction or TD direction).

The rib-shaped protrusion portion 31 has a maximum height H2 higher than the maximum height H1 of the above-described resonance portion 21 in the normal direction of the sheet 11. Therefore, even when the sound-blocking sheet member 100 is wound in a sheet shape or a plurality of the sound-blocking sheet members 100 are laminated, the rib-shaped protrusion portions 31 function as a spacer, and thus the contact of the resonance portions 21 with the rear surface of the sheet 11 is suppressed. Therefore, the provision of the rib-shaped protrusion portions 31 facilitates the manufacturing by a roll-to-roll method and storage of the sound-blocking sheet member 100 without causing any manufacturing trouble such as the deformation, variation, cracking, dropping, breakage, or the like of the resonance portion 21. In addition, the rib-shaped protrusion portion is also capable of functioning as a vibrator (resonator) that vibrates at a certain frequency when a sound wave is incident from a noise source.

The shape of the protrusion portion is also not particularly limited, and, in the case of being caused to function as a spacer, the protrusion portion may be higher than the maximum height H1 of the resonance portion 21. In addition, in a case where the protrusion portions are caused to function as a vibrator, it is possible to adjust the positions, number, and heights of the protrusion portions provided in accordance with a frequency range to be adjusted.

It should be noted that the maximum height H2 of the rib-shaped protrusion portion 31 may be higher than the maximum height H1 of the resonance portion 21 and is not particularly limited. From the viewpoint of the easiness of molding and the improvement of productivity, the maximum height H2 is preferably 50 μm or more, more preferably 100 μm or more, and still more preferably 1 mm or more. In addition, the maximum height H2 is preferably 20 mm or less, more preferably 15 mm or less, still more preferably 10 mm or less, far still more preferably 5 mm or less, and particularly preferably 3 mm or less.

The shape and installation positions of the rib-shaped protrusion portions 31 are not particularly limited as long as the rib-shaped protrusion portions 31 are installed so as not to interfere with the resonance portions 21 acting as a resonator. For example, the outer shape of the rib-shaped protrusion portion 31 is not particularly limited, and it is possible to adopt any shape such as a triangular columnar shape, a rectangular columnar shape, a trapezoidal columnar shape, a polygonal columnar shape such as a pentagonal column or a hexagonal column, a cylindrical columnar shape, an elliptical columnar shape, a truncated pyramid shape, a truncated cone shape, a prismatic shape, a conical shape, a hollow tubular shape, or an indefinite shape that is not classified into the above-described shapes. In addition, it is also possible to form the rib-shaped protrusion portion 31 in a columnar shape having a cross-sectional area and/or cross-sectional shape (at least one of the cross-sectional area and the cross-sectional shape) that varies depending on the height position of the rib-shaped protrusion portion 31. Furthermore, the maximum length of the rib-shaped protrusion portion 31 in the length direction of the sheet 11 is not particularly limited as long as the maximum length is equal to or less than the maximum length in the MD direction of the sheet.

It should be noted that, in the present embodiment, a pair of the rib-shaped protrusion portions 31 extending in the length direction of the sheet 11 is adopted, but a plurality of the rib-shaped protrusion portions 31 having a shorter maximum length than the above-described rib-shaped protrusions may be disposed apart along the length direction of the sheet 11. At this time, the disposedisposition interval between the individual rib-shaped protrusion portions 31 may be periodic or random. In the case of disposing the plurality of rib-shaped protrusion portions 31 apart as described above, the distance between the individual rib-shaped protrusion portions 31 is not particularly limited, but is preferably 100 mm or less, more preferably 50 mm or less, and still more preferably 20 mm or less.

The material that configures the rib-shaped protrusion portion 31 is not particularly limited, but is preferably the same resin material as the sheet 11 and/or the resonance portion 21 (base portion 22) and more preferably the same elastomer as the sheet 11 and the resonance portion 21 (base portion 22). When the same resin material as the sheet 11 and/or the base portion 22 is adopted, the integral molding with the sheet 11 and/or the resonance portion 21 (base portion 22) becomes easy, and the productivity is significantly enhanced.

[Support]

The sound-blocking sheet member of the present invention can be appropriately installed in accordance to an environment in which the sound-blocking performance is developed. For example, the sound-blocking sheet member may be installed directly on a device, a structure, or the like. Between the sound-blocking sheet member and the device, the structure, or the like, an adhesive layer or the like may be provided. In addition, the sound-blocking sheet member may be used in a form of being supported by the support.

The support may support the sound-blocking sheet member at the time of blocking sound using the sound-blocking sheet member of the present invention, and the sound-blocking sheet member may not be supported by the support during manufacturing, storage, or the like.

The support may be provided in contact with at least one surface of the sheet of the sound-blocking sheet member and may be provided on the sheet surface on which the resonance portions are provided in contact with the sheet surface and/or may be provided on the other surface of the sheet surface on which the resonance portions are provided in contact with the other surface.

In the present embodiment, the support 51 is provided on the sheet surface 11b side on the rear side of the sheet 11. The material that configures the support 51 is not particularly limited as long as the material is capable of supporting the sheet 11, but is preferably a material having higher stiffness than the sheet 11 from the viewpoint of enhancing the sound-blocking performance. Specifically, the support 51 preferably has a Young's modulus of 1 GPa or more and more preferably has a Young's modulus of 1.5 GPa or more. The upper limit is not particularly limited and is, for example, 1000 GPa or less.

In addition, in a case where the sound-blocking sheet member is installed directly on a device, a structure, or the like, the surface on which the sound-blocking sheet member is installed preferably has the same stiffness as the support from the viewpoint of supporting the sheet, the viewpoint of enhancing the sound-blocking performance, or the like.

The material that configures the support 51 is not particularly limited. Examples thereof include a photocurable resin sheet, a thermosetting resin sheet, a thermoplastic resin sheet, a metal plate, an alloy plate, and the like. Examples of the photocurable resin sheet, the thermosetting resin sheet, and the thermoplastic resin sheet include sheets and the like for which the photocurable resin, the thermosetting resin, and the thermoplastic resin exemplified in the section of the base portion are used.

Specific examples of the material that configures the support 51 include, for example, polyester resins such as polyethylene terephthalate, polybutylene terephthalate, polyethylene naphthalate, and polybutylene succinate, poly(meth)acrylate resins such as polymethylmethacrylate, polycarbonate resins such as polycarbonate containing isosorbide as a main raw material, polyolefin resins such as polyethylene, polypropylene, and polynorbornene, organic materials such as vinyl chloride resins, polyacrylonitrile, polyvinylidene chloride, polyether sulfone, polyphenylene sulfide, polyarylate, polyamide, polyimide, triacetyl cellulose, polystyrene, epoxy resins, and oxazine resins, composite materials containing metal such as aluminum, stainless steel, iron, copper, zinc, or brass, inorganic glass, inorganic particles, or a fiber in the organic material, and the like.

Among these, the support is preferably at least one kind selected from the group consisting of a photocurable resin sheet, a thermosetting resin sheet, a thermoplastic resin sheet, a metal plate, and an alloy plate from the viewpoint of sound-blocking property, stiffness, moldability, cost, and the like. Here, the thickness of the support 51 is not particularly limited, but is, usually, preferably 0.05 mm or more and 0.5 mm or less from the viewpoint of sound-blocking performance, stiffness, moldability, weight reduction, cost, and the like.

Furthermore, the support 51 may have a coating layer provided on the surface of the support 51 from the viewpoint of light permeability, a sticking property to the sound-blocking sheet member, or the like.

It should be noted that the shape of the support 51 can be appropriately set depending on the installation surface of the sound-blocking structure 200 and is not particularly limited. For example, the shape of the support 51 may be a flat sheet shape, a curved sheet shape, or a special shape processed so as to have a curved surface portion, a folded portion, or the like. Furthermore, from the viewpoint of weight reduction or the like, a notch, a punched portion, or the like may be provided at any place in the support 51.

In addition, the surface density (mass per unit area) of the support 51 can be appropriately set depending on desired performance and is not particularly limited. From the viewpoint of enhancing the effect of the present invention, the surface density of the support 51 is preferably 80% or less, more preferably 30% or less, and still more preferably 10% or less of the surface density of the sound-blocking sheet member 100.

Second Embodiment

Figure 8:
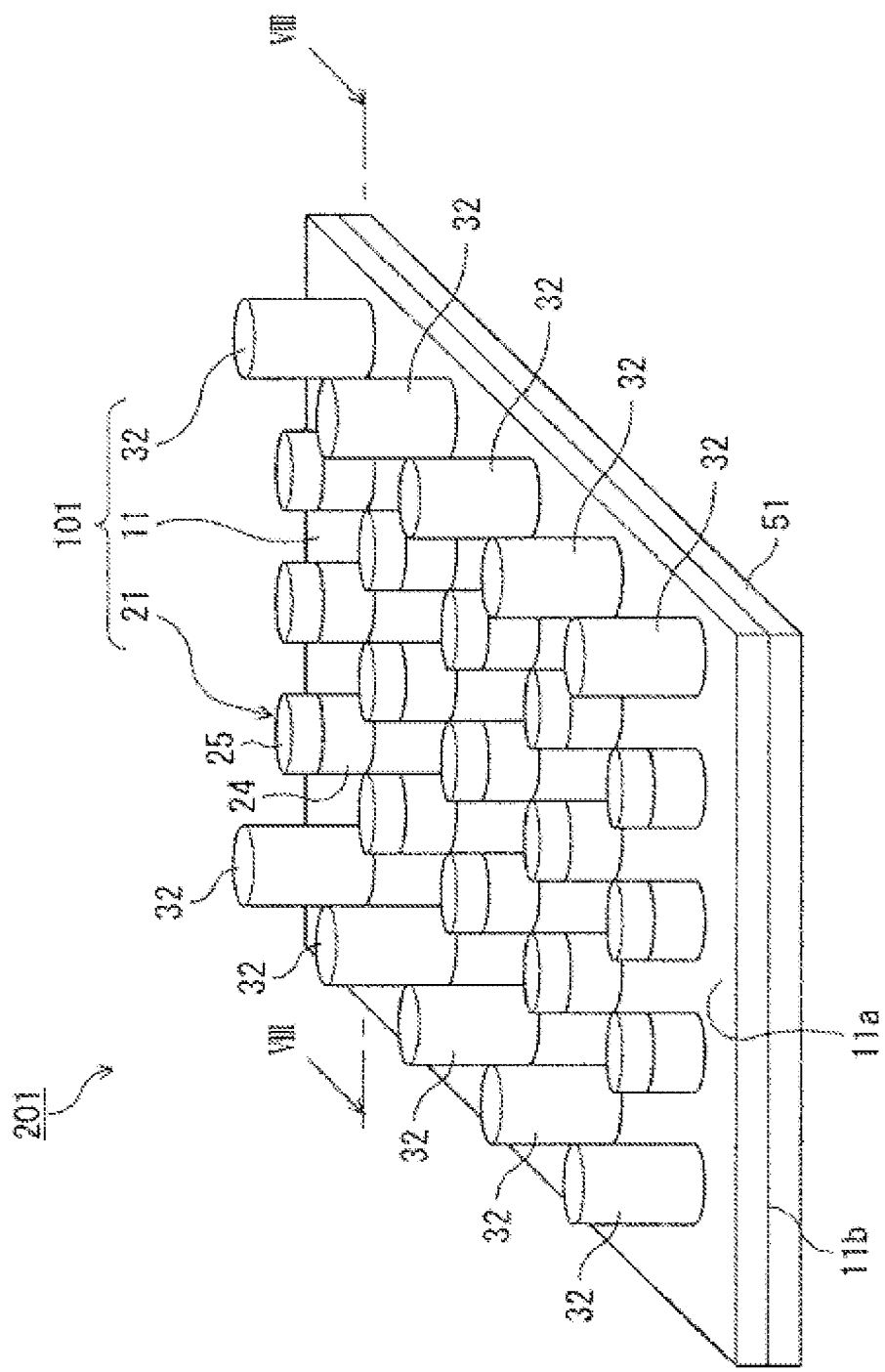
FIG. 8 is a schematic perspective view showing a sound-blocking sheet member and a sound-blocking structure according to a second embodiment.

FIG. 8 is a schematic perspective view showing a sound-blocking sheet member 101 and a sound-blocking structure 201 of the present embodiment and a cross-sectional view thereof taken along the arrow. In the present embodiment, since the sound-blocking sheet member 101 and the sound-blocking structure 201 have the same configurations as the sound-blocking sheet member 100 and the sound-blocking structure 200 of the first embodiment described above except the fact that the number of the resonance portions installed, the shapes of the base portion and the weight portion, and the shape and number of the rib-shaped protrusion portions installed are different, duplicate description will not be made.

The resonance portion 21 of the present embodiment is formed of a composite structure including a base portion 24 and a weight portion 25 that is supported by the base portion 24 and has a larger mass than the base portion 24. In the present embodiment as well, a plurality of the base portions 24 having a substantially cylindrical outer shape are provided in contact with the sheet surface 11a of the sheet 11.

Rib-shaped protrusion portions 32 of the present embodiment are molded in a substantially cylindrical outer shape, and the individual rib-shaped protrusion portions 32 are disposed apart so as to form individual rows along the length direction (sheet flow direction or MD direction) of the sheet 11 at the edge portions of the sheet 11 in the width direction (direction perpendicular to sheet flow direction or TD direction).

In the present embodiment as well, the same action and effect as in the above-described first embodiment is exhibited. In addition to that, in the present embodiment, since the plurality of rib-shaped protrusion portions 32 are disposed apart so as to form rows, the followability (flexibility) of the sound-blocking sheet member 101 is further enhanced. Therefore, even for a target attachment surface having a more complicated shape, the stretchable flexible sheet 11 is capable of following the surface shape of the target attachment surface, and as a result, it is possible to stably mount the sheet 11 on the support 51.

[Manufacturing Method]

A method for manufacturing the sound-blocking sheet member and the sound-blocking structure of the present invention is not particularly limited. Examples thereof include the following manufacturing methods 1 to 4.

The shape of a cavity used in each manufacturing method is not particularly limited, and, for example, as the shape of the bottom, it is possible to appropriately select a hemispherical shape, a planar shape, a protrusion shape, a recess shape, or the like.

(Manufacturing method 1)

The manufacturing method 1 may include the following steps (1) to (3).

(1) A step of preparing a mold having a plurality of cavities and pouring a resin material into the cavities.
(2) A step of curing the poured resin material.
(3) A step of peeling the obtained cured product from the mold.

In the manufacturing method 1, after the step (2) or (3), a step of providing a support in a shape of the obtained cured product may also be provided.

(Manufacturing Method 2)

The manufacturing method 2 may include the following steps (4) to (7).

(4) A step of preparing a mold having a plurality of cavities and disposing weights in the plurality of cavities provided in the mold.
(5) A step of pouring a resin material into the cavities.
(6) A step of curing the poured resin material.
(7) A step of peeling the obtained cured product from the mold.

In the manufacturing method 2, after the step (6) or (7), a step of providing a support in a shape of the obtained cured product may also be provided.

(Manufacturing Method 3)

The manufacturing method 3 may include the following steps (8) to (11).

(8) A step of applying a photocurable elastomer precursor or a photocurable resin precursor to a mold having a plurality of cavities.
(9) A step of laminating a substrate on the elastomer precursor or resin precursor flattened on a mold.
(10) A step of filling the cavities with the elastomer precursor or the resin precursor by pressurizing the laminate of a support and the mold from the substrate side with a pressurization roll.
(11) A step of irradiating light from the substrate side to cure the elastomer precursor or the resin precursor in which the cavity shape of the mold is transferred and formed and to polymerize and adhere the cured product of the elastomer precursor or the resin precursor to the substrate.
(12) (11) A step of peeling a product obtained by adhering the cured product of the elastomer precursor or resin precursor and the substrate from the mold.

(Manufacturing Method 4)

The manufacturing method 4 may include the following steps (13) to (15).

(13) A step of, while making a substrate to travel in the rotating direction of a roll mold having an outer peripheral surface in which a plurality of cavities are arrayed along the outer peripheral surface of the roll mold by rotating the roll mold, applying a photocurable elastomer precursor or a photocurable resin precursor to the outer peripheral surface of the roll mold and filling the cavities with the elastomer precursor or resin precursor.
(14) A step of irradiating a region between the outer peripheral surface of the roll mold and the substrate with light in a state in which the elastomer precursor or resin precursor is sandwiched between the outer peripheral surface of the roll mold and the substrate.
(15) A step of peeling a substance to which a cured product of the elastomer precursor or resin precursor obtained in the step (14) and the substrate adhered from the roll mold.

In the steps (10) and (11) of the manufacturing method 3 and the steps (13) and (14) of the manufacturing method 4, it is possible to form a sound-blocking sheet member having a resonance portion and a sheet.

The substrate that is used in the manufacturing methods 3 and 4 is not particularly limited. The sound-blocking sheet member formed on the substrate may be used as it is or may be used after the substrate is peeled.

After the step (11) or (12) of the manufacturing method 3 and the step (14) or (15) of the manufacturing method 4, a step of providing a support may be further provided. In addition, the substrate may be a support.

The steps (10) and (11) of the manufacturing method 3 and the steps (13) and (14) of the manufacturing method 4 may be provided a plurality of times. For example, in the manufacturing method 4, the steps may be performed in an order of the steps (13), (14), (13), (14), and (15).

In addition, in the case of providing the above-described steps a plurality of times, the photocurable elastomer precursor or photocurable resin precursor used may be different. For example, in the manufacturing method 4, the photocurable elastomer precursors or photocurable resin precursors that are used in the first stage of the step (13) and the second stage of the step (13) may be different. The cured product (resonance portion) that is obtained in the step (15) may be made to be include a base portion and a weight portion by mixing metal powder or the like into the photocurable elastomer precursor or photocurable resin precursor for the second stage.

For the manufacturing methods 3, 4, and the like, it is possible to refer to the manufacturing methods described in PCT International Publication No. WO 2010/3080794 and the like.

Figure 42:
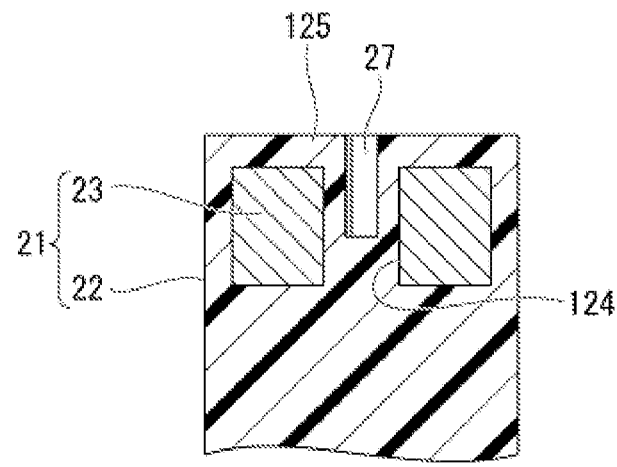
FIG. 42 is a partial cross-sectional view of the resonance portion 21 in which the weight portion 23 is buried in the base portion 22, which is an embodiment according to the present invention.
Figure 44:
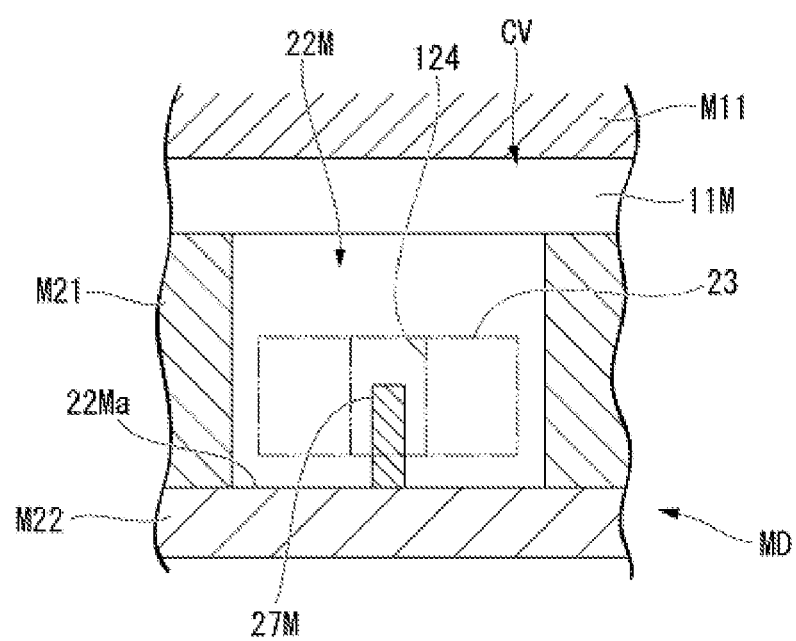
FIG. 44 is a partial detailed view of the cavity CV, which is a space in which the resonance portion 21, which is an embodiment according to the present invention, is to be molded.

In these manufacturing methods 1 to 4, it is also possible to use, for example, a mold having a protrusion in a cavity as shown in FIG. 44. In this case, it is possible to form the resonance portion 21 as shown in FIG. 42. The resonance portion in FIG. 42 has a void at which the front end side surface is indented, and the void is formed in the penetration portion.

(One Form of Method for Manufacturing Sound-Blocking Sheet Member Using First Embodiment)

One form of a method for manufacturing a sound-blocking sheet member using the above-described embodiment 1 will be described. The method for manufacturing a sound-blocking sheet member and a sound-blocking structure of the present invention is not limited thereto. In addition, it is also possible to appropriately apply this form to other embodiments.

The sound-blocking sheet member 100 can be obtained by providing the resonance portions 21 and the rib-shaped protrusion portions 31 described above on the sheet surface 11*a* of the sheet 11. The method for installing the resonance portions 21 and the rib-shaped protrusion portions 31 is not particularly limited. Examples thereof include a method in which separately molded individual components are crimped by heating and pressurization or pressurization, a method in which the components are adhered using a variety of well-known adhesives, a method in which the components are joined by heat welding, ultrasonic welding, laser welding, or the like. Examples of the adhesive include an epoxy resin-based adhesive, an acrylic resin-based adhesive, a polyurethane resin-based adhesive, a silicone resin-based adhesive, a polyolefin resin-based adhesive, a polyvinyl butyral resin-based adhesives, a mixture thereof, and the like, but the adhesive is not particularly limited thereto. It should be noted that a part or all of the resonance portions 21 and the rib-shaped protrusion portions 31 can also be formed by punching a rubber plate obtained by the above-described molding method. In addition, in a case where a part of the resonance portions 21 are metal or an alloy, it is possible to form the resonance portions 21 by cutting the metal or the alloy.

In addition, a method in which the resonance portions 21 are manufactured using a 3D printer or the like can also be exemplified.

From the viewpoint of enhancing the productivity and the economic efficiency, a method in which the sound-blocking sheet member 100 is integrally molded by mold molding, casting mold molding, or the like is preferable. As an example thereof, exemplified is a method in which an integrally molded product of the resonance portions 21, the sheet 11, the resonance portions 21, and the rib-shaped protrusion portion 31 is molded using a mold or a casting mold with cavities having shapes corresponding to the integrally molded product of the sheet 11, the resonance portions 21, and the rib-shaped protrusion portions 31. As such an integral molding method, known are a variety of well-known methods such as a press molding method, a compression molding method, a casting molding method, an extrusion molding method, and an injection molding method, and the kind thereof is not particularly limited. It should be noted that, as long as the raw material of each component is, for example, a resin material having rubber elasticity, it is possible to pour the raw material into the cavities in a form of a liquid-phase precursor or a heated melt. In addition, as long as the raw material is metal, an alloy, or inorganic glass, it is possible to dispose (insert) the raw material in advance at a predetermined position in the cavity.

The resin material is not particularly limited. Examples thereof include a sheet that is the sound-blocking sheet member of the present invention, the materials exemplified in the sections of the base portion and the like, the raw materials and intermediates thereof, and the like.

FIG. 4 to FIG. 7 are views showing an example of manufacturing steps of the sound-blocking sheet member 100. Here, a mold 61 having cavities 61a having a shape corresponding to the above-described resonance portion 21 and cavities 61b having a shape corresponding to the rib-shaped protrusion portion 31 is used (refer to FIG. 4), the weight portions 23 are disposed in the cavities 61a of the mold 61 (refer to FIG. 5), then, a resin material having rubber elasticity is poured into the cavities 61a and 61b and heated or pressurized as necessary (refer to FIG. 6), and then the integrally molded product of the sheet 11, the resonance portions 21, and the rib-shaped protrusion portions 31 is released from the mold, thereby obtaining the sound-blocking sheet member 100. According to such an integral molding method, not only are the productivity and the economic efficiency enhanced, but it is also possible to easily mold the integrally molded product even when the integrally molded product has a complicated shape, furthermore, the sticking force of each component is enhanced, and there is a tendency that the sound-blocking sheet member 100 having excellent mechanical strength is easily obtained. From these viewpoints as well, the sheet 11, the resonance portions 21, and the rib-shaped protrusion portions 31 are preferably an integrally molded product containing a thermoset elastomer or a thermoplastic elastomer.

Action and Effect

The sound-blocking sheet members 100 and 101 and the sound-blocking structures 200 and 201 of the present embodiment have a configuration in which the plurality of resonance portions 21 are provided in contact with the sheet surface 11a of the sheet 11 having rubber elasticity. Therefore, when a sound wave is incident from a noise source, it is possible to obtain high sound-blocking performance overwhelming the law of mass action. In addition, it is possible to easily control the resonance frequency of the resonance portions 21 by the adjustment of the spring constant, a change in the mass of the weight portion 23, or the like through a change in the shapes, density distributions, or materials (elastic moduli and masses) of the resonance portion 21 and the base portion 22. Furthermore, it is also possible to control frequency bands (acoustic bandgap widths and frequency positions) with the material, thickness, or the like of the sheet 11. Therefore, the sound-blocking sheet members 100 and 101 and the sound-blocking structures 200 and 201 of the present embodiment are excellent in terms of the degree of freedom in selecting the sound-blocking frequency and the degree of freedom in design compared with conventional sound-blocking sheet members and sound-blocking structures.

In addition, in the sound-blocking sheet members 100 and 101 and the sound-blocking structures 200 and 201 of the present embodiment, the resonance portions 21 and the rib-shaped protrusion portions 31 are provided in contact with one sheet surface 11a of the sheet 11 having rubber elasticity and are not provided on the other sheet surface 11b. Therefore, even when the support 51 is, for example, a non-flat surface having a curved surface or the like, the stretchable flexible sheet 11 is capable of following the surface shape of the target attachment surface, and as a result, it is possible to stably mount the sheet 11 on the support 51. Therefore, the sound-blocking sheet members 100 and 101 and the sound-blocking structures 200 and 201 of the present embodiment are excellent in terms of handleability and versatility compared with conventional sound-blocking sheet members and sound-blocking structures.

In addition, in a case where the sheet 11 and the resonance portions 21 are integrally molded, since it becomes possible to collectively install the plurality of resonance portions 21 (resonators), the productivity and the handleability significantly improve.

Since the rib-shaped protrusion portions 31 and 32 having the higher maximum height H2 than the maximum height H1 of the resonance portion 21 are disposed, even when the sound-blocking sheet members 100 and 101 are wound in a sheet shape or a plurality of the sound-blocking sheet members 100 and 101 are laminated, the rib-shaped protrusion portions 31 and 32 function as a spacer, and the contact of the resonance portions 21 with the rear surface of the sheet 11 is suppressed. Therefore, it becomes easy to continuously produce and store the sound-blocking sheet members 100 and 101 by a so-called roll-to-roll method without causing any manufacturing trouble such as the deformation, variation, cracking, dropping, breakage, or the like of the resonance portion 21, compared with batch production for each sheet, the production speed improves, and the productivity and the economic efficiency are enhanced.

[Sound-Blocking Structure]

The sound-blocking sheet member of the present invention can be used as a sound-blocking structure. As described in the above-described embodiment, the sound-blocking structure may have a support, rib-shaped protrusion portions, and the like.

In addition, as an example of the usage of the sound-blocking sheet member of the present invention, conceivable is a usage in which the sound-blocking sheet member is attached to the inside or outside of a small electronic device for reducing noise such as the motor sound of a small electronic device or the like, the switching sound in an electronic circuit, or the like.

The sound-blocking structure may be a laminate including the sound-blocking sheet member of the present invention. For example, the sound-blocking sheet members 101 may be provided on both surfaces of the support 51. In addition, a plurality of the sound-blocking structures having the sound-blocking sheet member provided on the support may be laminated and used. When a plurality of the sound-blocking sheet members are combined, it is possible to control the acoustic bandgap width, the frequency position, or the like.

In addition, even a laminate having the sound-blocking sheet members on both surfaces of the support is capable of following a non-flat surface or the like having a curved surface or the like as long as a housing including the support and the laminate is flexible, and thus it is also possible to stably mount the sound-blocking structure.

Figure 9:
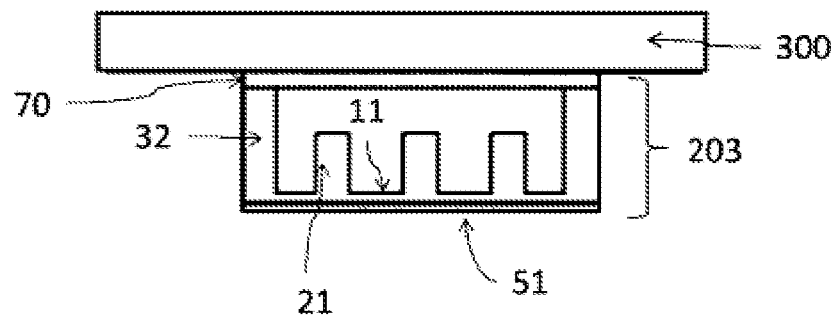
FIG. 9 is a view showing an example of a use of the sound-blocking structure.

The positional relationship between the resonance portions of the sound-blocking sheet member and the sheet in the case of being used as the sound-blocking structure is not particularly limited, and it is possible to use the resonance portions and the sheet as in, for example, the cross-sectional view of a structure shown in FIG. 9.

Figure 16:
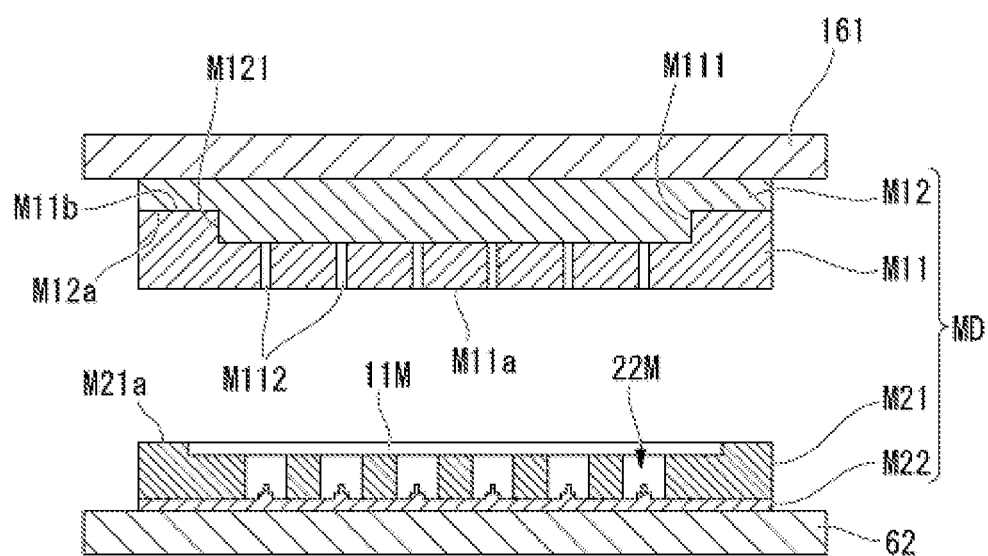
FIG. 16 is a cross-sectional view of a mold MD, which is an embodiment according to the present invention.

The sound-blocking structure 203 of FIG. 9 has the sheet 11, the resonance portions 21, the rib-shaped protrusion portions 32, and a sheet 70. The sound-blocking structure 203 is installed on a sound-blocking structure installation object (for example, a window) 300. In a case where the weight of the sound-blocking structure installation object 300 is heavier than that of the support or the like, the sheet is not directly installed on the sound-blocking structure installation object as shown in FIG. 16, whereby there is a case where an acoustic bandgap is likely to be generated and high sound-blocking performance is obtained.

EXAMPLES

Hereinafter, the present invention will be more specifically described using examples, but the present invention is not limited to these examples. The present invention is capable of adopting a variety of conditions within the scope of the gist of the present invention as long as the object of the present invention is achieved.

[Calculation of Acoustic Bandgap]

For each of parts i to iv of sheets, physical properties (specific gravity, Young's modulus, and Poisson's ratio) and material dimensions r1, r2, h, and a shown in the 'Example 1' column of Table 1 were assigned into the equation of the solid mechanics module of the multiphysics analysis software COMSOL Multiphysics (COMSOL), and acoustic bandgaps were calculated using the finite element method.

In addition, in order to compare the sizes of acoustic bandgaps, standardized acoustic bandgap widths [((acoustic bandgap maximum frequency)−(acoustic bandgap minimum frequency))÷(acoustic bandgap center frequency)] were obtained.

Example 1

Figure 10A:
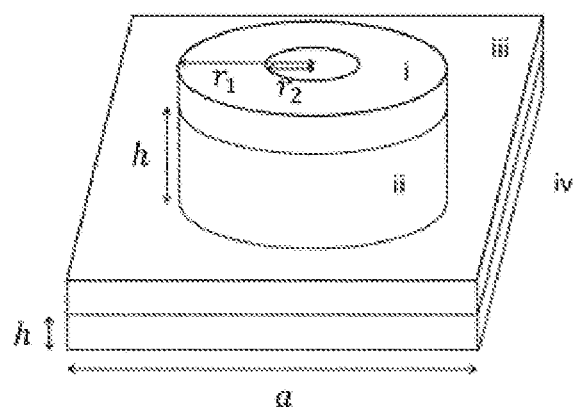
FIG. 10A is a schematic configuration view of a unit cell used for estimation of an acoustic bandgap.

Example 1 is a unit cell including a sound-blocking sheet member shown in FIG. 10A.

The sizes, materials, and physical properties of the constituent members of the unit cell are shown in Table 1. The acoustic bandgap in the unit cell was calculated based on the above-described calculation method.

As a result of the calculation, it was confirmed that, in Example 1, the acoustic bandgap was 3461 to 4551 Hz, the standardized acoustic bandgap width was 0.27, and the sheet had a sufficient sound-blocking bandwidth.

Comparative Example 1

Comparative Example 1 is a unit cell including the sound-blocking sheet member shown in FIG. 10A, and the sizes, materials, and physical properties of the constituent members of the unit cell are shown in Table 1.

As a result of calculating the acoustic bandgap by the same method as in Example 1, it was confirmed that the acoustic bandgap was 7185 to 7804 Hz, the standardized acoustic bandgap width was 0.08, and it was not possible to sufficiently widen the sound-blocking bandwidth. From the comparison between Example 1 and Comparative Example 1, it was confirmed that the use of a weight widened the standardized acoustic bandgap width.

Comparative Example 2

Comparative Example 2 is a unit cell including the sound-blocking sheet member shown in FIG. 10A and is an example in which a weight portion having no through-hole was used. The sizes, materials, and physical properties of the constituent members of the unit cell are shown in Table 1.

As a result of calculating the acoustic bandgap by the same method as in Example 1, it was confirmed that the acoustic bandgap was 3345 to 4467 Hz, the standardized acoustic bandgap width was 0.29, and the sheet had a sufficient sound-blocking bandwidth.

Comparative Example 3

Figure 10B:
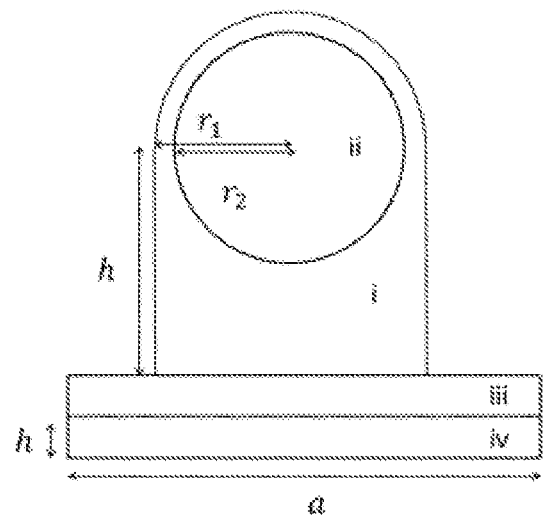
FIG. 10B is a schematic configuration view of the unit cell used for the estimation of the acoustic bandgap.

Comparative Example 3 is a unit cell including a sound-blocking sheet member shown in FIG. 10B, and the sizes, materials, and physical properties of the constituent members of the unit cell are shown in Table 1.

The acoustic bandgap was calculated by the same method as in Example 1. As a result of the calculation, it was confirmed that the acoustic bandgap was 4157 to 4733 Hz, the standardized acoustic bandgap width was 0.13, and it was not possible to sufficiently widen the sound-blocking bandwidth.

From the comparison between Example 1 and Comparative Example 3, it was confirmed that, in a case where the sound-blocking materials had substantially the same thickness, it was possible to increase the acoustic bandgap width by using a plate-shaped weight.

[Measurement of Coating Ratio]

The weight portion was placed in the center of a petri dish having an inner dimension of 16 mm, an outer dimension of 19 mm, and a height of 12 mm, and Sylgard 184 (Toray Dow Corning Co., Ltd.) was dropped onto the petri dish. The appearance of the dropped Sylgard 184 wrapping around the bottom surface of the weight was observed, and the coating ratio on the front end side surface was measured. The coating ratio is expressed as the ratio of the area of the resonance portion front end side surface covered with the resin by sticking and adhesion to the area of the resonance portion front end side surface of the resonance portion of the weight portion.

[Evaluation of Member Strength]

TABLE 1

| Part | | r1 (mm) | r2 (mm) | h (mm) | a (mm) | Material | Specific gravity (g/cm$^3$) | Young's modulus (MPa) | Poisson's ratio | Maximum height (mm) | Acoustic bandgap (Hz) | Standardized acoustic bandgap width |
|---|---|---|---|---|---|---|---|---|---|---|---|---|
| Example 1 | i | 5 | 1.5 | 0.8 | — | Iron | 7.87 | 206000 | 0.3 | 2 | 3461 to 4551 | 0.27 |
| | ii | 5 | — | 0.7 | — | Rubber | 1.05 | 10 | 0.49 | | | |
| | iii | — | — | 0.5 | 15 | Rubber | 1.05 | 10 | 0.49 | | | |
| | iv | — | — | 1 | 15 | Aluminum | 2.702 | 63300 | 0.29 | | | |
| Comparative Example 1 (no weight) | ii | 5 | — | 1.5 | — | Rubber | 1.05 | 10 | 0.49 | 2 | 7185 to 7804 | 0.08 |
| | iii | — | — | 0.5 | 15 | Rubber | 1.05 | 10 | 0.49 | | | |
| | iv | — | — | 1 | 15 | Aluminum | 2.702 | 63300 | 0.29 | | | |
| Comparative Example 2 (weight cylinder) | i | 5 | — | 0.8 | — | Iron | 7.87 | 206000 | 0.3 | 2 | 3345 to 4467 | 0.29 |
| | ii | 5 | — | 0.7 | — | Rubber | 1.05 | 10 | 0.49 | | | |
| | iii | — | — | 0.5 | 15 | Rubber | 1.05 | 10 | 0.49 | | | |
| | iv | — | — | 1 | 15 | Aluminum | 2.702 | 63300 | 0.29 | | | |
| Comparative Example 3 (weight sphere) | i | 0.75 | — | 0.75 | — | Rubber | 7.87 | 206000 | 0.3 | 2 | 4157 to 4733 | 0.13 |
| | ii | 0.65 | — | 0.75 | — | Iron | 1.05 | 10 | 0.49 | | | |
| | iii | — | — | 0.5 | 2.5 | Rubber | 1.05 | 10 | 0.49 | | | |
| | iv | — | — | 1 | 2.5 | Aluminum | 2.702 | 63300 | 0.29 | | | |

The strength was obtained from stress in a portion at which stress concentrated most in the weight portion at the time of pulling the weight portion in the surface direction of the sheet surface with a constant force.

Next, for Example 1 and Comparative Example 2, the coating ratios were measured, and the member strengths were evaluated. The results are shown in Table 2. The values of strength in Table 2 are standardized values when the stress in Example 1 is regarded as 1.

TABLE 2

| | Coating ratio (%) | Strength |
|---|---|---|
| Example 1 | 100 | 1.0 |
| Comparative Example 2 | 70.5 | 0.7 |

From these results, it was confirmed that, when the weight had a through-hole, it was possible to improve the coating ratio. In Comparative Example 2, at the time of filling the weight portion with the resin from the outer peripheral portion, since an air bubble was generated, and the air bubble was not discharged outside, the coating ratio became 70.5%. On the other hand, in Example 1, an air bubble was generated, but was discharged through the through-hole, and thus that the coating ratio reached 100%. It is conceivable that, when the coating ratio is high, the dropping of the weight is suppressed, and it is possible to improve the durability.

Next, manufacturing methods other than the above-described manufacturing methods 1 to 4 and sound-blocking sheet members manufactured by these manufacturing methods will be described.

Hereinafter, each embodiment of the present invention will be described with reference to the drawings. It should be noted that each embodiment described below is an example for describing the present invention, and the present invention is not limited only to the embodiment. In addition, in the following description, unless particularly otherwise specified, positional relationships such as up, down, right, and left shall be based on the positional relationships shown in the drawings. Moreover, the dimensional ratios in the drawings are not limited to the ratios shown in the drawings.

It should be noted that, in the following description, the same element as a component of the first to third embodiments shown in FIG. 1 and FIG. 10 will be given the same reference sign and will not be described again. In addition, in a fourth embodiment, the configuration of a resonance portion is different from that in the third embodiment, and thus the resonance portion will be described below.

[Third Embodiment of Sound-Blocking Sheet Member and Manufacturing Method]

Figure 11:
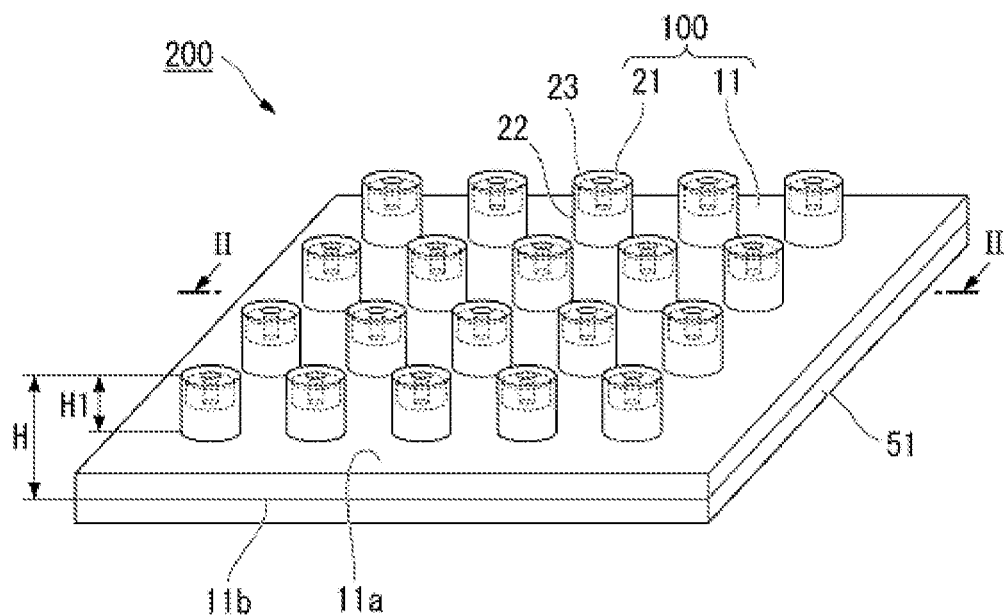
FIG. 11 is a schematic perspective view showing a structural example of a sound-blocking sheet member 100 and a sound-blocking structure 200 of a first embodiment according to the present invention.
Figure 12:
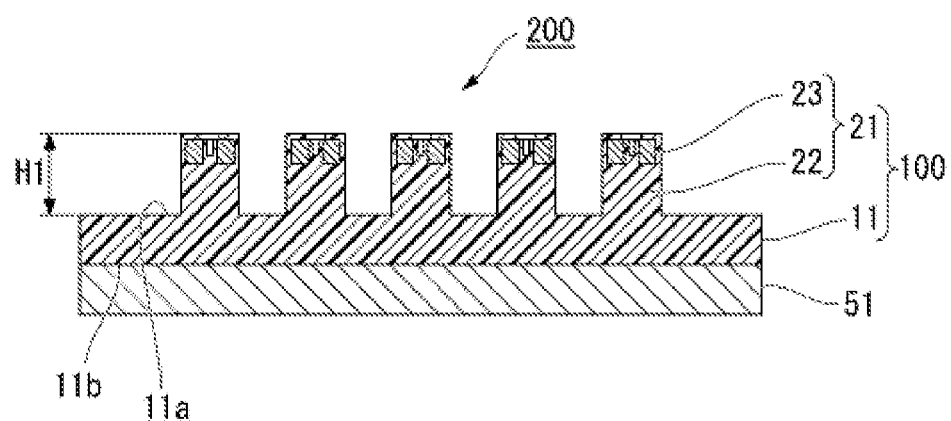
FIG. 12 is a cross-sectional view taken along a line II-II in FIG. 11.

FIG. 11 is a schematic perspective view showing a structural example of the sound-blocking sheet member 100 and the sound-blocking structure 200 of the third embodiment. FIG. 12 is a cross-sectional view taken along the line II-II in FIG. 11.

The sound-blocking sheet member 100 includes a sheet portion 11 having rubber elasticity and the plurality of resonance portions (protrusion portions) 21 provided in contact with the sheet surface 11a of the sheet portion 11. The sound-blocking sheet member 100 is supported by the support 51 provided on the sheet surface 11b side on the opposite side of the sheet surface 11a of the sheet portion 11, whereby the sound-blocking structure 200 is configured.

In the sound-blocking sheet member 100 and the sound-blocking structure 200, for example, when a sound wave is incident from a noise source on the support 51 side, resonance occurs in at least one of the sheet portion 11 and the resonance portions 21. At this time, the presence of a frequency range in which the direction of a force acting on the support 51 and the direction of acceleration that is generated in at least one of the sheet portion 11 and the resonance portions 21 become opposite to each other becomes possible, a part or all of vibrations at specific frequencies are cancelled, and thus a complete acoustic bandgap in which the vibrations at the specific frequencies almost completely disappear is generated. Therefore, in the vicinity of the resonance frequency of at least one of the sheet portion 11 and the resonance portions 21, a part or all of vibrations come to rest, and as a result, high sound-blocking performance overwhelming the law of mass action can be obtained. A sound-blocking member that utilizes such a principle is referred to as an acoustic metamaterial. Hereinafter, each component of the sound-blocking sheet member 100 and the sound-blocking structure 200 of the present embodiment will be described in detail.

The maximum height of the sheet surface 11a provided with the resonance portions 21 from the sheet surface 11b to the front end of the resonance portion 21 is not particularly limited and may be appropriately adjusted depending on the application, but is preferably 20 mm or less. The maximum height is more preferably 15 mm or less, still more preferably 10 mm or less, still more preferably 8 mm or less, far still more preferably 5 mm or less, and particularly preferably 3 mm or less. In addition, in a case where the sound-blocking sheet member 100 and the sound-blocking structure 200 are used in an application for blocking sound at high frequencies, the maximum height is preferably 1.0 mm or less. Within the above-described range, the sound-blocking sheet member 100 and the sound-blocking structure 200 have a sound-blocking function, it is possible to reduce the installation space necessary in the sound-blocking sheet member 100 and to maintain the overall size of a small electronic device or the like as small as possible.

In addition, the lower limit is not particularly limited, but is, for example, 0.01 min or more from the viewpoint of the easiness of manufacturing. It should be noted that the maximum height of the sound-blocking sheet member is the height indicated by H in FIG. 11, which shows the third embodiment, and represents the height from the sheet surface 11b of the sheet portion 11 to the maximum height of the resonance portion 21 in the normal direction to the sheet portion 11.

[Sheet Portion]

The sheet portion 11 is a sheet having rubber elasticity. The sheet portion 11 is not particularly limited and may a sheet having rubber elasticity attributed to the molecular motion or the like of a resin (organic polymer). The sheet portion 11 is also capable of functioning as a vibrator (resonator) that vibrates at a certain frequency when a sound wave is incident from a noise source.

The material that configures the sheet portion 11 preferably contains at least one selected from the group consisting of a thermoset or photocurable elastomer and a thermoplastic elastomer.

Specific examples of the material that configures the sheet portion 11 include thermosetting resin-based elastomers such as a vulcanized thermosetting resin-based elastomer such as chemically crosslinked natural rubber or synthetic rubber, a urethane-based thermosetting resin-based elastomer, a silicone-based thermosetting resin-based elastomer, fluorine-based thermosetting resin-based elastomers, and acrylic thermosetting resin-based elastomers; thermoplastic elastomers such as an olefin-based thermoplastic elastomer, a styrene-based thermoplastic elastomer, a vinyl chloride-based thermoplastic elastomer, a urethane-based thermoplastic elastomer, an ester-based thermoplastic elastomer, an amide-based thermoplastic elastomer, a silicone-based thermoplastic elastomer, and an acrylic thermoplastic elastomer; and the like.

More specific examples of the thermoset elastomer and the thermoplastic elastomer include rubber. Specific examples thereof include natural rubber, isoprene rubber, butadiene rubber, styrene-butadiene rubber, chloroprene rubber, nitrile rubber, polyisobutylene rubber, ethylene-propylene rubber, chlorosulfonated polyethylene rubber, acrylic rubber, fluororubber, epichlorohydrin rubber, polyester rubber, urethane rubber, silicone rubber, modified bodies thereof, and the like, but are not particularly limited thereto. Among these elastomers, it is possible to use one kind of elastomer singly or two or more kinds of elastomers in combination.

Furthermore, among these, natural rubber, isoprene rubber, butadiene rubber, styrene-butadiene rubber, chloroprene rubber, nitrile rubber, polyisobutylene rubber, ethylene-propylene rubber, chlorosulfonated polyethylene rubber, acrylic rubber, fluororubber, epichlorohydrin rubber, polyester rubber, urethane rubber, silicone rubber, and modified bodies thereof are preferable, and silicone rubber, acrylic rubber, and modified bodies thereof are more preferable. When these materials are used, there is a tendency that the sheet is excellent in terms of the heat resistance or the cold resistance.

The sheet portion 11 may contain a variety of additives such as a flame retardant, an antioxidant, a plasticizer, and a coloring agent as long as the sheet 11 is a sheet having so-called rubber elasticity.

The flame retardant is an additive that is blended to make flammable materials not easily burn or ignite. Specific examples thereof include bromine compounds such as pentabromodiphenyl ether, octabromodiphenyl ether, decabromodiphenyl ether, tetrabromobisphenol A, hexabromocyclododecane and hexabromobenzene, phosphorus compounds such as triphenyl phosphate, chlorine compounds such as chlorinated paraffin, antimony compounds such as antimony trioxide, metal hydroxides such as aluminum hydroxide, nitrogen compounds such as melamine cyanurate, boron compounds such as sodium borate, and the like, but are not particularly limited thereto.

In addition, the antioxidant is an additive that is blended to prevent oxidation degradation. Specific examples thereof include phenol-based antioxidants, sulfur-based antioxidants, phosphorus-based antioxidants, and the like, but are not limited thereto.

Furthermore, the plasticizer is an additive that is blended to improve flexibility and weather resistance. Specific examples thereof include phthalic acid esters, adipic acid esters, trimellitic acid esters, polyesters, phosphoric acid esters, citric acid esters, sebacic acid esters, azelaic acid esters, maleic acid esters, silicone oil, mineral oil, vegetable oil, modified bodies thereof, and the like, but are not particularly limited thereto.

Moreover, examples of the coloring agent include colorants, pigments, and the like.

Among these additives, it is possible to use one kind of additive singly or two or more kinds of additives in combination.

The sheet portion 11 is formed in a square shape in a plan view, but the shape is not particularly limited thereto. It is possible to adopt any shape in a plan view such as a triangular shape, an oblong shape, a rectangular shape, a trapezoidal shape, a rhombus shape, a polygonal shape such as a pentagonal shape or a hexagonal shape, a circular shape, an elliptical shape, and indefinite shapes that are not classified into the above-described shapes. It should be noted that, from the viewpoint of the improvement of expansion and contraction performance, weight reduction, or the like, the sheet portion 11 may have a notched portion, a punched hole, or the like at any place as long as the sheet portion 11 does not lose the characteristics as an acoustic metamaterial.

The thickness of the sheet portion 11 is not particularly limited as long as the maximum height of the sound-blocking sheet member falls within the scope of the present invention. Since it is possible to control a frequency band in which high sound-blocking performance is developed depending on the thickness of the sheet portion 11 (acoustic bandgap width or frequency position), it is possible to appropriately set the thickness of the sheet portion 11 such that the acoustic bandgap matches a desired sound-blocking frequency range. When thickness of the sheet portion 11 is thick, there is a tendency that the acoustic bandgap width becomes narrow and shifts toward the low frequency side. In addition, when the thickness of the sheet portion 11 is thin, there is a tendency that the acoustic bandgap width becomes wide and shifts toward the high frequency side.

From the viewpoint of sound-blocking performance, mechanical strength, flexibility, handleability, or the like, the thickness of the sheet portion 11 is preferably 10 μm or more, more preferably 50 μm or more, and still more preferably 100 μm or more. In addition, the thickness of the sheet portion 11 is preferably 2 mm or less, more preferably 1 mm or less, and still more preferably 500 μm or less.

From the viewpoint of sound-blocking performance, mechanical strength, flexibility, handleability, productivity, or the like, the sheet portion 11 has a Young's modulus of preferably 0.01 MPa or more and more preferably 0.1 MPa or more and has a Young's modulus of preferably 100 MPa or less and more preferably 10 MPa or less.

Here, the Young's modulus in the present specification means the ratio between a force (stress) acting per unit cross-sectional area and the deformation rate (strain) of a sample at the time of applying an external force in a uniaxial direction and means the value of the stored longitudinal elastic modulus at 25° C. and 10 Hz measured by the forced vibration non-resonant method of JIS K 6394: 2007 "Rubber, vulcanized or thermoplastic—Determination of dynamic properties".

In addition, the sheet portion 11 preferably has a glass transition temperature of 0° C. or lower from the viewpoint of reducing the temperature dependence of the sound-blocking property at low temperatures. As the glass transition temperature of the sheet portion 11 lowers, the cold resistance is further enhanced, the temperature dependence of the elastic modulus near 0° C. becomes smaller, and there is a tendency that it becomes more difficult for the sound-blocking performance to depend on the ambient temperature. The glass transition temperature of the sheet 11 is more preferably −10° C. or lower, still more preferably −20° C. or lower, and particularly preferably −30° C. or lower. It should be noted that, in the present specification, the glass transition temperature of the sheet portion 11 means the peak temperature of the loss tangent in the above-described dynamic viscoelasticity measurement at a frequency of 10 Hz, particularly, the temperature dependence measurement.

[Resonance Portion]

The resonance portion 21 functions as a vibrator (resonator) that vibrates at a certain frequency when a sound wave is incident from a noise source. The resonance portion 21 of the present embodiment is formed of a composite structure including the base portion 22 and the weight portion 23 that is supported by the base portion 22 and has a larger mass than the base portion 22. The resonance portion 21 effectively functions as a resonator having a resonance frequency that is determined by the mass of the weight portion 23 acting as a weight and the spring constant of the base portion 22 acting as a spring.

The array, number, size, and the like of the resonance portions 21 can be appropriately set depending on desired performance and are not particularly limited. The resonance portions 21 are disposed along the surface direction of at least one sheet surface 11a of the sheet portion 11. For example, in the present embodiment, a plurality of the resonance portions 21 are disposed in a grid shape at equal intervals, but the array of the resonance portions 21 is not particularly limited thereto. For example, the plurality of resonance portions 21 may be disposed in, for example, a zigzag shape or may be randomly disposed. Since the sound-blocking mechanism by the sound-blocking sheet member 100 does not utilize Bragg scattering, which is utilized in so-called phononic crystals, the intervals between the resonance portions 21 may not be regularly and periodically disposed at all times.

In addition, the number of the resonance portions 21 installed per unit area is not particularly limited as long as the resonance portions 21 can be disposed so as not to interfere with each other by coming into contact with each other or the like.

The maximum number of the resonance portions 21 per unit area varies depending on the shape or the like of the resonance portion 21. For example, in a case where the resonance portion 21 has a cylindrical shape, the height direction of the cylinder is installed parallel to the sheet normal direction, and the cross-sectional diameter of the cylinder is 1 cm, the maximum number is preferably 100 or less per 10 cm2.

For example, in a case where the resonance portion 21 has a cylindrical shape, the height direction of the cylinder is installed parallel to the sheet normal direction, and the cross-sectional diameter is 1 cm, the minimum number of the resonance portions 21 per unit area is preferably 2 or more, more preferably 10 or more, and still more preferably 50 or more per 10 cm2. When the number of the resonance portions 21 installed is equal to or more than the above-described preferable lower limit, there is a tendency that higher sound-blocking performance can be obtained. In addition, when the number of the resonance portions 21 installed is equal to or less than the above-described preferable upper limit, it becomes easy to reduce the weight of the entire sheet.

The maximum height of the resonance portion 21 in the normal direction from the sheet surface 11a of the sheet portion 11 can be appropriately set depending on desired performance and is not particularly limited. From the viewpoint of the easiness of molding and the improvement of productivity, the maximum height is preferably 10 μm or more, more preferably 100 μm or more, and still more preferably 1 mm or more. In addition, the maximum height is preferably 20 mm or less, more preferably 15 mm or less, still more preferably 10 mm or less, still more preferably 8 mm or less, far still more preferably 5 mm or less, and particularly preferably 3 mm or less. When the maximum height is set within the present range, there is an advantage from the viewpoint of productivity, for example, the easiness of peeling the sheet portion 11 from a mold MD.

In addition, the heights of all of the resonance portions 21 in the normal direction of the sheet portion 11 may not be the same and may be different. When the heights of the resonance portions are different, there is a case where an effect of expanding a frequency range in which sound-blocking performance appears can be obtained.

[Base Portion]

The base portion 22 has a substantially cylindrical outer shape. A plurality of the base portions 22 are provided in contact with the sheet surface 11a of the sheet portion 11, and the weight portions 23 are each buried inside the base portions 22. The outer shape of the base portion 22 is not particularly limited, and it is possible to adopt an any shape such as a triangular columnar shape, a rectangular columnar shape, a trapezoidal columnar shape, a polygonal columnar shape such as a pentagonal column or a hexagonal column, a cylindrical columnar shape, an elliptical columnar shape, a truncated pyramid shape, a truncated cone shape, a prismatic shape, a conical shape, a hollow tubular shape, a branched shape, or an indefinite shape that is not classified into the above-described shapes. In addition, it is also possible to form the base portion 22 in a columnar shape having at least one of a cross-sectional area and a cross-sectional shape that vary depending on the height position of the base portion 22.

In addition, the shapes or heights of a plurality of the base portions 22 provided in contact with the sheet surface 11a may be identical or different.

The material of the base portion 22 is not particularly limited as long as the above-described required characteristics are satisfied. Examples thereof include resin materials and include at least one selected from the group consisting of a thermoset elastomer, a thermoplastic elastomer, a thermosetting resin, and a thermoplastic resin.

Examples of the thermoset elastomer and the thermoplastic elastomer include those exemplified in the section of the sheet.

Examples of the thermosetting resin include acrylic thermosetting resins, urethane-based thermosetting resins, silicone-based thermosetting resins, epoxy-based thermosetting resins, and the like. Examples of the thermoplastic resin include polyolefin-based thermoplastic resins, polyester-based thermoplastic resins, acrylic thermoplastic resins, urethane-based thermoplastic resins, polycarbonate-based thermoplastic resins, and the like.

Specific examples thereof include rubbers such as vulcanized rubber such as chemically crosslinked natural rubber or synthetic rubber, isoprene rubber, butadiene rubber, styrene-butadiene rubber, chloroprene rubber, nitrite rubber, polyisobutylene rubber, ethylene-propylene rubber, chlorosulfonated polyethylene rubber, acrylic rubber, fluororubber, epichlorohydrin rubber, polyester rubber, urethane rubber, silicone rubber, and modified bodies thereof; polymers such as polyacrylonitrile, polyethylene terephthalate, polybutylene terephthalate, polyvinyl chloride, polychlorotrifluoroethylene, polyethylene, polypropylene, polynorbornene, polyether ether ketone, polyphenylene sulfide, polyarylate, polycarbonate, polystyrene, epoxy resins, and oxazine resins; and the like, but are not particularly limited thereto. Among these additives, it is possible to use one kind of additive singly or two or more kinds of additives in combination.

In addition, the base portion 22 may be a porous body including pores (gas such as air) in the resin material. Furthermore, the base portion 22 may include a liquid material such as mineral oil, vegetable oil, or silicone oil. It should be noted that, in a case where the base portion 22 includes a liquid material, the liquid material is desirably contained in the resin material from the viewpoint of suppressing the outflow of the liquid material to the outside.

Among these, the material of the base portion 22 is preferably the same material as the sheet portion 11 and particularly preferably an elastomer. When the sheet portion 11 and the base portions 22 contain the same elastomer, the integral molding of the sheet portion 11 and the base portions 22 becomes easy, and the productivity is significantly enhanced. That is, one of particularly preferable aspects is an integrally molded product in which the sheet portion 11 and the resonance portions 21 (base portions 22) both contain at least one selected from the group consisting of a thermoset elastomer and a thermoplastic elastomer.

Specific examples of the elastomer include vulcanized rubber such as chemically crosslinked natural rubber or synthetic rubber, isoprene rubber, butadiene rubber, styrene-butadiene rubber, chloroprene rubber, nitrile rubber, polyisobutylene rubber, ethylene-propylene rubber, chlorosulfonated polyethylene rubber, acrylic rubber, fluororubber, epichlorohydrin rubber, polyester rubber, urethane rubber, silicone rubber, and modified bodies thereof, polyacrylonitrile, polyethylene terephthalate, polybutylene terephthalate, polyvinyl chloride, polychlorotrifluoroethylene, polyethylene, polypropylene, polynorbornene, polyether ether ketone, polyphenylene sulfide, polyarylate, polycarbonate, polystyrene, epoxy resins, and oxazine resins, and the like, but are not particularly limited thereto.

Among these, natural rubber, isoprene rubber, butadiene rubber, styrene-butadiene rubber, chloroprene rubber, nitrile rubber, polyisobutylene rubber, ethylene-propylene rubber, chlorosulfonated polyethylene rubber, acrylic rubber, fluororubber, epichlorohydrin rubber, polyester rubber, urethane rubber, silicone rubber, and modified bodies thereof are preferable, and silicone rubber, acrylic rubber, and modified bodies thereof are more preferable from the viewpoint of excellent heat resistance or cold resistance or the like.

It should be noted that it is also possible to produce the base portion 22 as a two-color molded product or a multi-color molded product made of two or more kinds of resin materials. In this case, when the same elastomer as the above-described sheet portion 11 is adopted for the base portions 22 on the side in contact with the sheet portion 11, the integral molding of the sheet portion 11 and the base portions 22 becomes easy.

It should be noted that, in a case where the resonance portions 21 (base portions 22) having a circular cross-sectional shape are provided as in the present embodiment, in a cross section parallel to the sheet surface 11a of the sheet portion 11 at a height position of the resonance portion 21 (base portion 22) at which the total of the cross-sectional areas of the plurality of resonance portions 21 (base portions 22) is maximized, the diameter of the circle having the largest diameter among the circles (circular cross sections) that are included in the cross section is preferably 100 mm or less, more preferably 50 mm or less, and still more preferably 20 mm or less. In addition, the diameter of the circle having the smallest diameter is preferably 10 μm or more, more preferably 100 μm or more, and still more preferably 1 mm or more. When the diameters are set within the above preferable numerical ranges, it is possible to secure a predetermined number or more of the resonance portions 21 (base portions 22) that are installed on the sheet surface 11a of the sheet portion 11 and to obtain more favorable sound-blocking performance, and there is also a tendency that the easiness of molding and the productivity are further enhanced.

[Weight Portion]

Figure 13:
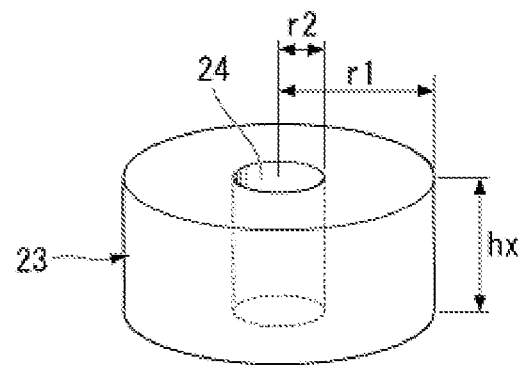
FIG. 13 is a perspective view of the appearance of the weight portion 23, which is an embodiment according to the present invention.

FIG. 13 is a perspective view of the appearance of the weight portion 23.

The weight portion 23 of the present embodiment has a through-hole (penetration portion) 124 with a circular cross section. The through-hole 124 penetrates the weight portion 23 in the vertical direction. The weight portion 23 is not particularly limited as long as the weight portion 23 has a larger mass than the above-described base portion 22. As shown in FIG. 13, the weight portion 23 has, for example, an annular shape (doughnut shape), but may have a disk shape such as a washer or a hexagonal columnar shape such as a nut.

The shape of the weight portion 23 is not particularly limited, but is preferably a plate shape from the viewpoint of the adjustment of sound-blocking performance and thickness reduction. When the weight portion 23 has a plate shape, it becomes possible to place the center of gravity of the weight at a position away from the substrate compared with a case where the weight portion 23 is a sphere or the like, and there is a tendency that it is possible to increase the vibration moment of the resonance portion 21. For example, in a case where the acoustic bandgap width is set to be constant, it becomes possible to thin the weight having a plate shape compared with a case where the weight portion 23 is a sphere or the like. On the other hand, in a case where the height of the weight portion 23 is set to be constant, it becomes possible for the weight having a plate shape to obtain a wide bandgap width compared with a case where the weight portion 23 is a sphere or the like.

Figure 14:
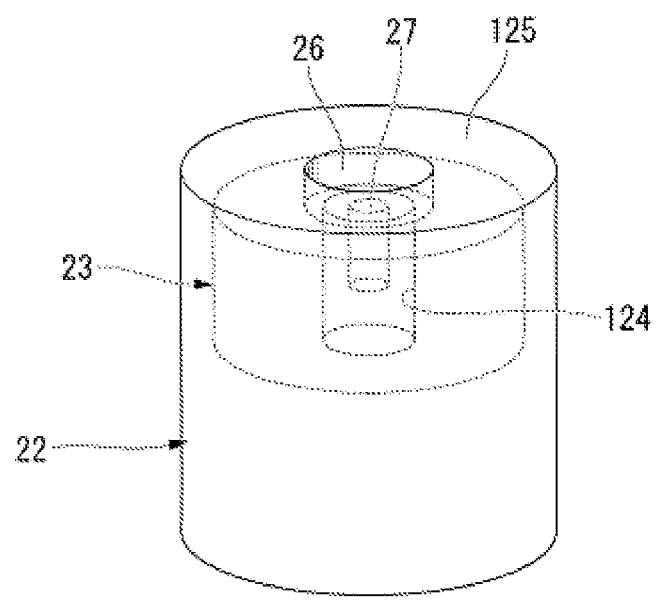
FIG. 14 is a perspective view of the appearance of the resonance portion 21 in which the weight portion 23 is buried in the base portion 22, which is an embodiment according to the present invention.

In the present embodiment, the weight portion 23 is formed in a substantially circular shape in which the outer diameter of the weight portion 23 is smaller than the base portion 22 and is buried in the base portion 22 on the front end side of the resonance portion 21 (hereinafter, simply referred to as the front end side). FIG. 14 is a perspective view of the appearance of the resonance portion 21 in which the weight portion 23 is buried in the base portion 22, and FIG. 15 is a partial cross-sectional view.

Figure 15:
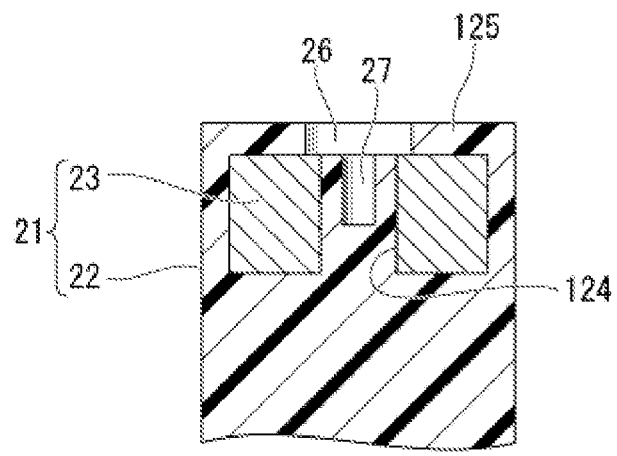
FIG. 15 is a partial cross-sectional view of the resonance portion 21 in which the weight portion 23 is buried in the base portion 22, which is an embodiment according to the present invention.

As shown in FIG. 14 and FIG. 15, in the resonance portion 21, the weight portion 23 is disposed on the front end side of the base portion 22. The base portion 22 has a coating portion 125 that covers a part of the surface on the front end side of the weight portion 23 and an indented portion 26 provided by removing (penetrating) a part of the coating portion 125. The indented portion 26 is provided coaxially with the through-hole 124 in a circular shape in a plan view. The diameter of the indented portion 26 is larger than the diameter of the through-hole 124 and smaller than the outer diameter of the weight portion 23. Therefore, a part of the surface on the front end side of the weight portion 23 is exposed on the bottom surface of the indented portion 26.

In addition, in the resonance portion 21, a void 27 having a circular cross-sectional shape that is open on the bottom surface of the indented portion 26 and extends in the axial direction is provided. The void 27 is formed in the resin material of the base portion 22 made to fill the through-hole 124 in the weight portion 23. The void 27 is coaxial with the indented portion 26. In the present embodiment, a portion between the surface of the through-hole 124 and the void 27 is filled with the resin material. The depth of the void 27 is set to a length that does not allow the void 27 to reach the surface on the rear end side of the weight portion 23.

As described above, since a configuration in which the weight portion 23 acting as the weight of the resonance portion 21 is supported by the base portion 22 that determines the spring constant is adopted, it is possible to easily control the resonance frequency of the resonance portion 21 by, for example, adjusting the spring constant through a change in the shape or material (elastic modulus or mass) of the base portion 22 or changing the mass of the weight portion 23. Ordinarily, as the elastic modulus of the base portion 22 decreases, there is a tendency that the acoustic bandgap shifts toward the low frequency side. In addition, as the mass of the weight portion 23 increases, there is a tendency that the acoustic bandgap shifts toward the low frequency side.

In FIG. 13, the height hx of the weight portion 23 is not particularly limited, but is preferably 0.95 or less and more preferably 0.9 or less in a case where the height of the resonance portion is set to 1. In addition, the height hx is preferably 0.2 or more and more preferably 0.3 or more. When the height hx is within these ranges, there is a tendency that it is possible to obtain a wide bandgap width while suppressing the height of the sound-blocking sheet member.

The outer diameter r1 of the weight portion 23 is not particularly limited. In a case where the resonance portion 21 has a circular cross-sectional shape, there is a tendency that the sound-blocking performance is excellent when the outer diameter r1 is approximately the diameter of the circular cross-sectional shape. While not particularly limited, the maximum value of the radius r1 is preferably 100 mm or less, more preferably 50 mm or less, and still more preferably 20 mm or less. In addition, the minimum value of the radius r1 is preferably 10 µm or more, more preferably 100 µm or more, and still more preferably 1 mm or more. When the maximum value and the minimum value are within the above-described preferable numerical ranges, it is possible to obtain favorable sound-blocking performance, and there is a tendency that the easiness of molding and the productivity are further enhanced. In the weight portion 23 of the present embodiment, since a part of the through-hole 124 is filled with the resin material or the like, and a part on the front end side is coated with the coating portion 125, it is possible to suppress the weight portion 23 dropping from the base portion 22 or breaking even when partially exposed. On the inner peripheral surface of the through-hole 124 in the weight portion 23, there may be bellows unevenness or a spiral notch groove, and, in that case, the resin enters the groove, whereby it is possible to further suppress the dropping of the weight portion 23.

The inner diameter r2 of the weight portion 23 is not particularly limited. The maximum value of the inner diameter r2 is not particularly limited as long as the maximum value of the inner diameter r2 is smaller than the outer diameter r1, but the maximum value of the inner diameter r2 is preferably 90 mm or less, more preferably 40 mm or less, still more preferably 20 mm or less, and particularly preferably 10 mm or less. In addition, the minimum value of the inner diameter r2 is preferably 2 µm or more, more preferably 50 µm or more, and still more preferably 80 µm or more. When the maximum value and the minimum value are within the above-described preferable numerical ranges, there is a tendency that it becomes easy to fill the through-hole 124 with the resin material or the like.

In addition, the ratio between the outer diameter r1 and the inner diameter r2 of the weight portion 23 is not particularly limited.

The material that configures the weight portion 23 may be appropriately selected in consideration of mass, cost, or the like, and the kind thereof is not particularly limited. From the viewpoint of the size reduction and the improvement of sound-blocking performance of the sound-blocking sheet member 100 and the sound-blocking structure 200, the material that configures the weight portion 23 is preferably a material having a high specific gravity.

Specific examples thereof include metals or alloys such as aluminum, stainless steel, iron, tungsten, gold, silver, copper, lead, zinc, and brass; inorganic glass such as soda glass, quartz glass, and lead glass; composites containing the powder of these metals or alloys, these inorganic glasses, or the like in the resin material of the above-described base portion 22; and the like, but the material is not particularly limited thereto. The material, mass, and specific gravity of the weight portion 23 may be determined such that the sound-blocking sheet member 100 and the sound-blocking structure 200 acoustic bandgap matches a desired sound-blocking frequency range.

Among these, at least one selected from the group consisting of metal, alloy, and inorganic glass is preferable from the viewpoint of a low cost, a high specific gravity, or the like. It should be noted that the specific gravity means the ratio between the mass of a material and the mass of an equal volume of pure water at a pressure of 1013.25 hPa and 4° C., and, in the present specification, a value measured by JIS K 0061 "Test methods for density and relative density of chemical products" is used.

On the surface (also including the through-hole) of the weight portion 23, a surface treatment may be performed in order to enhance process suitability or member strength. For example, it is conceivable to perform a chemical treatment with a solvent or the like for enhancing the sticking property to the base portion 22 or to perform a physical treatment that increases the member strength by providing a protrusion and a recess on the surface, but the method for the surface treatment is not particularly limited.

In the present embodiment, the weight portion 23 is buried in the base portion 22 at the front end side of the resonance portion 21, but the installation position thereof is not particularly limited thereto. While depending on the shapes, masses, elastic moduli, and the like of the base portion 22 and the weight portion 23, the base portion 22 and the weight portion 23 are preferably disposed such that the center of gravity (mass center) of the resonance portion 21 is positioned at least on the front end side of the center of the resonance portion 21 in the height direction from the viewpoint of the thickness reduction, weight reduction, or sound-blocking performance improvement of the sound-blocking sheet member 100. Typically, the weight portion 23 may be offset-disposed on the front end side of the center of the resonance portion 21 in the height direction.

It should be noted that the weight portion 23 may be buried completely or only partially in the base portion 22 or may be provided on the base portion 22 without being buried in the base portion 22. (The detail will be described below) In addition, in a case where the base portion 22 has a branched structure, from the viewpoint of the weight reduction or sound-blocking performance improvement of the sound-blocking sheet member, the weight portion 23 is preferably disposed so as to be positioned on the front end side of the center of a branch portion provided from a branch point in a case where the weight portion is provided at the branch portion.

Furthermore, the shapes and heights of the plurality of weight portions 23 included in the sound-blocking sheet member may be identical or different.

It should be noted that, while the plurality of resonance portions 21 are provided on the sheet surface 11a of the sheet 11, the material that configures the resonance portion 21, the array, shape, and size of the resonance portion 21, the installation direction of the resonance portion 21, and the like may not be identical at all times in all of the plurality of resonance portions 21. When a plurality of kinds of the resonance portions 21 that are different in at least one of the above-described properties are installed, it is possible to expand the frequency range in which high sound-blocking performance appears.

[Support]

The sound-blocking sheet member 100 of the present invention can be appropriately installed in accordance to an environment in which the sound-blocking performance is developed. For example, the sound-blocking sheet member 100 may be installed directly on a device, a structure, or the like. Between the sound-blocking sheet member 100 and the device, the structure, or the like, an adhesive layer or the like may be provided. In addition, the sound-blocking sheet member 100 may be used in a form of being supported by the support 51. The support may support the sound-blocking sheet member 100 at the time of blocking sound using the sound-blocking sheet member 100 of the present invention, and the sound-blocking sheet member may not be supported by the support 51 during manufacturing, storage, or the like.

The support 51 may be provided in contact with at least one surface of the sheet portion 11 of the sound-blocking sheet member 100 and may be provided on at least one of the sheet surface 11a on which the resonance portions 21 are provided in contact and the other sheet surface 11b.

In the present embodiment, the support 51 is provided on the sheet surface 11b side on the rear side of the sheet portion 11. The material that configures the support 51 is not particularly limited as long as the material is capable of supporting the sheet portion 11, but is preferably a material having higher stiffness than the sheet portion 11 from the viewpoint of enhancing the sound-blocking performance. Specifically, the support 51 preferably has a Young's modulus of 1 GPa or more and more preferably has a Young's modulus of 1.5 GPa or more. The upper limit is not particularly limited and is, for example, 1000 GPa or less.

In addition, in a case where the sound-blocking sheet member 100 is installed directly on a device, a structure, or the like, the surface on which the sound-blocking sheet member 100 is installed preferably has the same stiffness as the support 51 from the viewpoint of supporting the sheet portion 11, the viewpoint of enhancing the sound-blocking performance, or the like.

The material that configures the support 51 is not particularly limited. Examples thereof include a photocurable resin sheet, a thermosetting resin sheet, a thermoplastic resin sheet, a metal plate, an alloy plate, and the like. Examples of the photocurable resin sheet, the thermosetting resin sheet, and the thermoplastic resin sheet include sheets and the like for which the photocurable resin, the thermosetting resin, and the thermoplastic resin exemplified in the section of the base portion are used.

Specific examples of the material that configures the support 51 include, for example, polyester resins such as polyethylene terephthalate, polybutylene terephthalate, polyethylene naphthalate, and polybutylene succinate, poly(meth)acrylate resins such as polymethylmethacrylate, polycarbonate resins such as polycarbonate containing isosorbide as a main raw material, polyolefin resins such as polyethylene, polypropylene, and polynorbornene, organic materials such as vinyl chloride resins, polyacrylonitrile, polyvinylidene chloride, polyether sulfone, polyphenylene sulfide, polyarylate, polyamide, polyimide, triacetyl cellulose, polystyrene, epoxy resins, and oxazine resins, composite materials containing metal such as aluminum, stainless steel, iron, copper, zinc, or brass, inorganic glass, inorganic particles, or a fiber in the organic material, and the like.

Among these, the support is preferably at least one kind selected from the group consisting of a photocurable resin sheet, a thermosetting resin sheet, a thermoplastic resin sheet, a metal plate, and an alloy plate from the viewpoint of sound-blocking property, stiffness, moldability, cost, and the like. Here, the thickness of the support 51 is not particularly limited, but is, usually, preferably 0.05 mm or more and 0.5 mm or less from the viewpoint of sound-blocking performance, stiffness, moldability, weight reduction, cost, and the like.

Furthermore, the support 51 may have a coating layer provided on the surface of the support 51 from the viewpoint of light permeability, a sticking property to the sound-blocking sheet member, or the like.

It should be noted that the shape of the support 51 can be appropriately set depending on the installation surface of the sound-blocking structure 200 and is not particularly limited.

For example, the shape of the support 51 may be a flat sheet shape, a curved sheet shape, or a special shape processed so as to have a curved surface portion, a folded portion, or the like. Furthermore, from the viewpoint of weight reduction or the like, a notch, a punched portion, or the like may be provided at any place in the support 51.

In addition, the surface density (mass per unit area) of the support 51 can be appropriately set depending on desired performance and is not particularly limited. From the viewpoint of enhancing the effect of the present invention, the surface density of the support 51 is preferably 80% or less, more preferably 30% or less, and still more preferably 10% or less of the surface density of the sound-blocking sheet member 100.

[Manufacturing Method]

The method for manufacturing a sound-blocking sheet member and a sound-blocking structure of the present invention may include the following steps (1) to (4).

(1) A step of preparing a mold having a plurality of cavities.
(2) A step of disposing weight portions in a plurality of cavities provided in the mold.
(3) A step of pouring a resin material into the cavities.
(4) A step of curing the poured resin material.
(5) A step of peeling the obtained cured product from the mold.

After the step (4) or the step (5), a step of providing a support in a shape of the obtained cured product may also be provided. The shape of a cavity used in each manufacturing method is not particularly limited, and, for example, as the shape of the bottom, it is possible to appropriately select a hemispherical shape, a planar shape, a protrusion shape, a recess shape, or the like.

From the viewpoint of enhancing the productivity and the economic efficiency, a method in which the sound-blocking sheet member 100 is integrally molded by mold molding, casting mold molding, or the like is preferable. As an example thereof, exemplified is a method in which an integrally molded product of the sheet portion 11 and the resonance portions 21 is molded using a mold or a casting mold with cavities having shapes corresponding to the integrally molded product of the sheet portion 11 and the resonance portions 21. As such an integral molding method, known are a variety of well-known methods such as a press molding method, a compression molding method, transfer molding, a casting molding method, an extrusion molding method, and an injection molding method, and the kind thereof is not particularly limited. It should be noted that, as long as the raw material of each component is, for example, a resin material having rubber elasticity, it is possible to pour the raw material into the cavities in a form of a liquid-phase precursor or a heated melt. In addition, as long as the raw material is metal, an alloy, or inorganic glass, it is possible to dispose (insert) the raw material in advance at a predetermined position in the cavity.

The resin material is not particularly limited. Examples thereof include a sheet that is the sound-blocking sheet member of the present invention, the materials exemplified in the sections of the base portion and the like, the raw materials and intermediates thereof, and the like.

Subsequently, the method for manufacturing the sound-blocking sheet member 100 will be described with reference to FIG. 16 to FIG. 20. Here, a configuration in which the sound-blocking sheet member 100 is manufactured by transfer molding using a mold will be described as an example.

FIG. 16 is a cross-sectional view showing the mold MD.

The mold MD includes upper molds M11 and M12 and lower molds M21 and M22. A press hot plate 161 is integrally fixed to the upper side of the upper mold M12. A press hot plate 62 is integrally fixed to the lower side of the lower mold M22. When the upper mold M11 and the lower mold M21 are joined, a space for molding the sound-blocking sheet member 100 is formed.

It should be noted that FIG. 16 to FIG. 44 show six resonance portions 21 molded in a row in order to facilitate understanding, but the number of the resonance portions 21 in a row is not limited to six and can be set to any number. In addition, each dimension of the component of the sound-blocking sheet member 100 including the resonance portion 21 and each dimension of the mold MD corresponding to the component are mapped in consideration of a dimensional change accompanied by, for example, a temperature change of the resin material such that the sound-blocking sheet member 100 having desired dimensions is molded after the steps (3) to (5); however, in the following description, the mapping of the dimensions will not be described.

Figure 17:
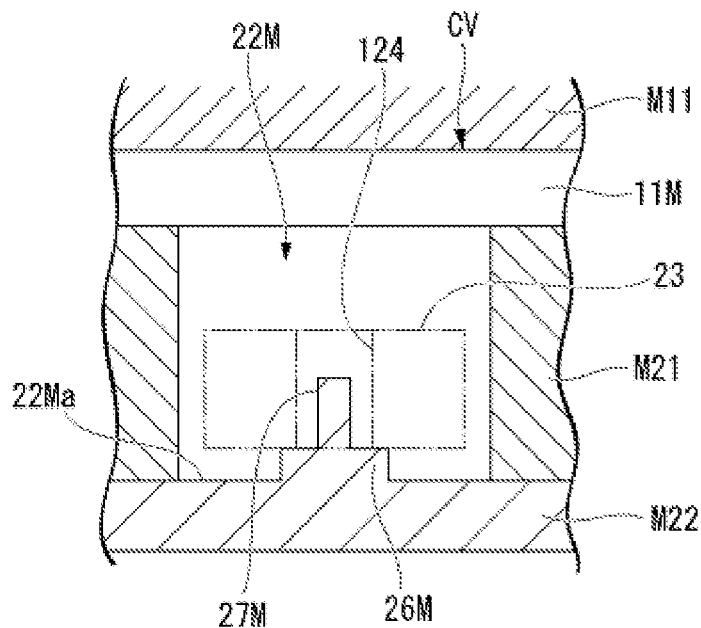
FIG. 17 is a partial detailed view of a cavity CV, which is a space in which the resonance portion 21 is to be molded.

The lower mold M21 and the lower mold M22 are relatively movable in the vertical direction such that the lower mold M21 is capable of moving apart or close to the lower mold M22 in a state of being disposed on the lower mold M22 side. The lower mold M21 has a recessed portion 11M that corresponds to the sheet portion 11 formed on an upper surface M21a. FIG. 17 is a partial detailed view of a cavity CV, which is a space in which the resonance portion 21 is to be molded.

As shown in FIG. 17, in the lower mold M21, a recessed portion 22M in which the base portion 22 is to be molded is formed so as to penetrate the lower mold M21 in the vertical direction. The lower mold M22 has an upper surface 22Ma forming the bottom portion of the cavity CV, a core portion (step portion) 26M and a core portion (projection portion) 27M that protrude from the upper surface 22Ma toward the recessed portion 22M.

The core portion 26M is a portion for molding the indented portion 26 in the resonance portion 21 and is formed in a cylindrical shape. The diameter of the core portion 26M is formed to be larger than the through-hole 124 in the weight portion 23. The height of the core portion 26M corresponds to the thickness of the coating portion 125 in the base portion 22. The core portion 26M protrudes to a height lower than the core portion 27M. The core portion 27M is a portion for forming the void 27 in the resonance portion 21 and is formed in a cylindrical shape. The diameter of the core portion 27M is formed to be smaller than the through-hole 124 in the weight portion 23. The height of the core portion 27M is formed to be smaller than the thickness of the weight portion 23.

It should be noted that, in addition to a definition in which the core portion 26M having a larger outer diameter than the core portion 27M protrudes from the upper surface 22Ma and the core portion 27M having a smaller outer diameter than the core portion 26M protrudes from the front end surface of the core portion 26M from the front end surface of the core portion 26M, a definition in which the core portion 27M having a smaller outer diameter than the core portion 26M protrudes from the upper surface 22Ma and the ring-shaped core portion 26M having a larger outer diameter than the core portion 27M protrudes from the upper surface 22Ma in a state of being in contact with the outer peripheral surface of the core portion 27M is possible.

The maximum value of the gap in the radial direction (a surface direction of the recessed portion 11M in which the recessed portions 22M and the core portions 26M and 27M are arrayed; the surface direction of the sheet portion 11 (a direction perpendicular to an axial line when the center of the resonance portion 21 in the radial direction is defined as the axial line) between the core portion 27M and the through-hole 124 is formed to be smaller than the minimum value of the gap in the radial direction between the recessed portion 22M and the weight portion 23.

The cavity CV in which the resonance portion 21 is to be molded is a space including the recessed portion 22M surrounded by the upper surface 22Ma, the core portion 26M, the core portion 27M, and a lower surface M11*a* of the upper mold M11 (refer to FIG. 16 and FIG. 17).

Figure 18:
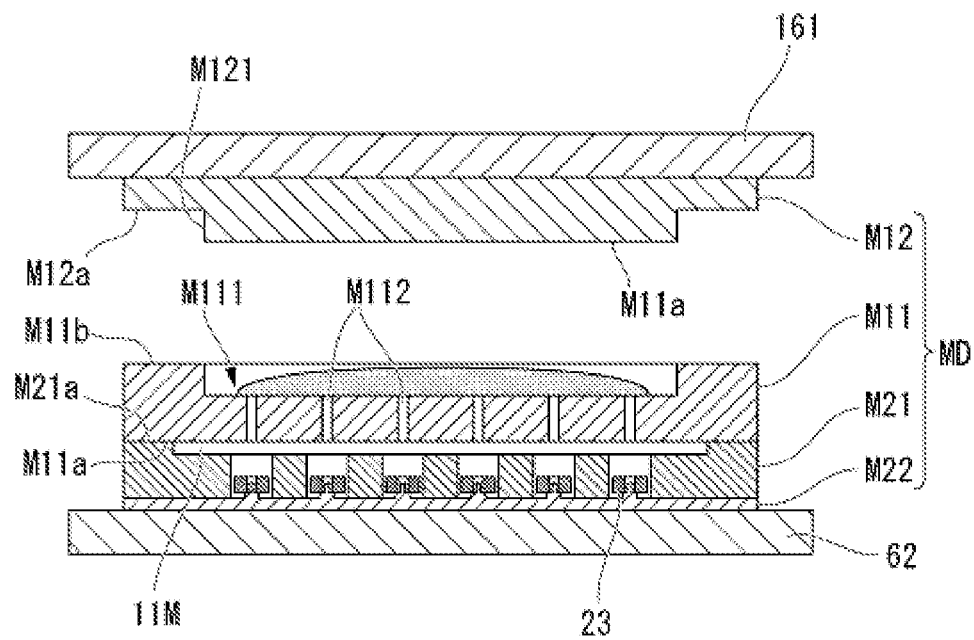
FIG. 18 is a view showing an order of manufacturing the sound-blocking sheet member 100, which is an embodiment according to the present invention.

The upper mold M11 and the upper mold M12 are relatively movable in the vertical direction such that the upper mold M11 is capable of moving apart or close to the upper mold M12 in a state of being disposed on the upper side (refer to FIG. 18). The upper mold M11 has an indentation (pot) M111 and a plurality of through-holes M112 that are open in the indentation M111 and penetrate the upper mold M11 in the vertical direction on an upper surface M11*b*. The through-holes M112 are disposed at positions facing the recessed portion 11M.

The upper mold M12 has a projection portion (plunger) M121 protruding from a lower surface M12*a*. The projection portion M121 is inserted into the indentation M111 of the upper mold M11 when the upper surface M11*b* of the upper mold M11 and the lower surface M12*a* of the upper mold M12 come into contact with each other.

Next, a method for manufacturing the sound-blocking sheet member 100 using the above-described mold MD will be described. In the mold MD prepared in the step (1), as shown in FIG. 16, formed is a state in which the upper mold M11 and the upper mold M12 are in contact with each other, the lower mold M21 and the lower mold M22 are in contact with each other, and the upper mold M11 and the lower mold M21 are spaced apart from each other.

Subsequently, in the step (2), the weight portions 23 are each disposed in the plurality of cavities CV from a gap in which the upper mold M11 and the lower mold M21 are spaced apart. Each weight portion 23 is placed on the core portion 26M in a state in which the core portion 27M is inserted into the through-hole 124. The weight portion 23 is placed on the core portion 26M, whereby a gap is formed between the weight portion 23 and the upper surface 22Ma.

Here, since the maximum value of the gap in the radial direction between the core portion 27M and the through-hole 124 is formed to be smaller than the minimum value of the gap in the radial direction between the recessed portion 22M and the weight portion 23, even in a case where the weight portion 23 is unevenly placed with respect to the core portion 27M, it is possible to suppress the outer peripheral surface of the weight portion 23 coming into contact with the inner peripheral surface of the recessed portion 22M (that is, the lower mold M21).

Subsequently, in the step (3), a resin material (for example, a thermosetting resin) is poured into the cavities CV.

Specifically, first, as shown in FIG. 18, in a state in which the lower mold M21 and the lower mold M22 are in contact with each other and the upper mold M11 and the lower mold M21 are in contact with each other, the upper mold M11 and the upper mold M12 are spaced apart. Next, the resin material in a semi-cured state is supplied to the indentation M111 of the upper mold M11.

Figure 19:
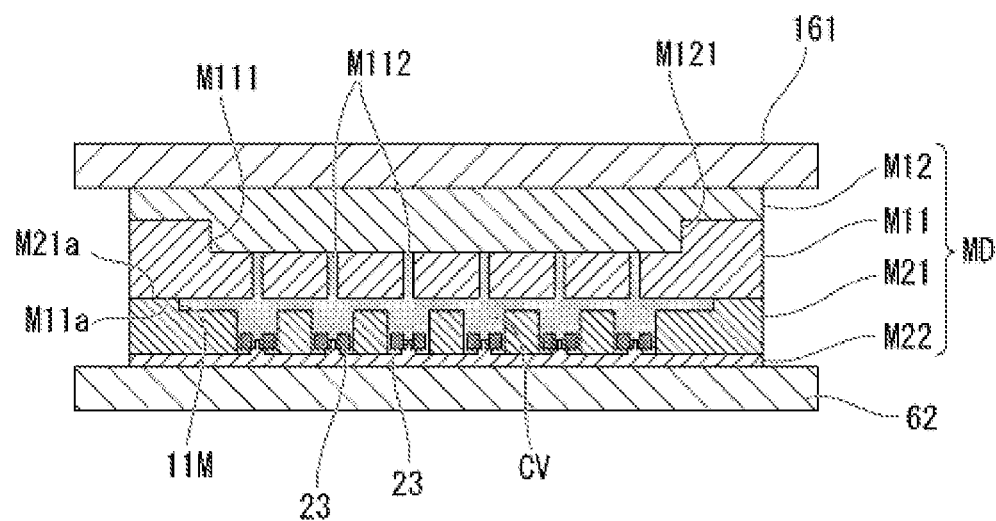
FIG. 19 is a view showing the order of manufacturing the sound-blocking sheet member 100, which is an embodiment according to the present invention.

Subsequently, as shown in FIG. 19, the projection portion M121 of the upper mold M12 is inserted into the indentation M111 of the upper mold M11 to compress the resin material.

The compressed resin material is poured into the recessed portion 11M and the cavities CV through the through-holes M112. The insides of the recessed portions 22M (including the insides of the through-holes 124) excluding the weight portions 23, the core portions 26M and 27M are filled with the resin material that has been poured into the cavities CV.

Here, when the resin material is poured into the cavities CV, there is a possibility that the weight portion 23 may move due to the flow of the resin material, but the core portion 27M is inserted into the through-hole 124 to regulate the position in the radial direction, and thus the weight portion 23 becoming significantly uneven in the cavity CV is suppressed. Particularly, since the maximum value of the gap in the radial direction between the core portion 27M and the through-hole 124 is formed to be smaller than the minimum value of the gap in the radial direction between the recessed portion 22M and the weight portion 23, it is possible to suppress the outer peripheral surface of the weight portion 23 coming into contact with the inner peripheral surface of the recessed portion 22M (that is, the lower mold M21), which prevents a portion between the outer peripheral surface of the weight portion 23 and the inner peripheral surface of the recessed portion 22M from being filled with the resin material and causes the outer peripheral surface of the weight portion 23 to be exposed.

Subsequently, in the step (4), the resin material made to fill the cavities CV is cured by being heated with the press hot plates 161 and 62 for a certain period of time. Therefore, the sound-blocking sheet member 100 is molded in the inside between the upper mold M11 and the lower mold M21.

Subsequently, in the step (5), the obtained cured product is peeled from the mold MD.

Figure 20:
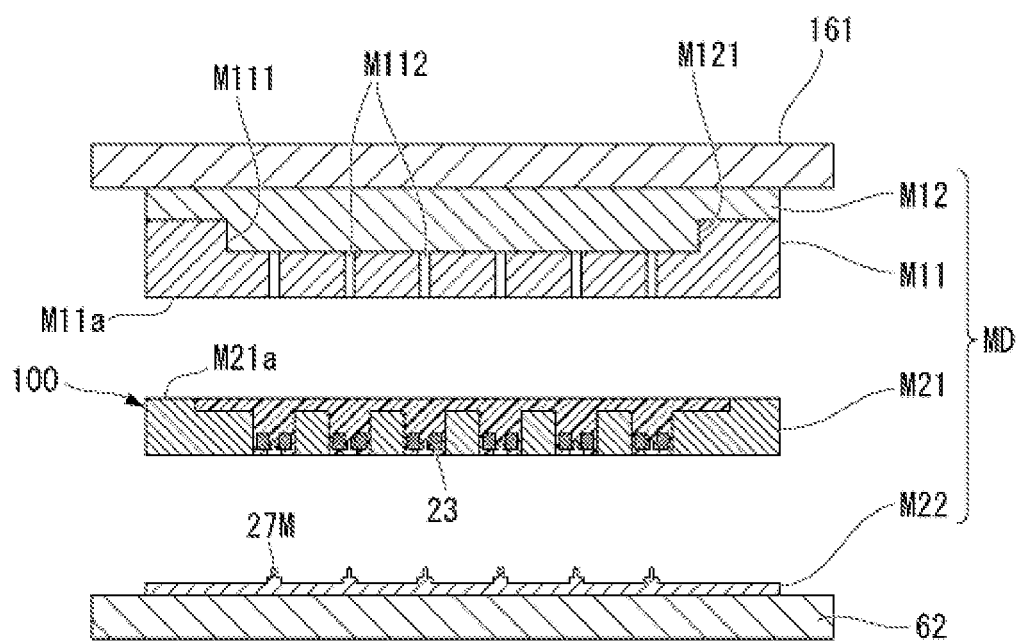
FIG. 20 is a view showing the order of manufacturing the sound-blocking sheet member 100, which is an embodiment according to the present invention.

Specifically, as shown in FIG. 20, first, the upper mold M11 and the lower mold M21 are spaced apart, thereby separating the cured products caused to fill the through-holes M112 and the sound-blocking sheet member 100 (sheet portion 11). Next, the lower mold M21 and the lower mold M22 are spaced apart, thereby releasing the core portions 27M from the through-holes 124 in the weight portions 23. Therefore, the sound-blocking sheet member 100, which is a cured product, is supported by the lower mold M21 from below. In addition, the cured product is peeled from the upper surface side of the lower mold M21, thereby obtaining the sound-blocking sheet member 100.

It should be noted that, as the above-described molding, transfer molding has been exemplified, but the molding may be press molding (compression molding) in which the raw material is directly charged on the lower mold M21 and pressed with the upper mold M11. In addition, in the case of using casting molding, in the step, the upper mold is not necessarily required, and the liquid-phase raw material is poured by the force of gravity or the like. In addition, in the case of using injection molding, in the step, the resin in a molten state or in a liquid state is made to fill the mold with a plunger or a screw after the mold is closed.

In addition, in the above-described embodiment, a configuration in which the resin material is cured by supplying heat using the press hot plates 161 and 62 has been exemplified, but a heat source such as a heater may be directly disposed in the upper molds M11 and M12 and the lower molds M21 and M22. In addition, in the case of press molding or injection molding using a thermoplastic resin, a cooling pipe or the like for promoting the solidification of the resin may be disposed in or around the mold.

In addition, in the above-described mold MD, a configuration in which the lower mold M21 having the recessed portions 22M and the lower mold M22 having the core portions 26M and 27M are divided has been exemplified, but this is a configuration for easily releasing the sound-blocking sheet member 100, and the lower mold M21 and the lower mold M22 may be integrated in the configuration.

Furthermore, in the above-described embodiment, a configuration in which the resin material in a semi-cured state is supplied to the indentation M111 of the upper mold M11 and compressed has been exemplified, but the configuration is not limited to this configuration. For example, a solid material of the resin may be inserted into the indentation M111 of the upper mold M11, and the solid material may be pushed into the cavities CV with a press plate (press mold) that is inserted into the indentation M111.

As described above, in the sound-blocking sheet member 100 and the manufacturing method therefor of the present embodiment, since the resin is poured into the cavities CV in a state in which the core portions 27M of the lower mold M22 are inserted into the through-holes 124 in the weight portions 23, it is possible to suppress the positions of the weight portions 23 becoming significantly uneven with respect to the base portions 22. Therefore, it is possible to suppress the outer peripheral surface of the weight portion 23 being exposed and released from the base portion 22 or being rusted.

Furthermore, in the sound-blocking sheet member 100 and the manufacturing method therefor of the present embodiment, since the core portion 26M comes into contact with a part of the front end of the weight portion 23 from below, it becomes possible to provide the coating portion 125 that coats the front end side of the weight portion 23 at the front end of the resonance portion 21, and it is possible to suppress the weight portion 23 being released from the base portion 22 or the weight portion 23 being rusted with the coating portion 125.

It should be noted that, in the above-described embodiment, a configuration in which the portion between the void 27 and the inner peripheral surface of the through-hole 124 in the weight portion 23 (that is, the portion between the core portion 27M and the inner peripheral surface of the through-hole 124 during molding) is filled with the resin material has been exemplified, but the configuration is not limited to this configuration. For example, the outer peripheral surface of the core portion 27M may be fitted into the through-hole 124 in the configuration, and the outer peripheral surface of the void 27 may be formed of the inner peripheral surface of the through-hole 124 in the configuration. In the case of adopting this configuration, it becomes possible to dispose the weight portion 23 coaxially with respect to the base portion 22 without becoming uneven. Therefore, it is possible to stabilize the sound-blocking characteristics in the sound-blocking sheet member 100.

[Fourth Embodiment of Sound-Blocking Sheet Member and Manufacturing Method]

Subsequently, a fourth embodiment of the sound-blocking sheet member 100 and a manufacturing method therefor will be described with reference to FIG. 21 and FIG. 22.

In these drawings, the same element as the component of the third embodiment shown in FIG. 11 to FIG. 20 will be given the same reference sign and will not be described again. In addition, in the fourth embodiment, the configuration of a resonance portion is different from that in the third embodiment, and thus the resonance portion will be described below.

Figure 21:
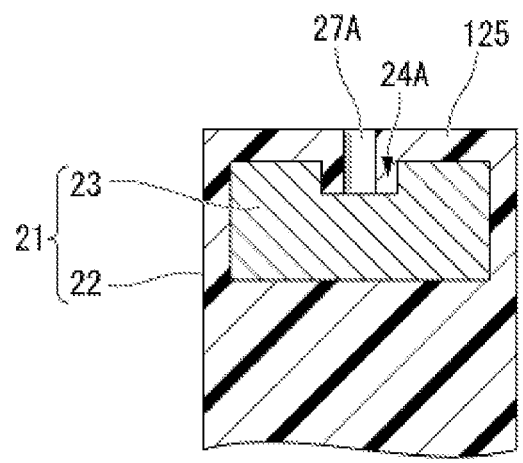
FIG. 21 is a partial cross-sectional view of the resonance portion 21 in which the weight portion 23 is buried in the base portion 22, which is an embodiment according to the present invention.

FIG. 21 is a partial cross-sectional view of the resonance portion 21 in which the weight portion 23 is buried in the base portion 22. FIG. 22 is a partial detailed view of the cavity CV, which is a space in which the resonance portion 21 is to be molded.

As shown in FIG. 21, a recessed portion 24A that is coaxially indented with the outer peripheral surface of the weight portion 23 is provided on the surface on the front end side of the weight portion 23. As an example, the recessed portion 24A is circular in a plan view.

The base portion 22 has a void 27A that is open on the surface on the front end side and on the bottom surface of the recessed portion 24A and extends in the vertical direction. The void 27A opens on the bottom surface of the recessed portion 24A, whereby a part of the weight portion 23 is exposed on the front end side through the void 27A.

Figure 22:
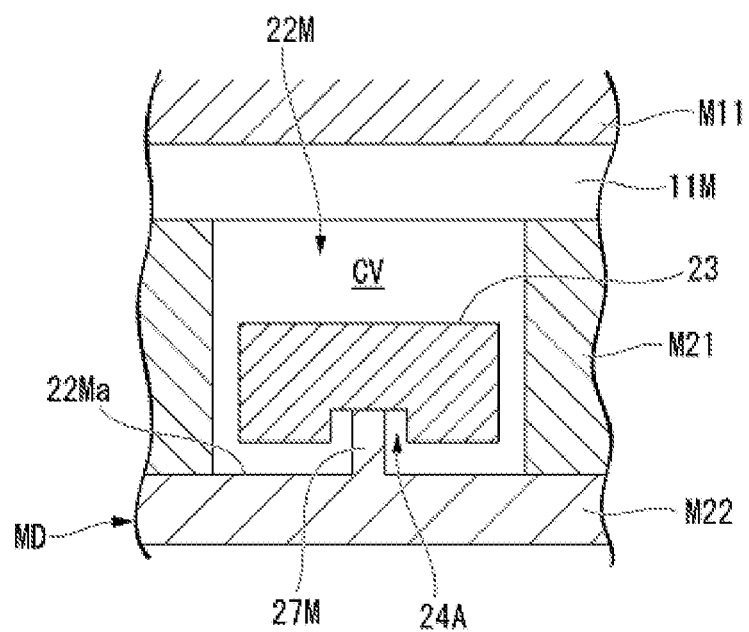
FIG. 22 is a partial detailed view of the cavity CV, which is a space in which the resonance portion 21, which is an embodiment according to the present invention, is to be molded.

As shown in FIG. 22, a cylindrical core portion 27M for forming the void 27A protrudes from the lower mold M22 in the mold MD. The diameter of the core portion 27M is smaller than the diameter of the recessed portion 24A. The height (protrusion amount) of the core portion 27M is set to a value at which the coating portion 125 shown in FIG. 21 is molded in a predetermined thickness between the weight portion 23 and the upper surface 22Ma when the front end surface supports the bottom surface of the recessed portion 24A from below.

The weight portion 23 is placed in a state in which the core portion 27M in the mold MD having the above-described configuration is inserted into the recessed portion 24A, and then the above-described resin material is poured into the cavity CV and cured, whereby the resonance portion 21 shown in FIG. 21 is molded.

The resonance portion 21 of the present embodiment is capable not only of obtaining the same action and effect as the resonance portion 21 described in the third embodiment, but also of decreasing the diameter of the void 27A and increasing the area of the coating portion 125. Therefore, it is possible to further suppress the weight portion 23 being released from the base portion 22 or the weight portion 23 being rusted.

[Fifth Embodiment of Sound-Blocking Sheet Member and Manufacturing Method]

Subsequently, a fifth embodiment of the sound-blocking sheet member 100 and a manufacturing method therefor will be described with reference to FIG. 23 to FIG. 27.

In these drawings, the same element as the component of the third and fourth embodiments shown in FIG. 11 to FIG. 22 will be given the same reference sign and will not be described again.

Figure 23:
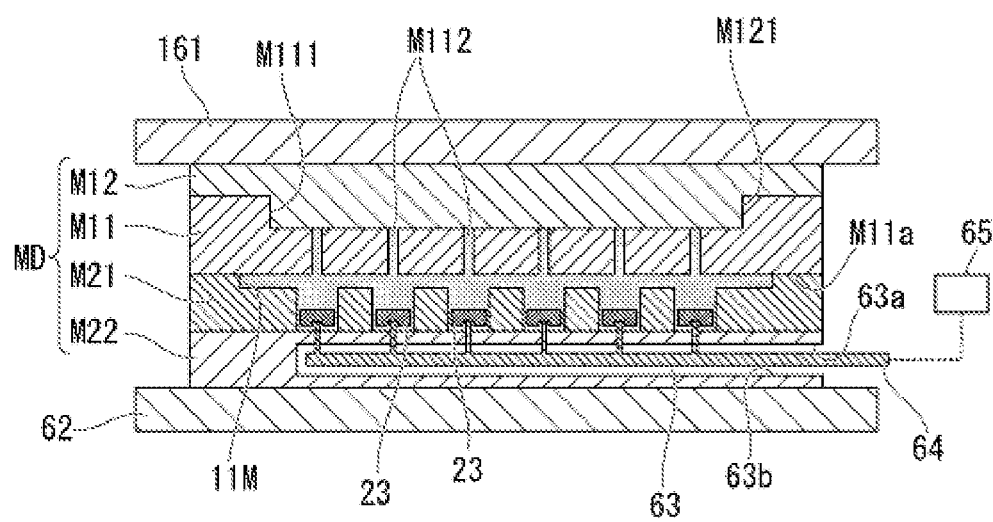
FIG. 23 is a cross-sectional view of the mold MD, which is an embodiment according to the present invention.
Figure 24:
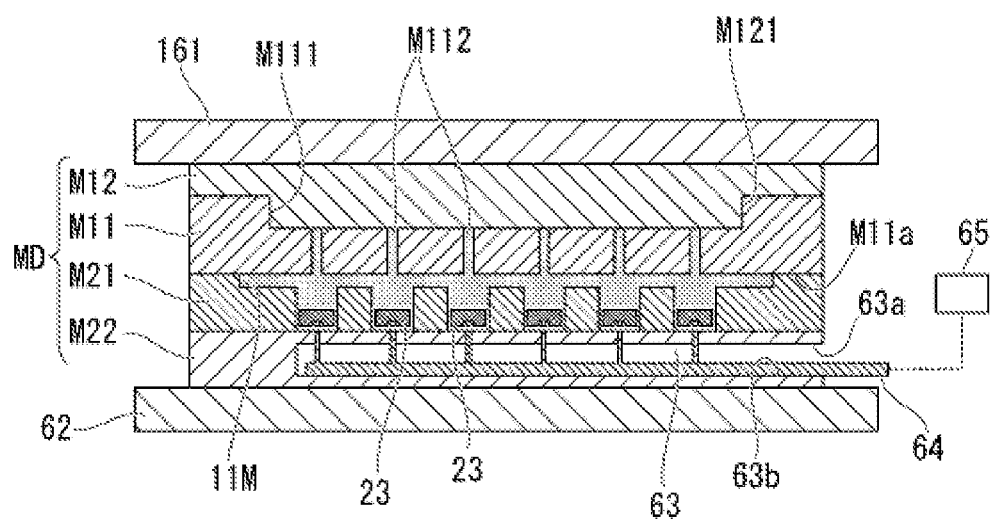
FIG. 24 is a cross-sectional view of the mold MD, which is an embodiment according to the present invention.

FIG. 23 and FIG. 24 are cross-sectional views showing a mold MD according to the fifth embodiment.

As shown in FIG. 23, in the lower mold M22, a hollow portion 63 extending in the surface direction is provided in the middle of the thickness direction (vertical direction). In the hollow portion 63, a moving portion 64 extending in the surface direction is provided. The moving portion 64 is movable in the vertical direction by driving with a driving device 65 between an upper end position (position shown in FIG. 23) at which the moving portion 64 comes into contact with an upper surface 63a facing the hollow portion 63 and a lower end position shown in FIG. 24 at which the moving portion 64 comes into contact with a lower surface 63b facing the hollow portion 63.

Figure 25:
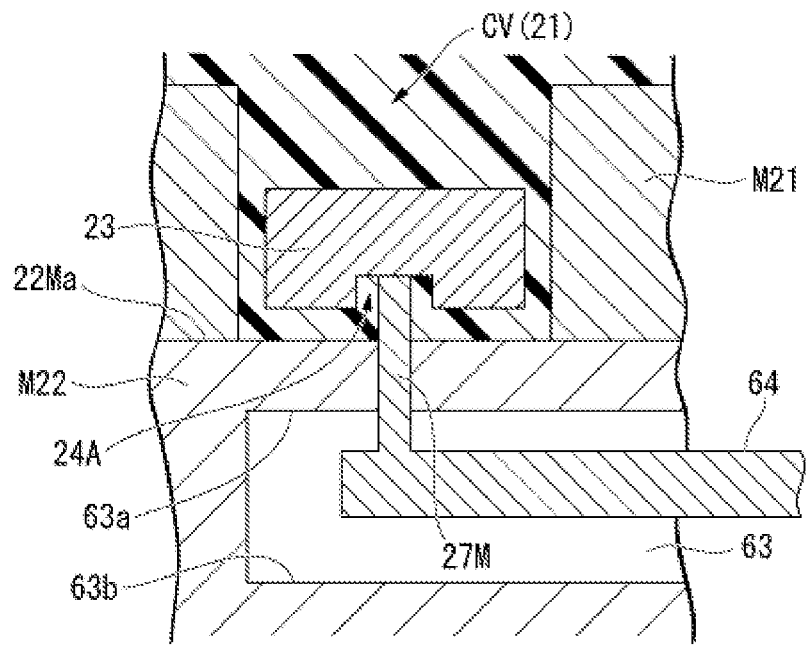
FIG. 25 is a partial detailed view of the cavity CV, which is a space in which the resonance portion 21, which is an embodiment according to the present invention, is to be molded.
Figure 26:
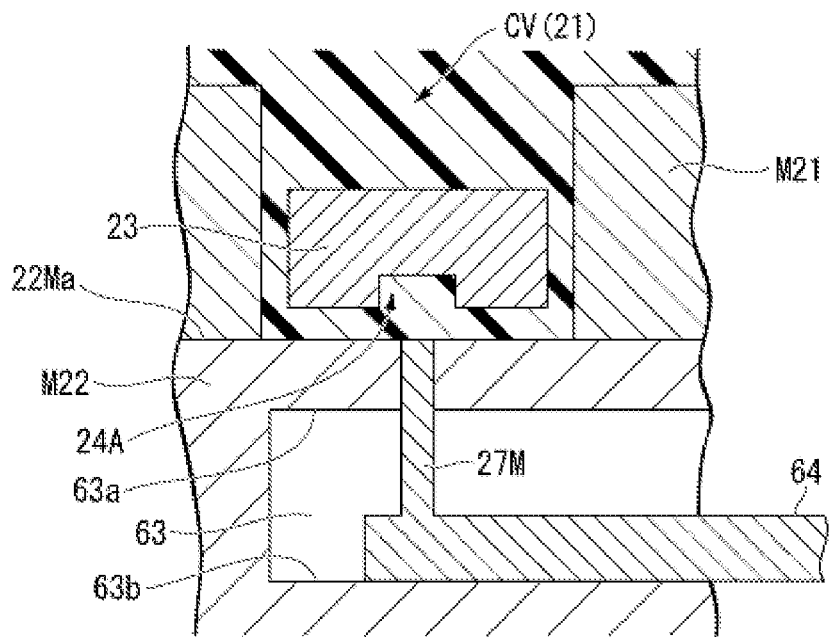
FIG. 26 is a partial detailed view of the cavity CV, which is a space in which the resonance portion 21, which is an embodiment according to the present invention, is to be molded.

FIG. 25 and FIG. 26 are partial detailed views of the cavity CV, which is a space in which the resonance portion 21 is to be molded. FIG. 25 and FIG. 26 show a state in which the resin material has been poured into the cavity CV. In addition, in FIGS. 25 and FIG. 26, the recessed portion 11M and the upper mold M11 are not shown.

The core portion 27M of the present embodiment extends in the vertical direction, is fixed to the moving portion 64 at the lower end, and penetrates the lower mold M22. When the moving portion 64 is at the upper end position, the core portion 27M supports the bottom surface of the recessed portion 24A from below at a position in the vertical direction at which the coating portion 125 is to be formed in a predetermined thickness between the weight portion 23 and the upper surface 22Ma as shown in FIG. 25.

In addition, when the moving portion 64 is at the lower end position, the core portion 27M becomes flush with the upper surface 22Ma as shown in FIG. 26.

In the mold MD having the above-described configuration, the moving portion 64 is moved to the upper end position by driving with the driving device 65, and then the weight portion 23 is placed in a state in which the core portion 27M is inserted into the recessed portion 24A. After that, the above-described resin material is poured into the cavity CV. In addition, before the resin material reaches the periphery of the core portion 27M and the resin material is completely cured, the core portion 27M is moved to the lower end position together with the moving portion 64 by driving with the driving device 65 to make the front end surface of the core portion 27M flush with the upper surface 22Ma.

The resin material is poured into the cavity CV, whereby the resin material before curing enters the region in the cavity CV in which the core portion 27M was provided due to the movement of the core portion 27M.

As a result, as shown in FIG. 26, the resonance portion 21 in which the front end side of the weight portion 23 is fully coated with the resin material is obtained.

Figure 27:
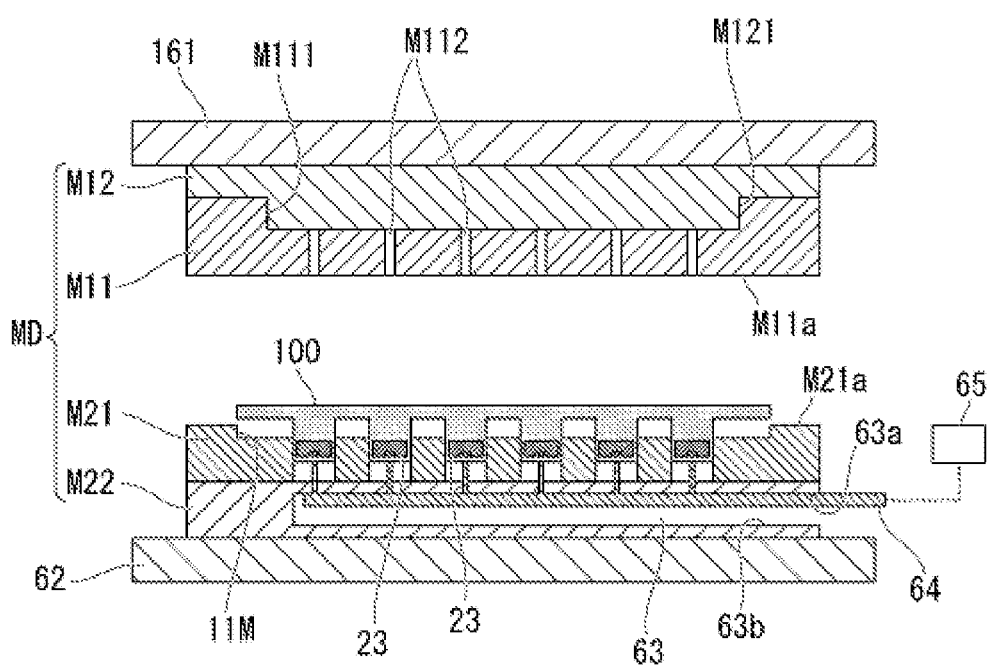
FIG. 27 is a cross-sectional view of the mold MD, which is an embodiment according to the present invention.

After that, once the resin material is cured, the moving portion 64 is moved to the upper end position again by driving with the driving device 65. Therefore, as shown in FIG. 27, the front ends of the core portions 27M pushes out the end portions of the resonance portions 21 from below, and the sound-blocking sheet member 100 is released from the lower mold M21.

As described above, in the present embodiment, not only can the same action and effect as in the third and fourth embodiments be obtained, but it also becomes possible to coat the entire front end side of the weight portion 23 with the resin material while regulating the position in the surface direction of the weight portion 23 in the middle of molding by moving the core portion 27M during molding. Furthermore, in the present embodiment, the core portions 27M are moved to the upper end position after the curing of the resin material, whereby it becomes possible to easily release the sound-blocking sheet member 100 from the lower mold M21, the productivity improves, and additionally, it is also possible to reduce a defect that is generated during mold release. In addition, the weight portion 23 may have a through-hole as in the third, sixth, seventh, and eighth embodiments, and, in that case, the core portions 26M and 27M are fixed to the moving portion 64, and the upper surface of the core portion 26M becomes flush with the upper surface 22Ma when the moving portion 64 is at the lower end.

[Sixth Embodiment of Sound-Blocking Sheet Member and Manufacturing Method]

Subsequently, a sixth embodiment of the sound-blocking sheet member 100 and a manufacturing method therefor will be described with reference to FIG. 28 to FIG. 30.

In these drawings, the same element as the component of the third embodiment shown in FIG. 11 to FIG. 20 will be given the same reference sign and will not be described again.

Figure 28:
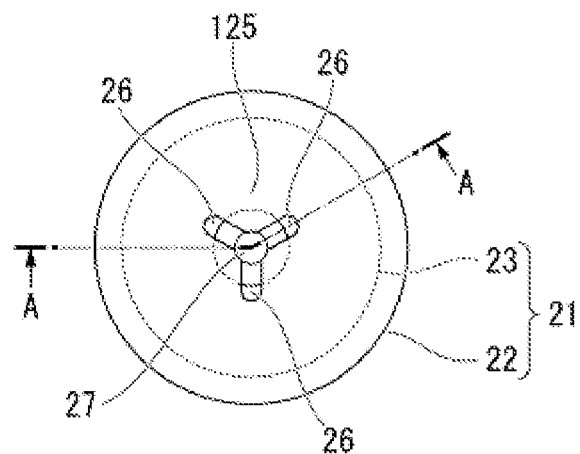
FIG. 28 is a plan view of the resonance portion 21, which is an embodiment according to the present invention.
Figure 29:
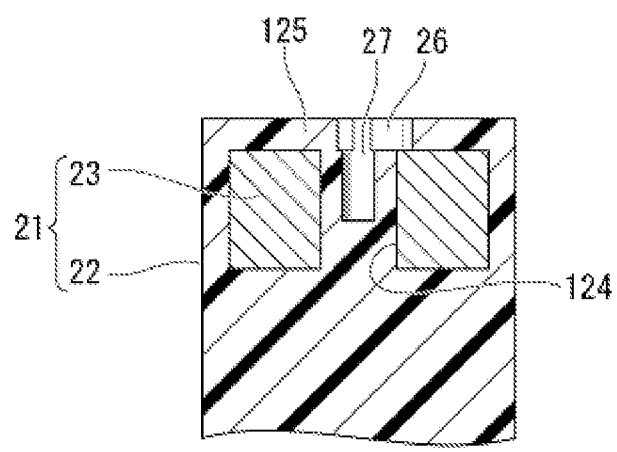
FIG. 29 is a cross-sectional view taken along a line A-A in FIG. 28.

FIG. 28 is a plan view of the resonance portion 21. FIG. 29 is a cross-sectional view taken along the line A-A in FIG. 28. FIG. 30 is a partial detailed view of the cavity CV, which is a space in which the resonance portion 21 is to be molded.

In the third embodiment, a configuration in which the indented portion 26 provided in the resonance portion 21 has a circular shape in a plan view has been exemplified; however, in the present embodiment, as shown in FIG. 28, a plurality of indented portions provided at intervals in the circumferential direction are formed. Specifically, as shown in FIG. 28 and FIG. 29, the indented portions 26 extend in the radial direction from the void 27 as the center. A plurality of the indented portions 26 (here, three at 120° intervals) are provided at intervals in the circumferential direction around the void 27. The position of the outer side of the indented portion 26 in the radial direction is outside the inner peripheral surface of the through-hole 124 and inside the outer peripheral surface of the weight portion 23.

Figure 30:
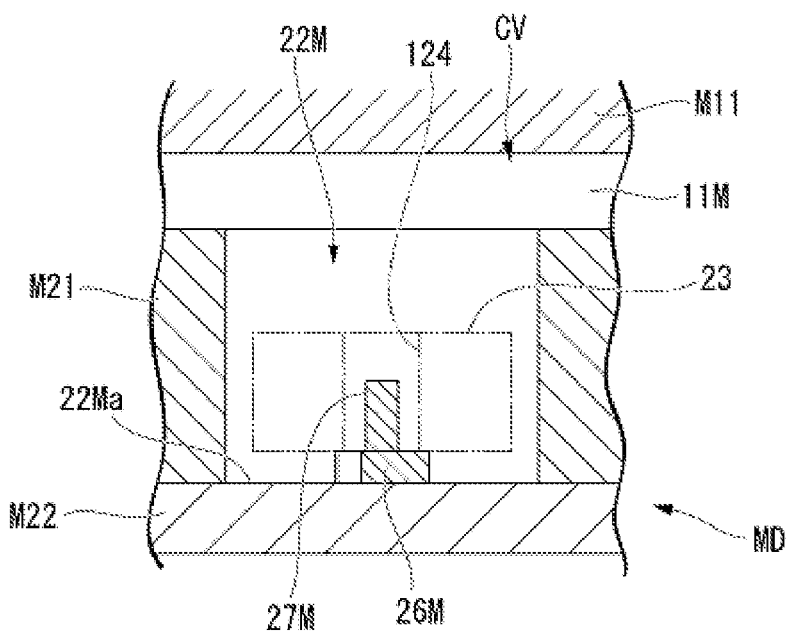
FIG. 30 is a partial detailed view of the cavity CV, which is a space in which the resonance portion 21, which is an embodiment according to the present invention, is to be molded.

As shown in FIG. 30, in the mold MD for molding the resonance portion 21, the core portions 26M extend in the radial direction from the core portion 27M as the center. In addition, a plurality of the core portions 26M (here, three at 120° intervals) are provided at intervals in the circumferential direction around the core portion 27M. The position of the outer side of the core portion 26M in the radial direction is outside the inner peripheral surface of the through-hole 124 and inside the outer peripheral surface of the weight portion 23.

With the resonance portion 21 molded in the mold MD having the above-described configuration, not only can the same action and effect as in the third embodiment be obtained, but it also becomes possible to further suppress the weight portion 23 being released from the base portion 22 or being rusted since the coating portion 125 is formed even between the indented portions 26 in the circumferential direction.

[Seventh Embodiment of Sound-Blocking Sheet Member and Manufacturing Method]

Subsequently, a seventh embodiment of the sound-blocking sheet member 100 and a manufacturing method therefor will be described with reference to FIG. 31 to FIG. 33.

In these drawings, the same element as the component of the sixth embodiment shown in FIG. 28 to FIG. 30 will be given the same reference sign and will not be described again.

In the sixth embodiment, a configuration in which the indented portions 26 extending in the radial direction are provided at intervals in the circumferential direction around the void 27 has been exemplified; however, in the present embodiment, dot-shaped indented portions 26 disposed apart from the void 27 are provided.

Figure 31:
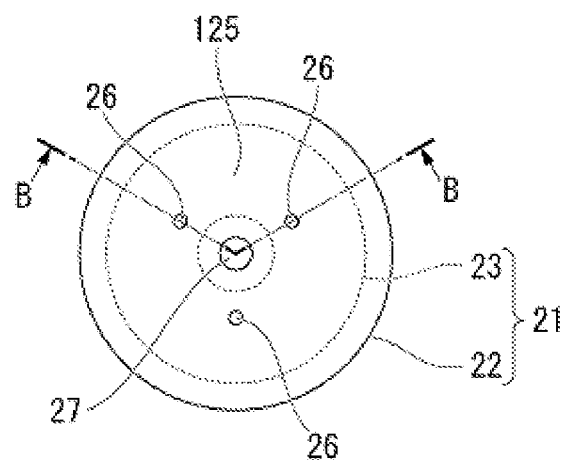
FIG. 31 is a plan view of the resonance portion 21, which is an embodiment according to the present invention.

FIG. 31 is a plan view of the resonance portion 21. FIG. 32 is a cross-sectional view taken along the line B-B in FIG. 31. FIG. 33 is a partial detailed view of the cavity CV, which is a space in which the resonance portion 21 is molded.

Figure 32:
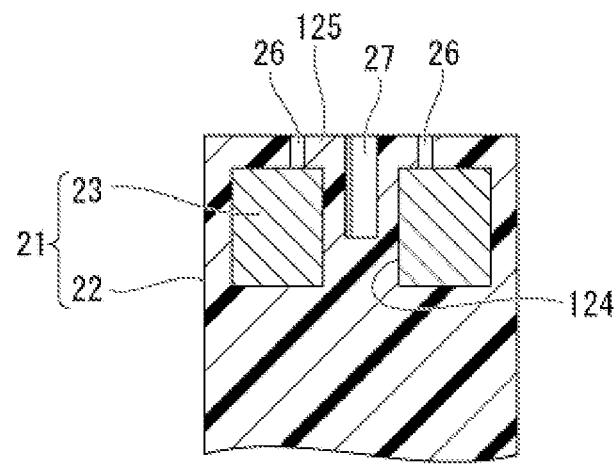
FIG. 32 is a cross-sectional view taken along a line B-B in FIG. 31.

As shown in FIG. 31 and FIG. 32, the indented portions 26 have a circular shape with a diameter smaller than the diameter of the void 27 in a plan view and are disposed apart from the void 27. A plurality of the indented portions 26 (here, three at 120° intervals) are provided at intervals in the circumferential direction around the void 27. The position of each indented portion 26 in the radial direction from the void 27 as the center is outside the inner peripheral surface of the through-hole 124 and inside the outer peripheral surface of the weight portion 23. The indented portions 26 penetrate the coating portion 125 in the vertical direction.

Figure 33:
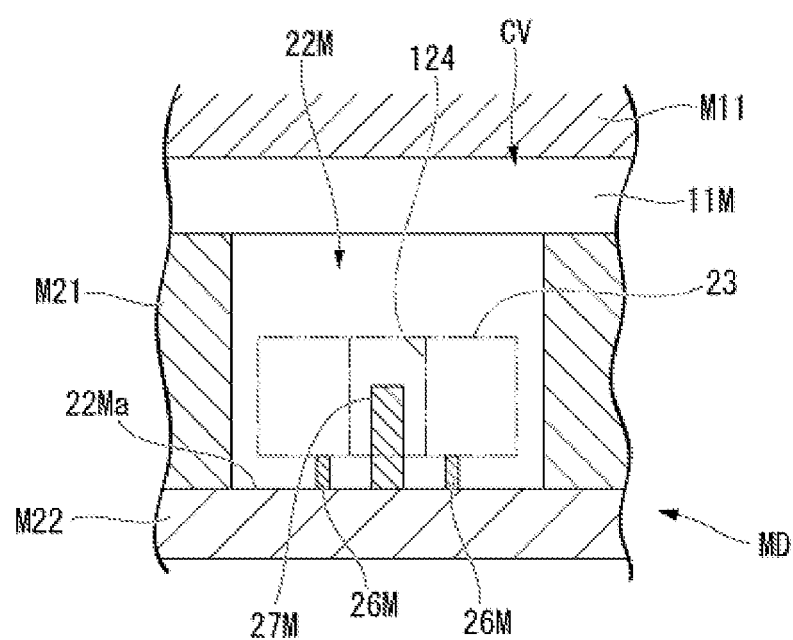
FIG. 33 is a partial detailed view of the cavity CV, which is a space in which the resonance portion 21, which is an embodiment according to the present invention, is to be molded.

As shown in FIG. 33, in the mold MD for molding the resonance portion 21, the core portions 26M are disposed apart from the core portion 27M. In addition, a plurality of the core portions 26M (here, three at 120° intervals) are provided at intervals in the circumferential direction around the core portion 27M. The position of each core portion 26M in the radial direction from the core portion 27M as the center is outside the inner peripheral surface of the through-hole 124 and inside the outer peripheral surface of the weight portion 23.

With the resonance portion 21 molded in the mold MD having the above-described configuration, not only can the same action and effect as in the sixth embodiment be obtained, but it also becomes possible to further suppress the weight portion 23 being released from the base portion 22 or being rusted since the coating portion 125 is formed even between the indented portion 26 and the void 27 in the radial direction.

[Eighth Embodiment of Sound-Blocking Sheet Member and Manufacturing Method]

Subsequently, an eighth embodiment of the sound-blocking sheet member 100 and a manufacturing method therefor will be described with reference to FIG. 34 to FIG. 37.

In these drawings, the same element as the component of the sixth embodiment shown in FIG. 28 to FIG. 30 will be given the same reference sign and will not be described again.

In the sixth embodiment, a configuration in which the core portion 26M having a surface parallel to the surface on the front end side of the weight portion 23 forms a gap corresponding to the thickness of the coating portion 125 between the weight portion 23 and the upper surface 22Ma has been exemplified; however, in the present embodiment, a configuration in which a core portion 28M that comes into contact with the weight portion 23 at a side surface (inclination portion) that inclines in a direction extending downward as the core portion 28M runs toward the outer side in the radial direction from the center of the resonance portion 21 is provided will be described.

Figure 34:
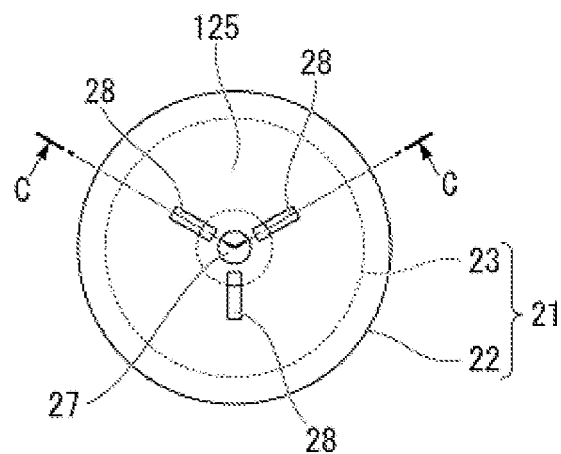
FIG. 34 is a plan view of the resonance portion 21, which is an embodiment according to the present invention.
Figure 35:
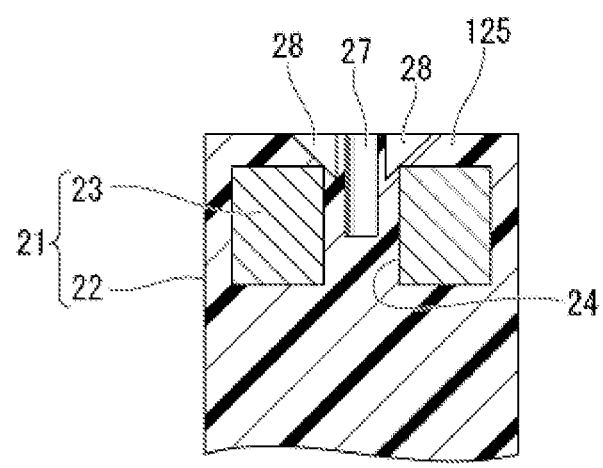
FIG. 35 is a cross-sectional view taken along a line C-C in FIG. 34.
Figure 36:
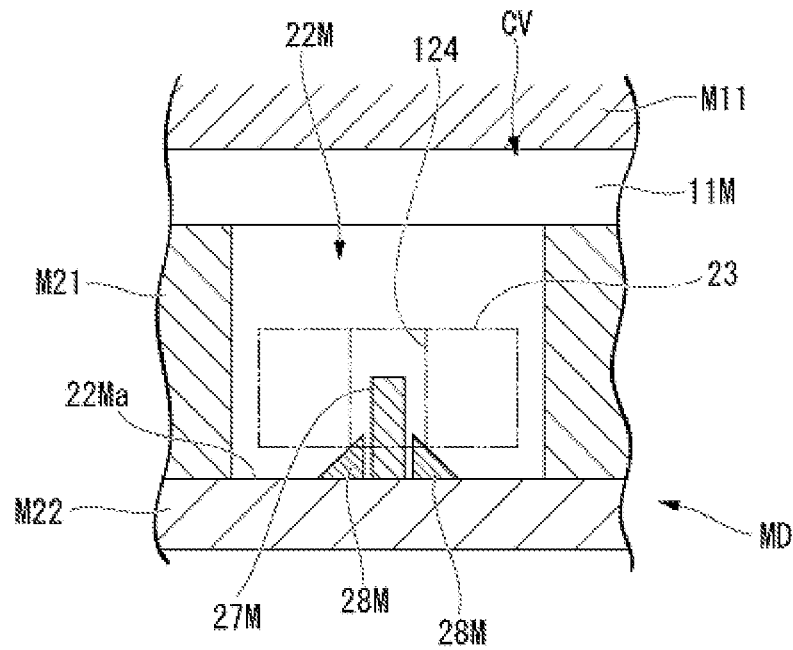
FIG. 36 is a partial detailed view of the cavity CV, which is a space in which the resonance portion 21, which is an embodiment according to the present invention, is to be molded.

FIG. 34 is a plan view of the resonance portion 21. FIG. 35 is a cross-sectional view taken along the line C-C in FIG. 34. FIG. 36 is a partial detailed view of the cavity CV, which is a space in which the resonance portion 21 is to be molded.

As shown in FIG. 34, indented portions 28 extend in the radial direction from the void 27 as the center. A plurality of the indented portions 28 (here, three at 120° intervals) are provided at intervals in the circumferential direction around the void 27. The position of the innermost side of the indented portion 28 on the inner side in the radial direction is outside the outer peripheral surface of the void 27 and inside the inner peripheral surface of the through-hole 124. The position of the outer side of the indented portion 28 in the radial direction is outside the inner peripheral surface of the through-hole 124 and inside the outer peripheral surface of the weight portion 23.

As shown in FIG. 35, the position in the vertical direction of the bottom portion of the indented portion 28 on the inner side in the radial direction is on the lower side of the surface on the front end side of the weight portion 23. The indented portion 28 has a side surface that inclines in a direction toward the surface on the front end side of the resonance portion 21 as the side surface runs from the bottom portion on the inner side in the radial direction toward the outer side in the radial direction. The side surface intersects the weight portion 23 at a place at which the inner peripheral surface of the through-hole 124 in the weight portion 23 and the surface on the front end side intersect.

As shown in FIG. 36, in the mold MD for molding the resonance portion 21, the core portions 28M for molding the indented portion 28 protrude from the upper surface 22Ma of the lower mold M22. The core portions 28M extend in the radial direction from the core portion 27M as the center. In addition, a plurality of the core portions 28M (here, three at 120° intervals) are provided at intervals in the circumferential direction around the core portion 27M. The position of the inner side of the core portion 28M in the radial direction is outside the outer peripheral surface of the core portion 27M and inside the inner peripheral surface of the through-hole 124. The position of the outer side of the core portion 28M in the radial direction is a position which is outside the inner peripheral surface of the through-hole 124 and inside the outer peripheral surface of the weight portion 23 and at which the upper surface 22Ma and the core portion 28M intersect.

The core portion 28M has a side surface that inclines toward the upper surface 22Ma as the side surface runs from the front end on the inner side in the radial direction toward the outer side in the radial direction.

Regarding the weight portion 23 disposed in the cavity CV of the mold MD having the above-described configuration, the front ends of the core portions 28M are inserted into the through-hole 124, and the intersection portion between the surface on the lower side shown in FIG. 36 and the inner peripheral surface of the through-hole 124 are supported by the side surfaces of the core portions 28M from below. Since the three core portions 28M are disposed in the circumferential direction around the core portion 27M, the weight portion 23 supported from below by the side surfaces of the core portions 28M is positioned coaxially with the recessed portion 22M.

When the resin material is poured into the cavity CV and the resonance portion 21 is molded in this state, the weight portion 23 is positioned coaxially with the core portion 27M, that is, at the center of the base portion 22. It should be noted that, even in a case where the weight portion 23 moves upward and deviates from the core portion 28M at the time of pouring the resin material, the position of the weight portion 23 in the surface direction is regulated by the core portion 27M, and thus the weight portion 23 becoming significantly uneven is suppressed.

As described above, in the present embodiment, not only can the same action and effect as in the sixth embodiment be obtained, but it also becomes possible to position the weight portion 23 in the void 27 (center position of the base portion 22) with high accuracy.

Figure 37:
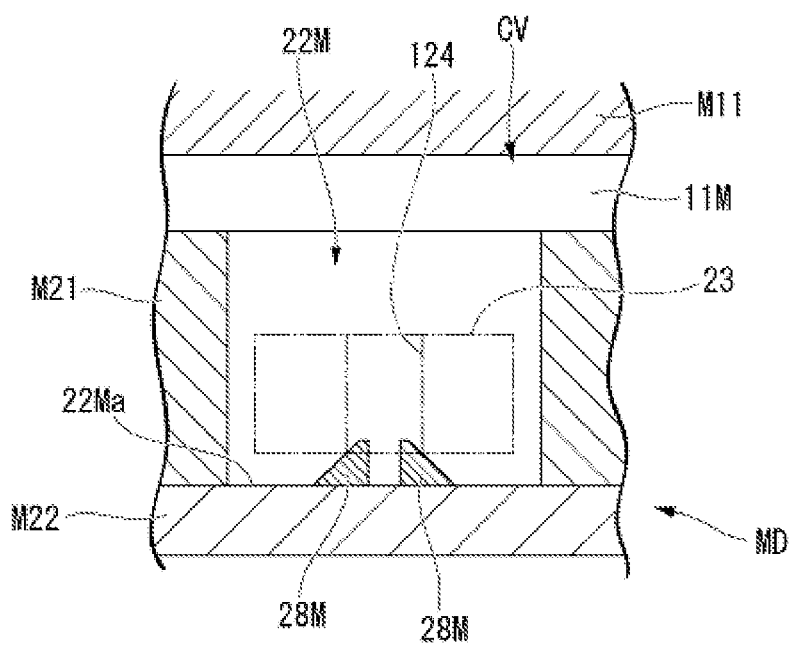
FIG. 37 is a partial detailed view of the cavity CV, which is a space in which the resonance portion 21, which is an embodiment according to the present invention, is to be molded.

It should be noted that, in a case where the weight portion 23 does not deviate from the core portion 28M due to the adjustment of molding conditions or the like, a configuration in which the core portion 27M is not provided as shown in FIG. 37 may be adopted.

In addition, in the eighth embodiment, a configuration in which the core portion 27M and the core portions 28M are disposed apart in the radial direction has been exemplified, but the configuration is not limited to this configuration, and for example, the inner sides of the core portions 28M in the radial direction may be in contact with the outer peripheral surface of the core portion 27M in the configuration.

[Ninth Embodiment of Sound-Blocking Sheet Member and Manufacturing Method]

Subsequently, a ninth embodiment of the sound-blocking sheet member 100 and a manufacturing method therefor will be described with reference to FIG. 38 and FIG. 39.

In these drawings, the same element as the component of the eighth embodiment shown in FIG. 34 to FIG. 37 will be given the same reference sign and will not be described again.

Figure 38:
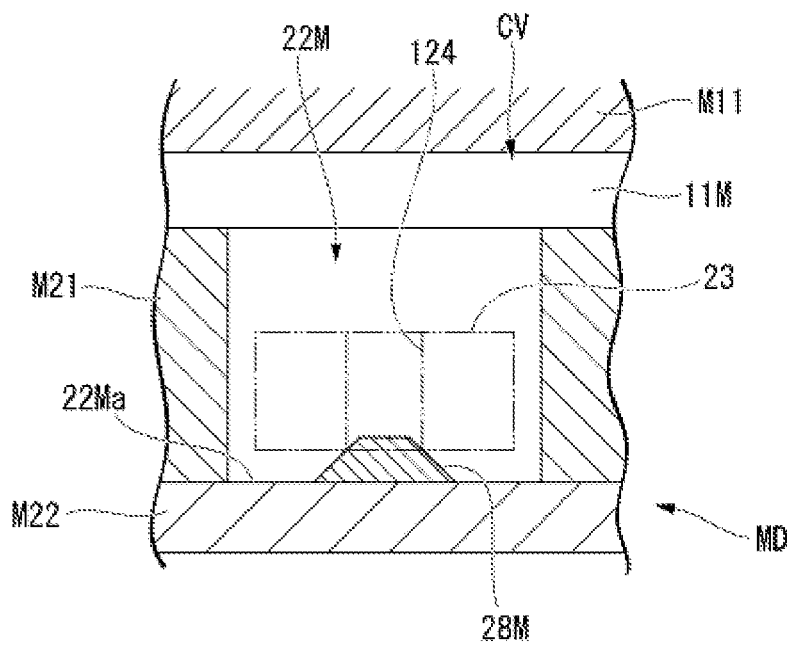
FIG. 38 is a partial detailed view of the cavity CV, which is a space in which the resonance portion 21, which is an embodiment according to the present invention, is to be molded.

FIG. 38 is a partial detailed view of the cavity CV, which is a space in which the resonance portion 21 is to be molded.

As shown in FIG. 38, the core portion 28M of the present embodiment is disposed coaxially with the recessed portion 22M. The core portion 28M is formed in a truncated cone shape in which the diameter gradually increases from the front end toward the base end of the upper surface 22Ma.

The diameter of the front end surface of the core portion 28M is smaller than the diameter of the through-hole 124 in the weight portion 23. The diameter of the base end portion of the core portion 28M is larger than the diameter of the through-hole 124 in the weight portion 23. Therefore, the intersection portion between the surface on the lower side and the inner peripheral surface of the through-hole 124 is supported from below by the side surfaces of the core portions 28M, and the weight portion 23 disposed in the cavity CV is positioned coaxially with the recessed portion 22M.

Therefore, in the present embodiment, not only can the same action and effect as in the eighth embodiment be obtained, but it is also possible to obtain the core portion 28M having a high strength and to extend the service life of the mold MD since no edge portion is formed in the core portion 28M.

Figure 39:
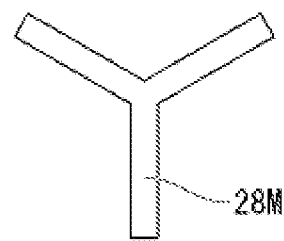
FIG. 39 is a plan view showing a modification example of a core portion 28M shown in FIG. 38.

It should be noted that the core portion 28M of the present embodiment may be, in addition to the configuration of the truncated cone shape, a configuration in which, for example, in a plan view, a plurality of linear portions extending from the center of the recessed portion 22M are disposed at intervals (for example, 120° intervals) in the circumferential direction as shown in FIG. 39.

[Tenth Embodiment of Sound-Blocking Sheet Member and Manufacturing Method]

Subsequently, a tenth embodiment of the sound-blocking sheet member 100 and a manufacturing method therefor will be described with reference to FIG. 40 and FIG. 41.

In these drawings, the same element as the component of the eighth and ninth embodiments shown in FIG. 34 to FIG. 39 will be given the same reference sign and will not be described again.

Regarding the core portion 28M of the eighth and ninth embodiments, a configuration in which the weight portion 23 comes into contact with and is supported by the intersection portion between the surface on the lower side of the weight portion 23 and the inner peripheral surface of the through-hole 124 has been exemplified; however, in the present embodiment, a configuration in which the weight portion 23 comes into contact with and is supported by the intersection portion between the surface on the lower side and the outer peripheral surface will be described.

Figure 40:
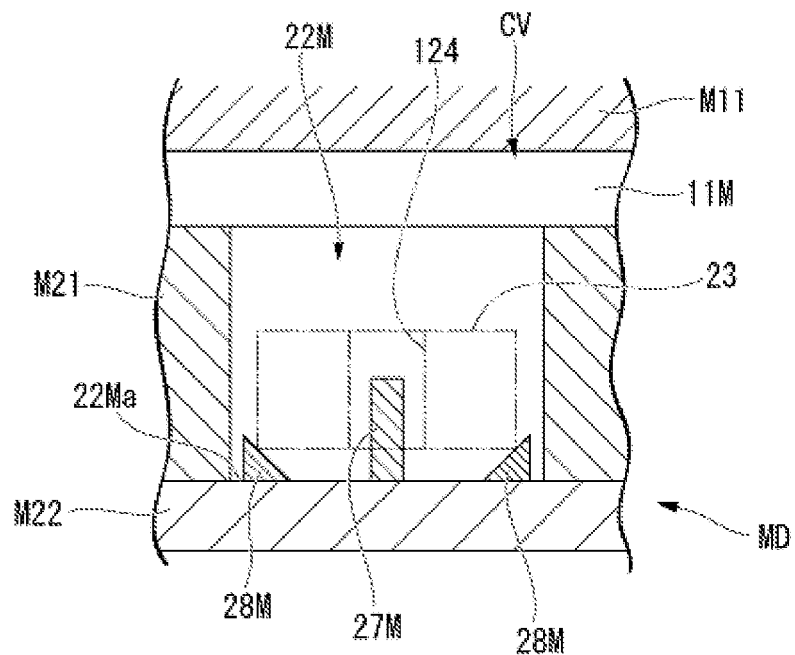
FIG. 40 is a partial detailed view of the cavity CV, which is a space in which the resonance portion 21, which is an embodiment according to the present invention, is to be molded.

FIG. 40 is a partial detailed view of the cavity CV, which is a space in which the resonance portion 21 is to be molded. FIG. 41 is a plan view of the resonance portion 21.

As shown in FIG. 40, the position of the outer side in the radial direction of the core portion 28M in the mold MD is outside the outer peripheral surface of the weight portion 23. The position of the inner side of the core portion 28M in the radial direction is outside the inner peripheral surface of the through-hole 124 and inside the outer peripheral surface of the weight portion 23. The core portion 28M has a side surface that inclines toward the upper surface 22Ma as the side surface runs from the front end on the outer side in the radial direction toward the inner side in the radial direction.

Figure 41:
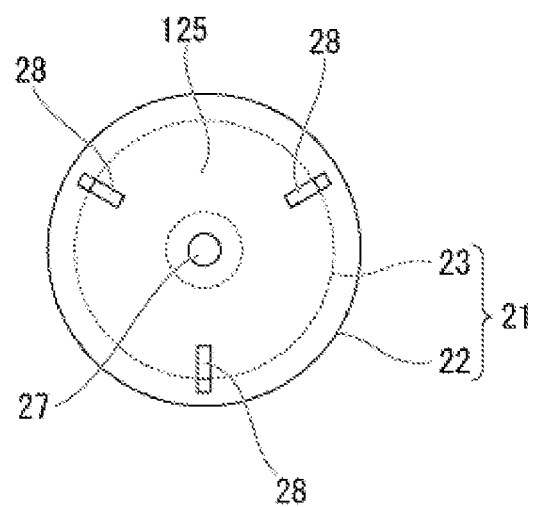
FIG. 41 is a plan view of the resonance portion 21, which is an embodiment according to the present invention.

As shown in FIG. 41, the indented portions 28 that are formed with the core portions 28M extend in the radial direction from the void 27 as the center. In addition, a plurality of the indented portions 28 (here, three at 120° intervals) are provided at intervals in the circumferential direction around the void 27. Therefore, the core portions 28M also extend in the radial direction from the core portion 27M as the center. In addition, a plurality of the core portions 28M (here, three at 120° intervals) are provided at intervals in the circumferential direction around the core portion 27M.

Regarding the weight portion 23 disposed in the cavity CV of the mold MD having the above-described configuration, the front ends of the core portions 28M are positioned on the upper side of the lower surface of the weight portion 23 on the outer side of the outer peripheral surface, and the intersection portion between the surface on the lower side and the outer peripheral surface of the weight portion 23 is supported by the side surfaces of the core portions 28M from below. Since the three core portions 28M are disposed in the circumferential direction around the core portion 27M, the weight portion 23 supported from below by the side surfaces of the core portions 28M is positioned coaxially with the recessed portion 22M.

Therefore, in the present embodiment, not only can the same action and effect as in the eighth and ninth embodiments be obtained, but it also becomes possible to support the weight portion 23 in a more stable state since the weight portion 23 is supported on the outer side in the radial direction compared with the eighth and ninth embodiments.

[Eleventh Embodiment of Sound-Blocking Sheet Member and Manufacturing Method]

Subsequently, an eleventh embodiment of the sound-blocking sheet member 100 and a manufacturing method therefor will be described with reference to FIG. 42 and FIG. 43.

In these drawings, the same element as the component of the third embodiment shown in FIG. 11 to FIG. 20 will be given the same reference sign and will not be described again.

In the third embodiment, a configuration in which the indented portion 26 and the void 27 are provided on the front end side of the base portion 22 has been exemplified; however, in the eleventh embodiment, a configuration in which, on the front end side of the base portion 22, the indented portion 26 is not provided and only the void 27 is provided will be described.

FIG. 42 is a partial cross-sectional view of the resonance portion 21 in which the weight portion 23 is buried in the base portion 22.

As shown in FIG. 42, in the base portion 22 of the present embodiment, the void 27 having a circular cross-sectional shape that is open on the front end side and extends in the axial direction is provided. The void 27 is provided coaxially with the through-hole 124 in the weight portion 23.

Figure 43:
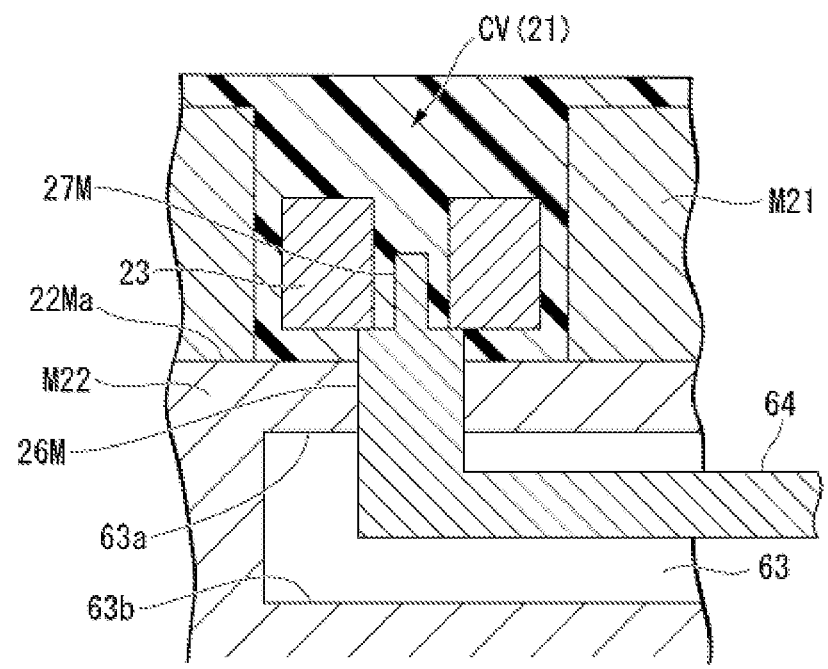
FIG. 43 is a partial detailed view of the cavity CV, which is a space in which the resonance portion 21, which is an embodiment according to the present invention, is to be molded.

FIG. 43 is a partial detailed view of the cavity CV, which is a space in which the resonance portion 21 is to be molded. FIG. 43 shows a state in which the resin material has been poured into the cavity CV. In addition, in FIG. 43, the recessed portion 11M and the upper mold M11 are not shown.

In the present embodiment, the core portion 26M that extends in the vertical direction, is fixed to the moving portion 64 at the lower end, and penetrates the lower mold M22 and the core portion 27M extending upward from the upper surface of the core portion 26M are provided coaxially with the weight portion 23. The diameter of the core portion 26M is formed to be larger than the diameter of the through-hole in the weight portion 23 and smaller than the outer diameter of the weight portion 23. When the moving portion 64 is at the upper end position, the core portion 26M supports the surface on the front end side of the weight portion 23 from below at a position in the vertical direction at which the coating portion 125 is formed in a predetermined thickness between the weight portion 23 and the upper surface 22Ma.

In the mold MD having the above-described configuration, as described in the fifth embodiment, the moving portion 64 is moved to the upper end position, and then the weight portion 23 is placed on the upper surface of the core portion 26M in a state in which the core portion 27M is inserted into the through-hole. After that, the above-described resin material is poured into the cavity CV. In addition, before the resin material reaches the peripheries of the core portions 26M and 27M and the resin material is completely cured, the core portions 26M and 27M are moved to the lower end position together with the moving portion 64 to make the front end surface of the core portion 26M flush with the upper surface 22Ma.

The resin material is poured into the cavity CV, whereby the resin material before curing enters the region in the cavity CV in which the core portion 26M was provided due to the movement of the core portion 26M.

As a result, as shown in FIG. 42, the resonance portion 21 in which the void 27 opens on the front end side and the front end side of the weight portion 23 is coated with the resin material except the void 27 is obtained.

After that, once the resin material is cured, the moving portion 64 is moved to the upper end position again. Therefore, the front end of the core portion 26M pushes out the end portion of the resonance portion 21 from below, and the sound-blocking sheet member 100 is released from the lower mold M21.

As described above, in the present embodiment, not only can the same action and effect as in the third and fourth embodiments be obtained, but the core portion 26M is moved to the upper end position after the curing of the resin material, whereby it becomes possible to easily release the sound-blocking sheet member 100 from the lower mold M21, the productivity improves, and additionally, it is also possible to reduce a defect that is generated during mold release.

It should be noted that, even in the case of using, for example, a cavity CV in which the step portion 26M is not provided as shown in FIG. 44 compared with the mold MD shown in FIG. 33, it is also possible to form the resonance portion 21 shown in FIG. 42. Even when there is no step portion, it is possible to pour the resin from the outer peripheral portion of the weight portion 23 or the inside of the through-hole 124 and to provide the resin to a portion below the weight portion 23. In this case, compared with the case of using the cavity CV having a step portion as shown in FIG. 43, it takes a long time for the resin to wrap around the portion below the weight portion 23, and a film to be formed is thin. On the other hand, it is possible to simplify the structure of the mold MD.

Hitherto, the preferred embodiments according to the present invention have been described with reference to the accompanying drawings, but it is needless to say that the present invention is not limited to such examples. The variety of shapes, combinations, and the like of the individual constituent members described in the above-described examples are examples, and a variety of modifications are permitted based on design requirements and the like without departing from the gist of the present invention.

For example, in the sixth to tenth embodiments, a configuration in which the through-hole 124 is formed in the weight portion 23 has been exemplified, but the configuration is not limited to this configuration, and the weight portion 23 may not be penetrated as in the recessed portion 24A described in the fourth and fifth embodiments. In addition, contrary to the above-described configuration, the weight portion 23 of the fourth and fifth embodiments may have a through-hole. Furthermore, the weight portion 23 may be formed to have a separated part in the circumferential direction in the annular portion as in a spring washer. In this case, the penetration portion becomes a space that is surrounded by the inner peripheral surface of the weight portion and the separated front ends of the weight portion, opens on both the front end side and the rear end side of the weight portion, and communicate both end sides.

INDUSTRIAL APPLICABILITY

The present invention is applicable to a sound-blocking sheet member, a sound-blocking structure using same, and a method for manufacturing a sound-blocking sheet member.

REFERENCE SIGNS LIST

11: sheet
11a: sheet surface
11b: sheet surface
21: resonance portion (protrusion portion)
22: base portion
22Ma: upper surface (bottom portion)
23: weight portion
24: base portion
24A: recessed portion
25: weight portion
26: indented portion
26M: core portion (step portion)
27: void
27A: void
27M: core portion (projection portion)
28: indented portion
31: rib-shaped protrusion portion
32: rib-shaped protrusion portion
51: support
61: mold
61a: cavity
61b: cavity
70: sheet
100: sound-blocking sheet member
101: sound-blocking sheet member
124: through-hole (penetration portion)
125: coating portion
200: sound-blocking structure
201: sound-blocking structure
203: sound-blocking structure
300: sound-blocking structure installation object
CV: cavity
H: maximum height of sound-blocking sheet member
H1: maximum height
H2: maximum height M11: upper mold
M12: upper mold
M21: lower mold
M22: lower mold
M111: indentation (pot)
M112: penetration flow path
MD: mold
r1: length
r2: radius
h: height
hx: height
a: sheet length
i: weight portion
ii: base portion
iii: sheet
iv: support

What is claimed is:

1. A sound-blocking sheet member, comprising at least:
a sheet; and
a plurality of resonance portions,
wherein the resonance portions are provided in contact with a sheet surface of the sheet,
each resonance portion includes a weight portion and a base portion,
the weight portion is supported by the base portion and has a larger mass than the base portion,
the weight portion has a penetration portion, and
the base portion is in contact with a surface on a resonance portion front end side of the weight portion and covers the weight portion.

2. The sound-blocking sheet member according to claim 1,
wherein an outer peripheral portion of the weight portion and the inside of the penetration portion are filled with the base portion.

3. The sound-blocking sheet member according to claim 1,
wherein the weight portion is disposed on the front end side of the center in the height direction of the resonance portion.

4. The sound-blocking sheet member according to claim 1,
wherein the maximum height from the opposite surface of the sheet surface provided with the resonance portion to the front end of the resonance portion is 30 mm or less.

5. The sound-blocking sheet member according to claim 4,
wherein the maximum height from the opposite surface of the sheet surface provided with the resonance portion to the front end of the resonance portion is 20 mm or less.

6. The sound-blocking sheet member according to claim 1,
wherein the resonance portion has a void in which the surface on the front end side of the resonance portion is indented, and the void is formed in the penetration portion.

7. The sound-blocking sheet member according to claim 1,
wherein the penetration portion is a through-hole.

8. A sound-blocking structure,
wherein the sound-blocking sheet member according to claim 1 is used.

9. A sound-blocking sheet member, comprising at least:
a sheet; and
a plurality of resonance portions,
wherein the resonance portions are provided in contact with a sheet surface of the sheet,
each resonance portion includes a weight portion and a base portion,
the weight portion is supported by the base portion and has a larger mass than the base portion, and
the weight portion has a penetration portion.

10. The sound-blocking sheet member according to claim 9,
wherein an outer peripheral portion of the weight portion and the inside of the penetration portion are filled with the base portion.

11. The sound-blocking sheet member according to claim 10,
wherein the maximum height from the opposite surface of the sheet surface provided with the resonance portion to the front end of the resonance portion is 30 mm or less.

12. The sound-blocking sheet member according to claim 11,
wherein the maximum height from the opposite surface of the sheet surface provided with the resonance portion to the front end of the resonance portion is 20 mm or less.

13. A sound-blocking structure,
wherein the sound-blocking sheet member according to claim 9 is used.

14. A method for manufacturing a sound-blocking sheet member having a sheet portion, a plurality of protrusion portions provided in the surface direction of the sheet portion, and weight portions each provided on front end sides of the plurality of protrusion portions, the method comprising:
a weight portion insertion step of inserting the weight portions into bottom portions of a plurality of cavities, in which the protrusion portions are to be molded, in a mold including the plurality of cavities; and
a resin insertion step of pouring a resin into the plurality of cavities,
wherein a projection portion is provided at one of the bottom portion and the front end side of the weight portion, and a recessed portion or a penetration portion into which the projection portion is to be inserted is provided at the other,
in the weight portion insertion step, the projection portion is inserted into the recessed portion or the penetration portion, and
in the resin insertion step, in a state in which the projection portion is inserted into the recessed portion or the penetration portion and a position in the surface direction of the weight portion with respect to the bottom portion is regulated, the resin is poured into the cavities.

15. The method for manufacturing a sound-blocking sheet member according to claim 14,
wherein the weight portion has the penetration portion.

16. The method for manufacturing a sound-blocking sheet member according to claim 15,
wherein the bottom portion is provided with the projection portion and a step portion that protrudes to a height lower than the projection portion and is in contact with a part of the surface on the front end side of the weight portion.

17. The method for manufacturing a sound-blocking sheet member according to claim 16,
wherein the step portion is provided in contact with the side surface of the projection portion.

18. The method for manufacturing a sound-blocking sheet member according to claim 16,
wherein the step portion is provided apart from the side surface of the projection portion.

19. The method for manufacturing a sound-blocking sheet member according to claim 17,
wherein the step portion inclines in a direction in which the height decreases as the protrusion portion runs from the central side in the radial direction toward the outer side in the radial direction, and
the maximum diameter of the step portion at a highest position is smaller than the hole diameter of the penetration portion provided in the weight portion, and a maximum diameter of the step portion at the lowest position is larger than the hole diameter of the penetration portion.

20. The method for manufacturing a sound-blocking sheet member according to claim 14,
wherein the mold includes a lower mold having cavities provided in an open state on an upper surface, and
an upper mold that is movable between a position at which the upper mold comes into contact with the upper surface of the lower mold and a position at which the upper mold is spaced apart from the lower mold on an upper side and has an indentation provided on the upper surface and a penetration flow path that is open in the indentation, and
in the resin insertion step, in a state in which the upper mold and the lower mold are in contact with each other, a molten resin is poured into the cavities from the indentation through the penetration flow path.

21. The method for manufacturing a sound-blocking sheet member according to claim 20, further comprising:
a step of extruding a solid material of the resin disposed in the indentation with a press mold inserted into the indentation before the resin insertion step.

22. The method for manufacturing a sound-blocking sheet member according to claim 14,
wherein the projection portion is provided at the bottom portion to incline in a direction in which the height decreases as the protrusion portion runs from the central side in the radial direction toward the outer side in the radial direction, and
the maximum diameter of the projection portion at a highest position is smaller than the hole diameter of the penetration portion provided in the weight portion, and a maximum diameter of the projection portion at the lowest position is larger than the hole diameter of the penetration portion.

23. The method for manufacturing a sound-blocking sheet member according to claim 14, further comprising:
a step of moving the projection portion provided at the bottom portion to the bottom portion side before the resin poured into the cavities in the resin insertion step is solidified.

24. The method for manufacturing a sound-blocking sheet member according to claim 23, further comprising:
a step of, after solidification of the resin, moving the projection portion to the cavity side to release the sound-blocking sheet member from the mold.

25. The method for manufacturing a sound-blocking sheet member according to claim 14,
wherein the maximum value of a gap between the projection portion and the recessed portion or between the projection portion and the penetration portion is smaller than the minimum value of a gap between the weight portion inserted into the cavity and the cavity.

26. A sound-blocking sheet member, comprising:
a sheet portion;
a plurality of protrusion portions provided in the surface direction of the sheet portion and having a resin material; and
weight portions each provided at insides on the front end side of the plurality of protrusion portions and each having a recessed portion or a penetration portion on the front end side,
wherein a void is formed on the inner side of the end surface on the front end side of the weight portion.

27. The sound-blocking sheet member according to claim 26,
wherein the weight portion has the penetration portion, and
the inner side of the void in the penetration portion is filled with the resin material.

28. The sound-blocking sheet member according to claim 27,
wherein a portion between the surface of the penetration portion and the void is filled with the resin material.

29. The sound-blocking sheet member according to claim 27,
wherein the protrusion portion has a coating portion that covers a part of the surface on the front end side of the weight portion with the resin material, and
a penetration portion that is provided along a circumferential direction on the outer side in the radial direction of the void around the center in the radial direction of the protrusion portion as an axial line and exposes a part of the surface on the front end side of the weight portion to penetrate the coating portion.

30. The sound-blocking sheet member according to claim 29,
wherein the penetration portion has an inclination portion that inclines in a direction in which the inclination portion comes close to a surface of the coating portion as the protrusion portion runs from the central side in the radial direction toward the outer side in the radial direction,
the maximum diameter of the inclination portion at the innermost side is smaller than the hole diameter of the penetration portion, and a maximum diameter of the inclination portion at an outermost surface side is larger than the hole diameter of the penetration portion, and
a part of the surface on the front end side of the weight portion is exposed in the middle of the inclination portion.

31. The sound-blocking sheet member according to claim 27,
wherein the protrusion portion has a coating portion that covers a part of the surface on the front end side of the weight portion with the resin material, and
an indented portion that is provided by removing a part of the coating portion and exposes a part of the surface on the front end side of the weight portion on a bottom surface, and
the void is open on the bottom surface of the indented portion.

32. The sound-blocking sheet member according to claim 27,
wherein the protrusion portion has a coating portion that covers a part of the surface on the front end side of the weight portion with the resin material,
the void has a penetration portion that is provided along a circumferential direction on the outer side in the radial direction of the void around the center in the radial direction of the protrusion portion as an axial line and exposes a part of the surface on the front end side of the weight portion to penetrate the coating portion, the penetration portion has an inclination portion that inclines in a direction in which the inclination portion comes close to a surface of the coating portion as the protrusion portion runs from the central side in the radial direction toward the outer side in the radial direction, the maximum diameter of the inclination portion at the innermost side is smaller than the hole diameter of the penetration portion, and a maximum diameter of the inclination portion at an outermost surface side is larger than the hole diameter of the penetration portion, and a part of the surface on the front end side of the weight portion is exposed in the middle of the inclination portion.

* * * * *